(12) United States Patent
Nagahara et al.

(10) Patent No.: US 8,976,455 B2
(45) Date of Patent: Mar. 10, 2015

(54) VARIABLE-MAGNIFICATION PROJECTION OPTICAL SYSTEM AND PROJECTION DISPLAY DEVICE

(71) Applicant: Fujifilm Corporation, Tokyo (JP)

(72) Inventors: Akiko Nagahara, Saitama-ken (JP); Yukiko Nagatoshi, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/142,040

(22) Filed: Dec. 27, 2013

(65) Prior Publication Data

US 2014/0126067 A1 May 8, 2014

Related U.S. Application Data

(63) Continuation of application No. PCT/JP2012/004155, filed on Jun. 27, 2012.

(30) Foreign Application Priority Data

Jun. 29, 2011 (JP) ................................ 2011-143822

(51) Int. Cl.
| | | |
|---|---|---|
| G02B 15/14 | (2006.01) | |
| G02B 3/00 | (2006.01) | |
| G02B 9/00 | (2006.01) | |
| G02B 13/18 | (2006.01) | |

(52) U.S. Cl.
USPC ........... 359/650; 359/649; 359/663; 359/680; 359/682; 359/683; 359/684; 359/713; 359/714; 359/740; 359/770

(58) Field of Classification Search
USPC ......... 359/649, 650, 663, 676, 682–684, 680, 359/713, 714, 740, 770
See application file for complete search history.

(56) References Cited

U.S. PATENT DOCUMENTS

| | | | |
|---|---|---|---|
| 6,480,340 B1 * | 11/2002 | Yamamoto | ..................... 359/676 |
| 6,639,737 B2 * | 10/2003 | Yasui et al. | ................... 359/761 |
| 6,741,398 B2 | 5/2004 | Yasui | |

(Continued)

FOREIGN PATENT DOCUMENTS

| | | |
|---|---|---|
| JP | 2001-343588 | 12/2001 |
| JP | 2006-039034 | 2/2006 |

(Continued)

OTHER PUBLICATIONS

International Search Report, PCT/JP2012/004155, Oct. 2, 2012.

Primary Examiner — Evelyn A. Lester
(74) Attorney, Agent, or Firm — Young & Thompson

(57) ABSTRACT

A variable-magnification projection optical system substantially consists of a negative first lens group that is disposed at the most enlargement-side position and is fixed during magnification change, a positive last lens group that is disposed at the most reduction-side position and is fixed during magnification change, and a plurality of lens groups that are disposed between the first lens group and last lens group and are moved during magnification change. The most enlargement-side lens group (the second lens group) of the lens groups that are moved during magnification change has a negative refractive power. Predetermined conditional expressions relating to a back focus of the entire system on the reduction side at the wide-angle end, a focal length of the entire system at the wide-angle end, a focal length of the second lens group and a focal length of the last lens group are satisfied.

16 Claims, 46 Drawing Sheets

(56) References Cited

U.S. PATENT DOCUMENTS

| | | | |
|---|---|---|---|
| 7,079,324 B2 * | 7/2006 | Yamasaki | 359/680 |
| 7,586,690 B2 * | 9/2009 | Yamada | 359/680 |
| 8,373,933 B2 * | 2/2013 | Eguchi | 359/691 |
| 8,570,662 B2 * | 10/2013 | Eguchi et al. | 359/684 |
| 8,699,139 B2 * | 4/2014 | Takamoto et al. | 359/649 |
| 2008/0239507 A1 * | 10/2008 | Sugita | 359/680 |
| 2008/0247049 A1 * | 10/2008 | Inoko | 359/649 |
| 2011/0080565 A1 | 4/2011 | Sugawara et al. | |
| 2011/0304921 A1 * | 12/2011 | Nagahara | 359/680 |
| 2011/0304922 A1 * | 12/2011 | Ichimura | 359/682 |
| 2012/0212835 A1 * | 8/2012 | Kimata et al. | 359/693 |

FOREIGN PATENT DOCUMENTS

| | | |
|---|---|---|
| JP | 2007-156268 | 6/2007 |
| JP | 2011-076040 | 4/2011 |

* cited by examiner

FIG.6 EXAMPLE 3

FIG.8 EXAMPLE 4

FIG.9 EXAMPLE 5 (WIDE-ANGLE END)

FIG.12  EXAMPLE 6

EXAMPLE 9

EXAMPLE 10

FIG.23 EXAMPLE 12 (WIDE-ANGLE END)

FIG.26  EXAMPLE 13

FIG.30  EXAMPLE 15

FIG.35 EXAMPLE 5

VARIABLE-MAGNIFICATION PROJECTION OPTICAL SYSTEM AND PROJECTION DISPLAY DEVICE

CROSS REFERENCE TO RELATED APPLICATIONS

This application is a continuation of PCT/JP2012/004155 filed on Jun. 27, 2012, which claims foreign priority to Japanese Application No. 2011-143822 filed on Jun. 29, 2011. The entire contents of each of the above applications are hereby incorporated by reference.

TECHNICAL FIELD

The present invention relates to a variable-magnification projection optical system and a projection display device. In particular, the present invention relates to a variable-magnification projection optical system that is suitable for projection on a large screen at movie theaters, etc., and a projection display device employing the variable-magnification projection optical system.

BACKGROUND ART

Conventionally, projector devices (projection display devices) using a light valve, such as a liquid crystal display element or DMD (Digital Micromirror Device®), are widely used. Further, in recent years, projection display devices of the above-described type which are capable of projecting a higher definition image and applicable to a large screen are being used at movie theaters, etc. A projection display device for use in this manner employs a three-chip system, wherein three light valves for individual primary colors are provided, a bundle of rays from a light source is separated into bundles of rays of the three primary colors by a color separation optical system and the bundle of rays of each primary color is routed to the corresponding light valve, and then the bundles of rays are combined by a color composition optical system and projected. Therefore, it is required for such a projection display device to have a long back focus and good telecentricity.

In general, a value obtained by dividing a projection distance by a screen width is called "throw ratio". The screen size and the distance from the screen to the projection booth, i.e., the projection distance, vary among movie theaters. Therefore, in order to project an image of a size suitable for each movie theater, it is necessary to provide a lens corresponding to the throw ratio suitable for the movie theater. However, it is not profitable to prepare a tailor-made lens for each movie theater in view of costs, and therefore it is conceivable to use a variable magnification optical system to accommodate a certain range of throw ratios.

As a variable-magnification projection optical system, those disclosed in Japanese Unexamined Patent Publication No. 2006-039034, U.S. Pat. No. 6,741,398 and Japanese Unexamined Patent Publication No. 2007-156268 (hereinafter, Patent Documents 1, 2 and 3, respectively), for example, are known. A projection zoom lens of Patent Document 1 includes, in order from the enlargement side, a negative first lens group, a negative second lens group, a positive third lens group, a positive fourth lens group and a positive fifth lens group, wherein magnification change is achieved by moving the second lens group, the third lens group and the fourth lens group along the optical axis.

Patent Document 2 discloses a projection zoom lens that includes at least one diffraction optical element and includes, in order from the enlargement side, a negative first lens group, a negative second lens group, a positive third lens group, a negative fourth lens group and a positive fifth lens group, and a projection zoom lens that includes, in order from the enlargement side, a negative first lens group, a negative second lens group, a positive third lens group, a negative fourth lens group, a positive fifth lens group and a positive sixth lens group.

Patent Document 3 discloses a projection zoom lens that includes, in order from the enlargement side, a negative first lens group, a negative second lens group, a positive third lens group, a positive fourth lens group and a positive fifth lens group, and a projection zoom lens that includes, in order from the enlargement side, a negative first lens group, a negative second lens group, a positive third lens group, a positive fourth lens group, a negative fifth lens group and a positive sixth lens group.

DISCLOSURE OF INVENTION

In recent years, there are demands for a variable-magnification projection optical system that has a high zoom ratio, can easily achieve a wide-angle projection optical system, and can minimize the size increase of the entire system so as to provide a highly versatile optical system, while satisfying the above-described demands with respect to the back focus and the telecentricity. However, the projection zoom lens of Patent Document 1 has drawbacks that it has a short back focus and a low zoom ratio. The projection zoom lens of Patent Document 2 has a drawback that it has a low zoom ratio. The projection zoom lens of Patent Document 3 has a drawback that it has a short back focus.

In view of the above-described circumstances, the present invention is directed to providing a variable-magnification projection optical system that is telecentric on the reduction side, has a long back focus and a high zoom ratio while minimizing the size increase of the entire system, can easily achieve a wide-angle projection optical system and can provide a good projection image, and a projection display device.

In order to achieve the above-described object, the variable-magnification projection optical system according to the invention substantially consists of: a first lens group that has a negative refractive power, is disposed at a most enlargement-side position and is fixed during magnification change; a last lens group that has a positive refractive power, is disposed at a most reduction-side position and is fixed during magnification change; and a plurality of lens groups that are disposed between the first lens group and the last lens group and are moved during magnification change, wherein a most enlargement-side lens group of the lens groups that are moved during magnification change has a negative refractive power, the variable-magnification projection optical system is configured to be telecentric on a reduction side, and conditional expressions (1) and (2) below are satisfied:

$$1.5 < Bf/fw \tag{1}$$

and $$-13.0 < f2/fw < -1.5 \tag{2},$$

where Bf is a back focus (equivalent air distance) on the reduction side of the entire system at a wide-angle end, fw is a focal length of the entire system at the wide-angle end, and f2 is a focal length of the most enlargement-side lens group of the lens groups that are moved during magnification change.

In the above-described variable-magnification projection optical system according to the invention, it is preferable that any one of or any combination of conditional expressions (3) to (6) below is satisfied:

$$1.8 < Bf/Im\phi \quad (3),$$

$$-10.0 < f1/fw < -2.0 \quad (4),$$

$$1.0 < fe/fw < 5.0 \quad (5) \text{ and}$$

$$1.4 < Zr \quad (6),$$

where Imφ is a maximum effective image circle diameter on the reduction side, f1 is a focal length of the first lens group, fe is a focal length of the last lens group, and Zr is a zoom ratio between the telephoto end and the wide-angle end.

In the above-described variable-magnification projection optical system according to the invention, the lens groups that are moved during magnification change may substantially consist of two lens groups consisting of, in order from an enlargement side, a lens group having a negative refractive power and a lens group having a positive refractive power.

Alternatively, in the above-described variable-magnification projection optical system according to the invention, the lens groups that are moved during magnification change may substantially consist of three lens groups consisting of, in order from the enlargement side, a lens group having a negative refractive power, a lens group having a positive refractive power and a lens group having a positive refractive power.

In the above-described variable-magnification projection optical system according to the invention, it is preferable that a stop is disposed in the last lens group, and a numerical aperture is set to be constant across the entire magnification range.

In the above-described variable-magnification projection optical system according to the invention, it is preferable that all lenses on the reduction side of the first lens group are single lenses.

In the above-described variable-magnification projection optical system according to the invention, it is preferable that the variable-magnification projection optical system functions as a zoom lens only by changing intervals between the lens groups.

When the variable-magnification projection optical system according to the invention is a zoom lens, it is preferable that focusing is achieved by using an inner focus method where only a part of the first lens group including a lens disposed at a most reduction-side position in the first lens group is moved in the optical axis direction.

The projection display device according to the invention includes: a light source; a light valve for receiving incoming light from the light source; and the above-described variable-magnification projection optical system of the invention serving as a variable-magnification projection optical system for projecting an optical image formed by light that have been subjected to optical modulation by the light valve onto a screen.

The variable magnification optical system of the invention may be a zoom lens or a varifocal lens.

It should be noted that the "enlargement side" as used herein refers to a side where an image is projected (screen side), and the screen side is referred to as the enlargement side even when a reduced image is projected for the sake of convenience. On the other hand, the "reduction side" as used herein refers to an original image display area side (light valve side), and the light valve side is referred to as the reduction side even when a reduced image is projected for the sake of convenience.

It should be noted that the expressions "substantially consists (consisting) of", "substantially consist of two lens groups" and "substantially consist of three lens groups" as used herein mean that, besides the lens groups recited as the constituent features, lenses or lens groups substantially without any power, optical elements other than lenses, such as stops and glass covers, etc., may be included.

The description "telecentric on the reduction side" as used herein refers to that, in a cross-section of a bundle of rays that is focused at any point on the image plane at the reduction side, an angle bisector between the uppermost ray and the lowermost ray is nearly parallel to the optical axis. That is, this is not limited to the case of perfect telecentricity, where the angle bisector is perfectly parallel to the optical axis, but also include a case where the angle bisector is nearly parallel to the optical axis with some errors. The description "with some errors" as used herein refers to that the inclination of the angle bisector relative to the optical axis is within the range of ±3°.

It should be noted that the "lens group" as used herein may not necessarily include a plurality of lenses and there may be a lens group including only one lens.

It should be noted that the value of "Imφ" can be found, for example, from specifications of the variable-magnification projection optical system, or specifications of a device on which the variable-magnification projection optical system is mounted.

It should be noted that the "single lens" as used herein refers to one lens that is not a cemented lens.

The variable-magnification projection optical system according to the invention includes, in order from the enlargement side, the first lens group that has a negative refractive power and is fixed during magnification change, the lens groups that are moved during magnification change, and the last lens group that has a positive refractive power and is fixed during magnification change. The most enlargement-side lens group of the lens groups that are moved during magnification change is a negative lens group. The variable-magnification projection optical system is telecentric on the reduction side, and is configured to satisfy the predetermined conditional expressions.

Therefore, according to the invention, a variable-magnification projection optical system that has a long back focus and a high zoom ratio while minimizing the size increase of the entire system, can easily achieve a wide-angle projection optical system, can provide a good projection image, is highly versatile and suitable for use at movie theaters, for example, and a projection display device can be provided.

DESCRIPTION OF PREFERRED EMBODIMENTS

Figure 1:
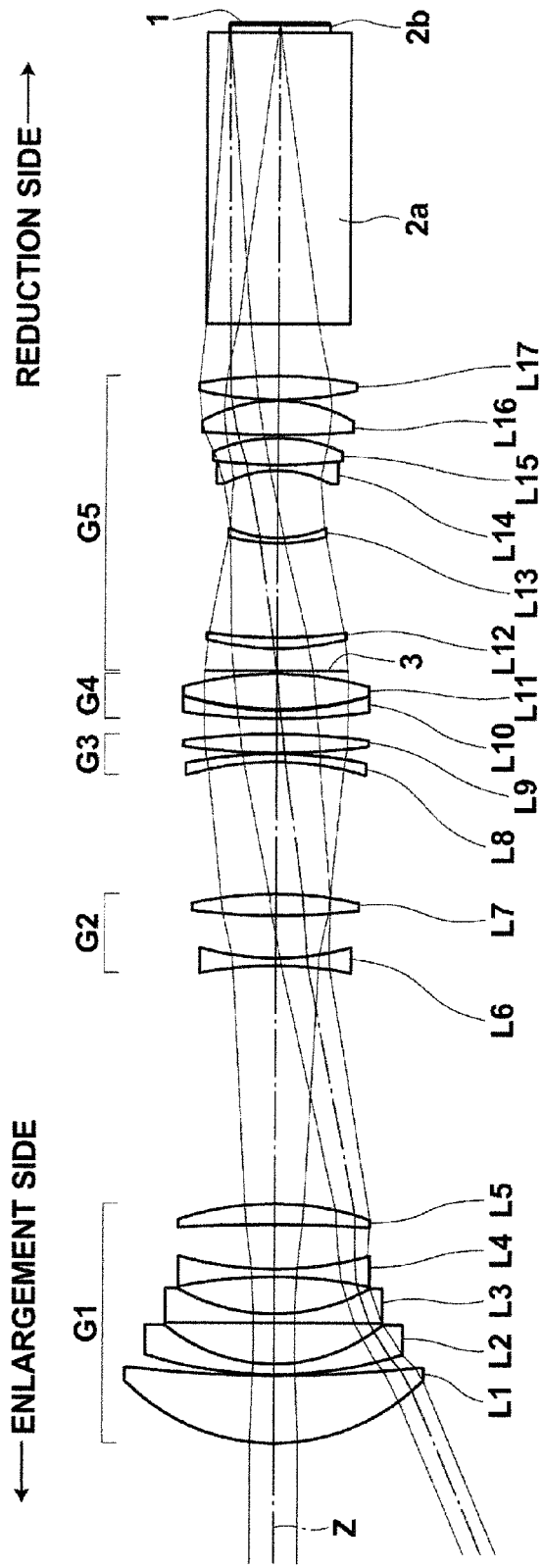
FIG. 1 is a sectional view illustrating the lens configuration and ray trajectories of a variable-magnification projection optical system according to Example 1 of the invention.
Figure 2:
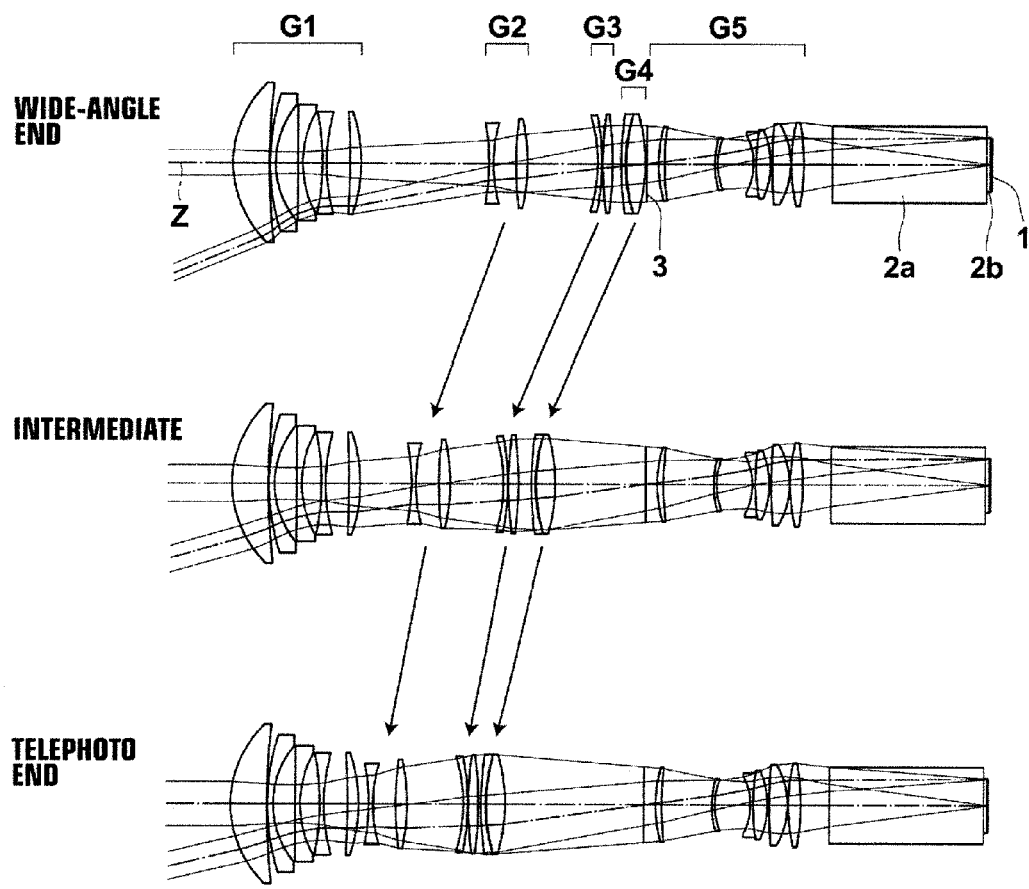
FIG. 2 is a diagram illustrating positions of lens groups and ray trajectories in different magnification positions of the variable-magnification projection optical system according to Example 1 of the invention.

Hereinafter, embodiments of the present invention will be described in detail with reference to the drawings. First, a variable-magnification projection optical system according to one embodiment of the invention is described with reference to FIGS. 1 and 2. FIG. 1 is a sectional view illustrating the lens configuration of a variable-magnification projection optical system according to Example 1 of the invention at the wide-angle end, and FIG. 2 is a diagram illustrating how lens groups are moved when the magnification of the variable-magnification projection optical system shown in FIG. 1 is changed, namely, positions of the lens groups at the wide-angle end, at an intermediate focal position and at the telephoto end. In FIG. 2, the direction of movement of each lens group that is moved when the magnification is changed from the wide-angle end to the intermediate focal position and from the intermediate focal position to the telephoto end is schematically shown by the arrow between the positions of the lens group. FIGS. 1 and 2 also show on-axis and most off-axis ray trajectories. Now, the embodiment of the invention is described with reference to the configuration example shown in FIGS. 1 and 2 as a representative example.

This variable-magnification projection optical system can be mounted on a projection display device for projecting a digital image, which is used at movie theaters, etc., and is usable as a projection lens for projecting image information that is displayed on a light valve, for example, onto a screen. In FIGS. 1 and 2, the left side is referred to as "enlargement side" and the right side is referred to as "reduction side". Assuming the case where the variable-magnification projection optical system is mounted on a projection display device, glass blocks 2a and 2b, such as a color combining prism (including filters), and the like, and an image display surface 1 of a light valve located on the reduction-side surface of the glass block 2b are also shown in FIGS. 1 and 2.

In the projection display device, a bundle of rays carrying image information imparted at the image display surface 1 enters the variable-magnification projection optical system via the glass blocks 2a and 2b, and is projected with being enlarged onto a screen (not shown), which is located in a position on the left side of the drawing, by the variable-magnification projection optical system.

It should be noted that, although the position of the reduction-side surface of the glass block 2b and the position of the image display surface 1 are the same in the example shown in FIGS. 1 and 2, this does not necessarily limit the invention. Further, although only one image display surface 1 is shown in FIGS. 1 and 2, the projection display device may be configured to be capable of displaying a full-color image by including three light valves for three primary colors and separating the bundle of rays from the light source into bundles of rays of the three primary colors with a color separation optical system.

Substantial lens groups of the variable-magnification projection optical system according to this embodiment only include: a first lens group G1 having a negative refractive power, which is disposed at the most enlargement-side position and is fixed during magnification change; a last lens group having a positive refractive power, which is disposed at the most reduction-side position and is fixed during magnification change; and a plurality of lens groups that are disposed between the first lens group G1 and the last lens group and are moved during magnification change (which will hereinafter be referred to as "lens groups that are moved during magnification change"), and the variable-magnification projection optical system is configured to be telecentric on the reduction side of the entire system. The most enlargement-side lens group of the lens groups that are moved during magnification change has a negative refractive power.

The configuration where the first lens group G1 at the most enlargement-side position is a negative lens group is advantageous in view of providing a wide angle of view. Further, the configuration where the first lens group G1 is a negative lens group and the most enlargement-side lens group of the lens groups that are moved during magnification change is a negative lens group facilitates keeping the diameters of the enlargement-side lenses within an appropriate range and providing a high zoom ratio, while providing a wide angle of view.

For example, in the example shown in FIGS. 1 and 2, five lens groups including the first lens group G1, a second lens group G2, a third lens group G3, a fourth lens group G4 and a fifth lens group G5 are arranged in this order from the enlargement side. Among these lens groups, three lens groups including the second lens group G2, the third lens group G3 and the fourth lens group G4 correspond to the lens groups that are moved during magnification change, and the fifth lens group G5 corresponds to the last lens group.

More specifically, in the example shown in FIGS. 1 and 2, lenses forming the individual lens groups are as follows: the first lens group G1 consists of five lenses (first to fifth lenses L1 to L5), the second lens group G2 consists of two lenses (sixth and seventh lenses L6 and L7), the third lens group G3 consists of two lenses (eighth and ninth lenses L8 and L9), the fourth lens group G4 consists of two lenses (tenth and eleventh lenses L10 and L11), and the fifth lens group G5 consists of a stop 3 and six lenses (twelfth to seventeenth lenses L12 to L17). It should be noted that the numbers of lenses forming the individual lens groups of the variable-magnification projection optical system of the invention are not necessarily limited to those of the example shown in FIGS. 1 and 2.

Further, the variable-magnification projection optical system of this embodiment is configured to satisfy conditional expressions (1) and (2) below:

$$1.5 < Bf/fw \quad (1) \text{ and}$$

$$-13.0 < f2/fw < -1.5 \quad (2),$$

where Bf is a back focus (equivalent air distance) on the reduction side of the entire system at the wide-angle end, fw is a focal length of the entire system at the wide-angle end, and f2 is a focal length of the most enlargement-side lens group of the lens groups that are moved during magnification change.

The conditional expression (1) defines the value of the ratio of the back focus of the entire system to the focal length of the entire system at the wide-angle end, and allows ensuring an appropriate space to insert a beam splitter, a glass block serving as a color composition means, such as a cross dichroic prism or TIR prism, etc. That is, if the lower limit of the conditional expression (1) is not reached, it is difficult to ensure a long back focus, and thus it is difficult to insert the glass block serving as the color composition means, etc., on the reduction side of the lens system.

The conditional expression (2) defines the power of the lens group disposed at the most enlargement-side position of the lens groups that are moved during magnification change. In this embodiment, the lens group disposed at the most enlargement-side position of the lens groups that are moved during magnification change is the second lens group G2. Therefore, in the following description, the lens group disposed at the most enlargement-side position of the lens groups that are moved during magnification change is referred to as the second lens group G2.

If the upper limit of the conditional expression (2) is exceeded, the power of the second lens group G2 is strong, and thus the powers of the lens groups that are moved during magnification change on the reduction side of the second lens group G2 are also strong. Therefore, it is difficult to achieve correction of image plane curve and chromatic aberration. If the lower limit of the conditional expression (2) is not reached, the power of the second lens group G2 is weak, and the amount of movement of the second lens group G2 during magnification change is increased, which influences the entire length of the lens system. If it is attempted to keep the entire length of the lens system within an acceptable range, amounts of movement of the lens groups that are moved during magnification change on the reduction side of the second lens group G2 during magnification change are increased, and the height of off-axis rays at the telephoto end increases across the entire range of the lens groups that are moved during magnification change. This leads to increase of the diameters of the lens groups that are moved during magnification change.

Further, it is preferable that the variable-magnification projection optical system according to this embodiment selectively has the features described below, as appropriate. As preferred aspects, the variable-magnification projection optical system of this embodiment may have one of or any combination of the features described below.

It is preferable that the variable-magnification projection optical system of this embodiment satisfies one of or any combination of conditional expressions (3) to (6) below:

$$1.8 < Bf/Im\phi \tag{3},$$

$$-10.0 < f1/fw < -2.0 \tag{4},$$

$$1.0 < fe/fw < 5.0 \tag{5) and}$$

$$1.4 < Zr \tag{6},$$

where $Im\phi$ is a maximum effective image circle diameter on the reduction side, f1 is a focal length of the first lens group, fe is a focal length of the last lens group, and Zr is a zoom ratio between the telephoto end and the wide-angle end.

The conditional expression (3) relates to the ratio of the back focus to the size of the image circle. If the lower limit of the conditional expression (3) is not reached, it is difficult to ensure an appropriate space to insert a beam splitter, a glass block serving as a color composition means, such as a cross dichroic prism or TIR prism, etc., on the reduction side of the lens system while providing a desired size of the image circle.

The conditional expression (4) defines the power of the first lens group G1. If the lower limit of the conditional expression (4) is not reached, the outer diameters of the enlargement-side lenses become large, and it is difficult to achieve a wide-angle projection optical system, it is difficult to ensure a long back focus and thus it is difficult to insert the glass block serving as the color composition means, etc., on the reduction side of the lens system. If the upper limit of the conditional expression (4) is exceeded, it is difficult to achieve correction of image plane curve and distortion.

The conditional expression (5) defines the power of the last lens group that is disposed at the most reduction-side position in the entire system and is fixed during magnification change. If the upper limit of the conditional expression (5) is exceeded and the power of the last lens group is excessively weak, spherical aberration is increased at the telephoto end. If the lower limit of the conditional expression (5) is not reached and the power of the last lens group is excessively strong, it is difficult to achieve correction of spherical aberration, and the outer diameters of the enlargement side lenses become large.

The conditional expression (6) defines the zoom ratio. If the lower limit of the conditional expression (6) is not reached, a high zoom ratio cannot be provided and a usable range of the variable-magnification projection optical system is narrowed, resulting in lower cost benefit. In this case, the variable-magnification projection optical system is no longer suitable for use at movie theaters, etc., which is the object of the invention.

In view of the above-described circumstances, it is more preferable that conditional expressions (1-1) to (6-1) below are satisfied in place of the conditional expressions (1) to (6), respectively:

$$2.0 < Bf/fw \tag{1-1},$$

$$-11.5 < f2/fw < -2.0 \tag{2-1},$$

$$2.2 < Bf/Im\phi \tag{3-1},$$

$$-7.0 < f1/fw < -2.3 \tag{4-1},$$

$$2.0 < fe/fw < 4. \tag{5-1) and}$$

$$1.5 < Zr \tag{6-1}.$$

It should be noted that, while the lens groups that are moved during magnification change consist of three lens groups in the example shown in FIG. 1, the lens groups that are moved during magnification change may substantially consist of two lens groups including, in order from the enlargement side, a lens group having a negative refractive power and a lens group having a positive refractive power. In the case where the lens groups that are moved during magnification change substantially consist of the two lens groups, it is easier to keep the diameters of the enlargement side lenses in an appropriate range while providing a wide angle of view, and provide a high zoom ratio.

On the other hand, in the case where the lens groups that are moved during magnification change substantially consist of three lens groups including, in order from the enlargement side, a lens group having a negative refractive power, a lens group having a positive refractive power and a lens group having a positive refractive power, as in the example shown in FIG. 1, it is easier to achieve correction of image plane curve across the entire magnification range.

Further, it is preferable that the variable-magnification projection optical system of this embodiment includes a stop 3 disposed in the last lens group, and has a numerical aperture that is set to be constant across the entire magnification range. As the stop 3, one functions as an aperture stop, for example, may be used.

Disposing the stop 3 on the reduction side of all the lens groups that are moved during magnification change allows maintaining a constant numerical aperture when the magnification is changed even in a case where the stop 3 is a fixed stop formed by a simple fixed aperture with an invariable stop diameter. In this case, if the projection magnification is the same, a projected image with the same brightness on a screen can be provided regardless of the projection distance. This is effective when the projection distance is changed depending on the size and the shape of the interior space of the movie theater, etc., for example.

Obviously, a variable stop with a variable stop diameter can be used as the stop 3. In the case where the stop 3 is a variable stop, disposing the stop 3 in the most reduction-side fixed group facilitates providing the variable mechanism of the stop 3. In particular, disposing the stop 3 at the most enlargement-side position in the most reduction-side fixed group further facilitates providing the variable mechanism of the stop 3.

In the variable-magnification projection optical system of this embodiment, it is preferable that all the lenses on the reduction side of the first lens group G1 are formed by single lenses without using a cemented lens. On the reduction side of the first lens group G1, much of on-axis bundle of rays and off-axis bundles of rays overlap with each other. Therefore, in the case where the variable-magnification projection optical system is mounted on a projection display device and is used in combination with a high-power light source, an adhesive used to cement lenses may significantly be altered and deteriorate due to the intense light, resulting in degradation of lens performance. Such a problem can be avoided by not using a cemented lens. In order to avoid such a problem as much as possible, it is more preferable that all the lenses of the entire system are formed by single lenses without using a cemented lens.

It should be noted that the variable-magnification projection optical system of this embodiment can have a configuration where all the lens surfaces are spherical surfaces and no aspherical surface is used, as in the example shown in FIG. 1. This is advantageous in view of costs. Obviously, the variable-magnification projection optical system of this embodiment may have a configuration using an aspherical surface, and more successful aberration correction can be achieved in this case.

Further, the variable-magnification projection optical system of this embodiment may be configured such that it functions as a zoom lens only by changing intervals between the lens groups. That is, the variable-magnification projection optical system of this embodiment may be configured such that it can be converted from a zoom lens into a varifocal lens or from a varifocal lens into a zoom lens only by changing intervals between the lens groups. With such a configuration, the variable-magnification projection optical system can be used with devices employing different focusing methods with a minimum structural change of the mechanism, thereby providing high cost benefit.

When the variable-magnification projection optical system is a zoom lens, it is preferable that focusing when the projection distance is changed is achieved by using the inner focus method, where only a part of the first lens group G1 including the most reduction-side lens of the first lens group G1 is moved in the optical axis direction to achieve focusing.

For example, in the example shown in FIG. 1, focusing can be achieved by moving one lens at the most reduction-side position in the first lens group G1, i.e., a lens L5, in the optical axis direction. In the case where the inner focus method is employed, it is not necessary to drive the enlargement-side lenses having large diameters and large weights. This allows reducing the load on the drive mechanism and maintaining the entire lens thickness constant during focusing.

In the variable-magnification projection optical system of the invention, focusing can be achieved by moving the entire first lens group G1 or part of the first lens group G1 other than the reduction-side lenses thereof. Alternatively, focusing can be achieved by moving all or part of a lens group other than the first lens group G1.

It is preferable that the variable-magnification projection optical system that is the object of the invention has an f-number smaller than 3.0 across the entire magnification range. Further, it is preferable that the variable-magnification projection optical system that is the object of the invention has suppressed distortion of not more than about 2% across the entire magnification range.

Figure 46:
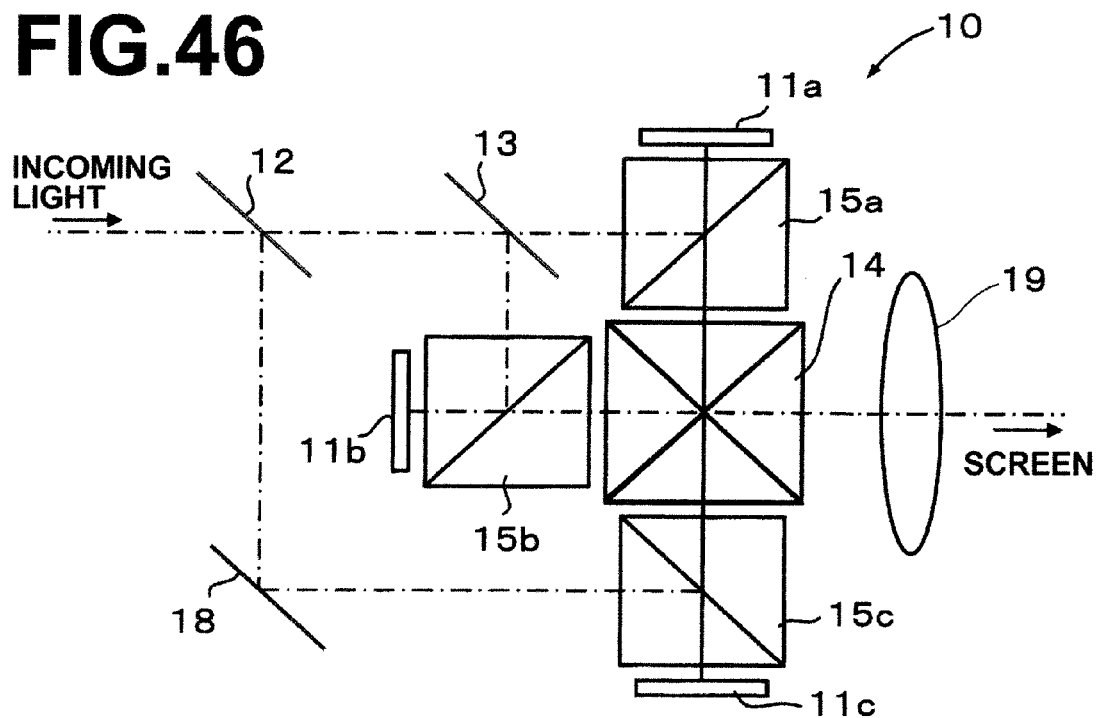
FIG. 46 is a schematic configuration diagram of a projection display device according to one embodiment of the invention.

Next, embodiments of a projection display device according to the invention are described with reference to FIGS. 46 and 47. FIG. 46 is a schematic configuration diagram showing part of the projection display device according to one embodiment of the invention, and FIG. 47 is a schematic configuration diagram showing part of the projection display device according to another embodiment of the invention.

The projection display device shown in FIG. 46 includes an illumination optical system 10 that includes: reflective display elements 11a to 11c serving as light valves corresponding to light of individual colors; dichroic mirrors 12 and 13 for color separation; a cross dichroic prism 14 for color composition; a total reflection mirror 18 for deflecting the optical path; and polarization-separation prisms 15a to 15c. It should be noted that a light source (not shown) is disposed upstream the dichroic mirror 12.

White light from this light source is separated into bundles of rays of three colors (G light, B light and R light) by the dichroic mirrors 12 and 13. The separated bundles of rays of individual colors travel through the polarization-separation prisms 15a to 15c, respectively, to enter the transmissive liquid crystal display elements 11a to 11c respectively corresponding to the bundles of rays of the individual colors, where the bundles of rays are subjected to optical modulation. Then, the bundles of rays are subjected to color composition by the cross dichroic prism 14 and enter the variable-magnification projection optical system 19 according to the above-described embodiment. An optical image formed by this incident light is projected onto a screen (not shown) by the variable-magnification projection optical system 19.

Figure 47:
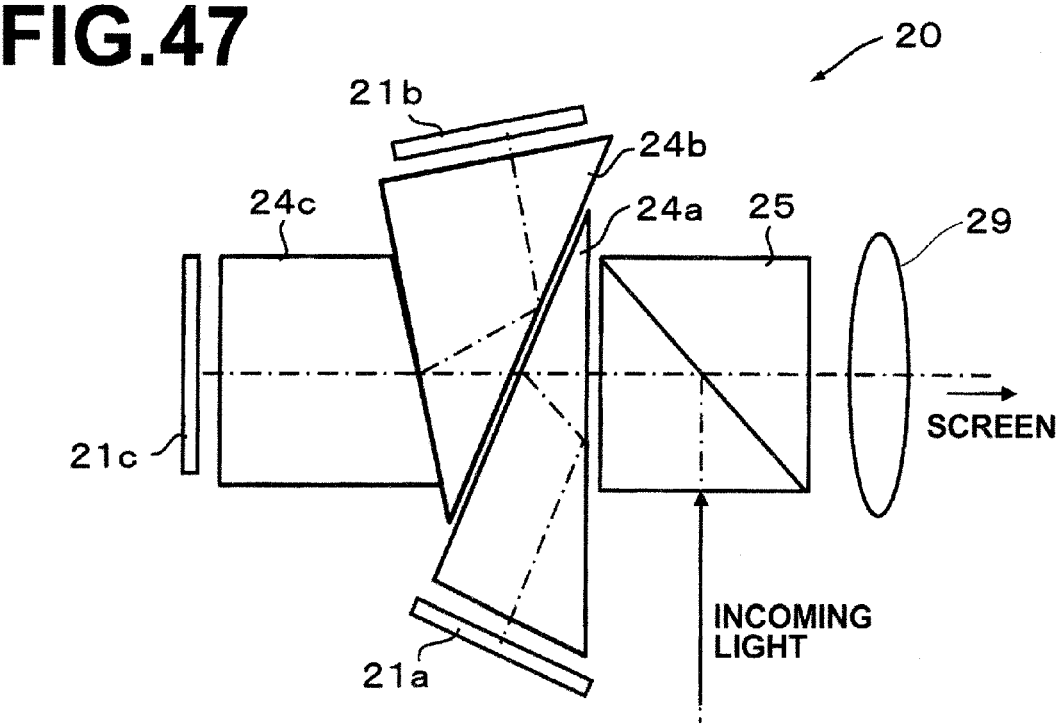
FIG. 47 is a schematic configuration diagram of a projection display device according to another embodiment of the invention.

On the other hand, the projection display device according to the other embodiment shown in FIG. 47 includes an illumination optical system 20 that includes: reflective display elements 21a to 21c serving as light valves corresponding to light of individual colors; TIR (Total Internal Reflection) prisms 24a to 24c for color separation and color composition; and a polarization-separation prism 25. It should be noted that a light source (not shown) is disposed upstream the polarization-separation prism 25.

White light from this light source travels through the polarization-separation prism 25, and then is separated into bundles of rays of three colors (G light, B light and R light) by the TIR prisms 24a to 24c. The separated bundles of rays of individual colors enter the corresponding reflective display elements 21a to 21c, respectively, to be subjected to optical modulation, travel again through the TIR prisms 24a to 24c in the opposite direction to be subjected to color composition, and then travel through the polarization-separation prism 25 to enter the variable-magnification projection optical system 29 according to the above-described embodiment. An optical image formed by this incident light is projected onto a screen (not shown) by the variable-magnification projection optical system 29.

It should be noted that, as the reflective display elements 11a to 11c and 21a to 21c, reflective liquid crystal display elements or DMDs, for example, may be used. Although the reflective display elements are used as the light valves in the examples shown in FIGS. 46 and 47, the light valves of the projection display device of the invention are not limited to reflective display elements, and transmissive display elements, such as transmissive liquid crystal display elements, may be used.

Next, specific examples of the variable-magnification projection optical system of the invention are described. Examples 1 to 15 described below are configured as varifocal lenses. However, as described later as modifications of Examples 1 and 13, Examples 1 and 13 are configured to be usable as a zoom lens only by changing intervals between the lens groups. In the case where Examples 1 to 15 are used as varifocal lenses, focusing when the magnification is changed or when the projection distance is changed is achieved by moving the entire system integrally in the optical axis direction.

Example 1

FIGS. 1 and 2 show the lens configuration and ray trajectories at the wide-angle end of the variable-magnification projection optical system of Example 1, and positions of the lens groups and ray trajectories in different magnification positions of the variable-magnification projection optical system of Example 1, respectively. It should be noted that the configuration shown in FIGS. 1 and 2 is one where the reduction magnification is −0.002×. The details of FIGS. 1 and 2 are as described above and the same explanation may not be repeated.

The variable-magnification projection optical system of Example 1 has a five-group configuration including, in order from the enlargement side, a first lens group G1 having a negative refractive power, a second lens group G2 having a negative refractive power, a third lens group G3 having a positive refractive power, a fourth lens group G4 having a positive refractive power and a fifth lens group G5 having a positive refractive power. The variable-magnification projection optical system of Example 1 is telecentric on the reduction side. On the reduction side of the fifth lens group G5, the image display surface 1 of the light valve formed by a reflective liquid crystal display panel, or the like, and the glass blocks 2a and 2b, such as the color composition prism (including filters, such as an infrared cutoff filter, a low-pass filter, etc.), are disposed.

During magnification change, the first lens group G1 and the fifth lens group G5 are fixed, and the second lens group G2, the third lens group G3 and the fourth lens group G4 are movable. How the lens groups are moved is shown in FIG. 2. A stop 3 is disposed in the fifth lens group G5, and the numerical aperture is set to be constant across the entire magnification range.

The first lens group G1 includes, in order from the enlargement side, a first lens L1 formed by a positive meniscus lens with the convex surface facing the enlargement side, a second lens L2 formed by a negative meniscus lens with the concave surface facing the reduction side, a third lens L3 formed by a plano-concave lens with the concave surface facing the reduction side, a fourth lens L4 formed by a biconcave lens, and a fifth lens L5 formed by a positive meniscus lens with the convex surface facing the reduction side.

The second lens group G2 includes, in order from the enlargement side, a sixth lens L6 formed by a biconcave lens, and a seventh lens L7 formed by a biconvex lens. The third lens group G3 includes, in order from the enlargement side, an eighth lens L8 formed by a negative meniscus lens with the convex surface facing the reduction side, and a ninth lens L9 formed by a biconvex lens. The fourth lens group G4 includes, in order from the enlargement side, a tenth lens L10 formed by a negative meniscus lens with the convex surface facing the enlargement side, and an eleventh lens L11 formed by a biconvex lens.

The fifth lens group G5 includes, in order from the enlargement side, the stop (including an aperture and a variable stop) 3, a twelfth lens L12 formed by a positive meniscus lens with the convex surface facing the enlargement side, a thirteenth lens L13 formed by a negative meniscus lens with the convex surface facing the enlargement side, a fourteenth lens L14 formed by a biconcave lens, a fifteenth lens L15 formed by a biconvex lens, a sixteenth lens L16 formed by a biconvex lens, and a seventeenth lens L17 formed by a biconvex lens.

All the lenses of the variable-magnification projection optical system of Example 1 are formed by single lenses without using a cemented lens. Further, all the lens surfaces are spherical surfaces, and no aspherical surface is used. This is advantageous in view of costs.

Basic lens data of the variable-magnification projection optical system of Example 1 is shown in the upper table of Table 1. The data shown in Table 1 also includes data of the stop 3 and the glass blocks 2a and 2b. In Table 1, each value in the column of "Si" represents the surface number of the i-th (i=1, 2, 3, . . . ) surface, where the enlargement-side surface of the most enlargement-side element is the 1st surface and the number is sequentially increased toward the reduction side. Each value in the column of "Ri" represents the radius of curvature of the i-th surface. Each value in the column of "Di" represents the surface interval between the i-th surface and the i+1-th surface along the optical axis Z. Each value in the column of "Ndj" represents the refractive index with respect to the d-line (the wavelength of 587.6 nm) of the j-th (j=1, 2, 3, . . . ) element, where the most enlargement-side element is the 1st element and the number is sequentially increased toward the reduction side. Each value in the column of "vdj" represents the Abbe number with respect to the d-line of the j-th element.

It should be noted that the symbol with respect to the radius of curvature means that a surface shape that is convex toward the enlargement side is positive and a surface shape that is convex toward the reduction side is negative. The interval between the first lens group G1 and the second lens group G2, the interval between the second lens group G2 and the third lens group G3, the interval between the third lens group G3 and the fourth lens group G4, and the interval between the fourth lens group G4 and the fifth lens group G5 are variable intervals that are changed during magnification change, and the texts "(variable 1)", "(variable 2)", "(variable 3)" and "(variable 4)" are shown at positions in the column corresponding to these intervals, respectively.

Values of the focal length of the entire system and the variable intervals (variable 1), (variable 2), (variable 3) and (variable 4) at the wide-angle end, at an intermediate focal position and at the telephoto end are shown in the lower table of Table 1. Further, the f-number "Fno." and the total angle of view "2ω" of the variable-magnification projection optical system of Example 1 are shown above Table 1.

TABLE 1

Example 1
Fno. = 2.50, 2ω = 45.6° to 26.6°

| Si | Ri | Di | Ndj | vdj |
|---|---|---|---|---|
| 1 | 17.4798 | 5.6336 | 1.48749 | 70.23 |
| 2 | 113.1727 | 0.0837 | | |
| 3 | 35.5854 | 0.8779 | 1.61800 | 63.33 |
| 4 | 14.4207 | 3.4144 | | |

TABLE 1-continued

Example 1
Fno. = 2.50, 2ω = 45.6° to 26.6°

| | | | | |
|---|---|---|---|---|
| 5 | ∞ | 0.7521 | 1.49700 | 81.61 |
| 6 | 16.3592 | 3.0968 | | |
| 7 | −39.6094 | 0.6292 | 1.63854 | 55.38 |
| 8 | 29.5664 | 3.7072 | | |
| 9 | −138.6589 | 1.7421 | 1.77250 | 49.60 |
| 10 | −24.5100 | (variable 1) | | |
| 11 | −32.9866 | 0.6338 | 1.58913 | 61.14 |
| 12 | 22.9127 | 3.5374 | | |
| 13 | 54.5180 | 1.7938 | 1.51742 | 52.43 |
| 14 | −31.8473 | (variable 2) | | |
| 15 | −25.2843 | 0.6623 | 1.80000 | 29.84 |
| 16 | −37.6407 | 0.0829 | | |
| 17 | 57.4224 | 1.5506 | 1.61800 | 63.33 |
| 18 | −57.4224 | (variable 3) | | |
| 19 | 55.1941 | 0.6726 | 1.83400 | 37.16 |
| 20 | 25.5990 | 0.1218 | | |
| 21 | 28.1906 | 2.9383 | 1.49700 | 81.61 |
| 22 | −28.1906 | (variable 4) | | |
| 23 (stop) | ∞ | 1.8302 | | |
| 24 | 21.8886 | 0.9196 | 1.80518 | 25.42 |
| 25 | 44.0144 | 7.8337 | | |
| 26 | 16.6537 | 0.4139 | 1.83400 | 37.16 |
| 27 | 10.3633 | 5.6212 | | |
| 28 | −9.4518 | 0.4145 | 1.83481 | 42.71 |
| 29 | 38.9213 | 0.0099 | | |
| 30 | 39.9686 | 2.2431 | 1.49700 | 81.61 |
| 31 | −13.0395 | 0.2529 | | |
| 32 | 83.6658 | 2.8378 | 1.49700 | 81.61 |
| 33 | −12.5683 | 0.0948 | | |
| 34 | 28.8419 | 1.9689 | 1.49700 | 81.61 |
| 35 | −35.9180 | 4.3462 | | |
| 36 | ∞ | 24.1110 | 1.51633 | 64.14 |
| 37 | ∞ | 0.6209 | 1.50847 | 61.19 |
| 38 | ∞ | | | |

| | Focal length | (Variable 1) | (Variable 2) | (Variable 3) | (Variable 4) |
|---|---|---|---|---|---|
| Wide-angle | 10.00 | 19.7513 | 10.9381 | 1.2940 | 0.2476 |
| Intermediate | 14.47 | 7.9330 | 8.2791 | 2.0235 | 13.9955 |
| Telephoto | 17.45 | 1.5877 | 8.6589 | 0.4129 | 21.5714 |

It should be noted that the values of the data shown in Table 1 are normalized values with the focal length of the entire system of the variable-magnification projection optical system at the wide-angle end being taken as 10.0. The numerical values shown in Table 1 are rounded at predetermined decimal places.

Figure 31:
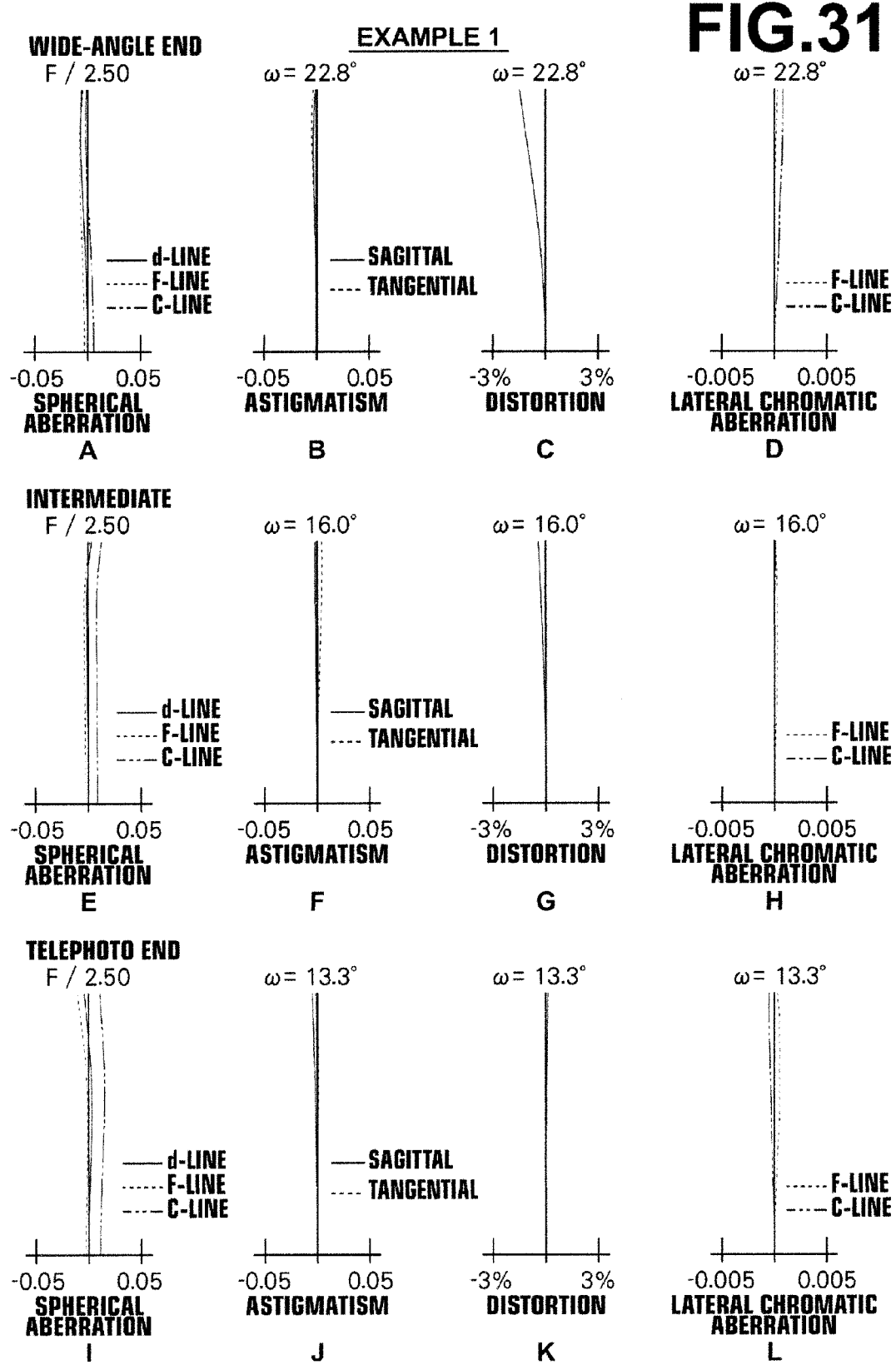
FIG. 31 shows, at A to L, aberration diagrams of the variable-magnification projection optical system according to Example 1 of the invention.

FIG. 31 shows, at A to D, aberration diagrams of spherical aberration, astigmatism, distortion and lateral chromatic aberration (magnification chromatic aberration) of the variable-magnification projection optical system of Example 1 at the wide-angle end, respectively. Further, FIG. 31 shows, at E to H, aberration diagrams of spherical aberration, astigmatism, distortion and lateral chromatic aberration (magnification chromatic aberration) of the variable-magnification projection optical system of Example 1 at the intermediate focal position, respectively. Also, FIG. 31 shows, at I to L, aberration diagrams of spherical aberration, astigmatism, distortion and lateral chromatic aberration (magnification chromatic aberration) of the variable-magnification projection optical system of Example 1 at the telephoto end, respectively.

The aberration diagrams shown at A to L in FIG. 31 are with respect to the d-line. The spherical aberration diagrams also show aberrations with respect to the F-line (the wavelength of 486.1 nm) and the C-line (the wavelength of 656.3 nm). The lateral chromatic aberration diagrams also show aberrations with respect to the F-line and the C-line. In the astigmatism diagrams, aberrations in the sagittal direction are shown in the solid lines and aberrations in the tangential direction are shown in the dashed lines. In the spherical aberration diagrams, "F" shown above the vertical axes means the f-number. The symbol "ω" shown above the vertical axes of the other aberration diagrams means the half angle of view. It should be noted that the aberration diagrams shown at A to L in FIG. 31 show aberrations when the reduction magnification is −0.002×.

Basically, the symbols, the meanings and the manners of description of the diagram illustrating the lens configuration, the diagram illustrating the positions of the lens groups, the tables and the aberration diagrams of Example 1 described above also apply to those of Examples 2 to 15 unless otherwise noted. Also, the point that the diagram illustrating the lens configuration, the diagram illustrating the positions of the lens groups and the aberration diagrams of Example 1 show the lens configuration, the positions of the lens groups and the aberrations when the reduction magnification is −0.002×, and the point that the values of the basic lens data of Example 1 are normalized relative to the focal length being taken as 10.0 also apply to those of Examples 2 to 15.

Example 2

Figure 3:
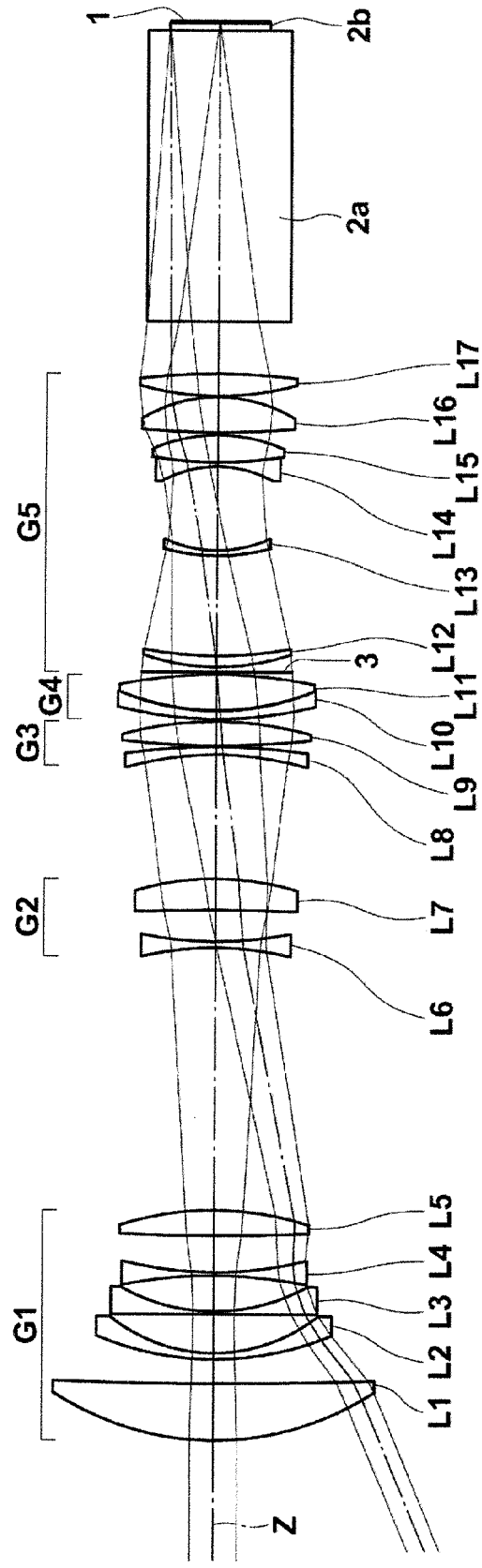
FIG. 3 is a sectional view illustrating the lens configuration and ray trajectories of a variable-magnification projection optical system according to Example 2 of the invention.
Figure 4:
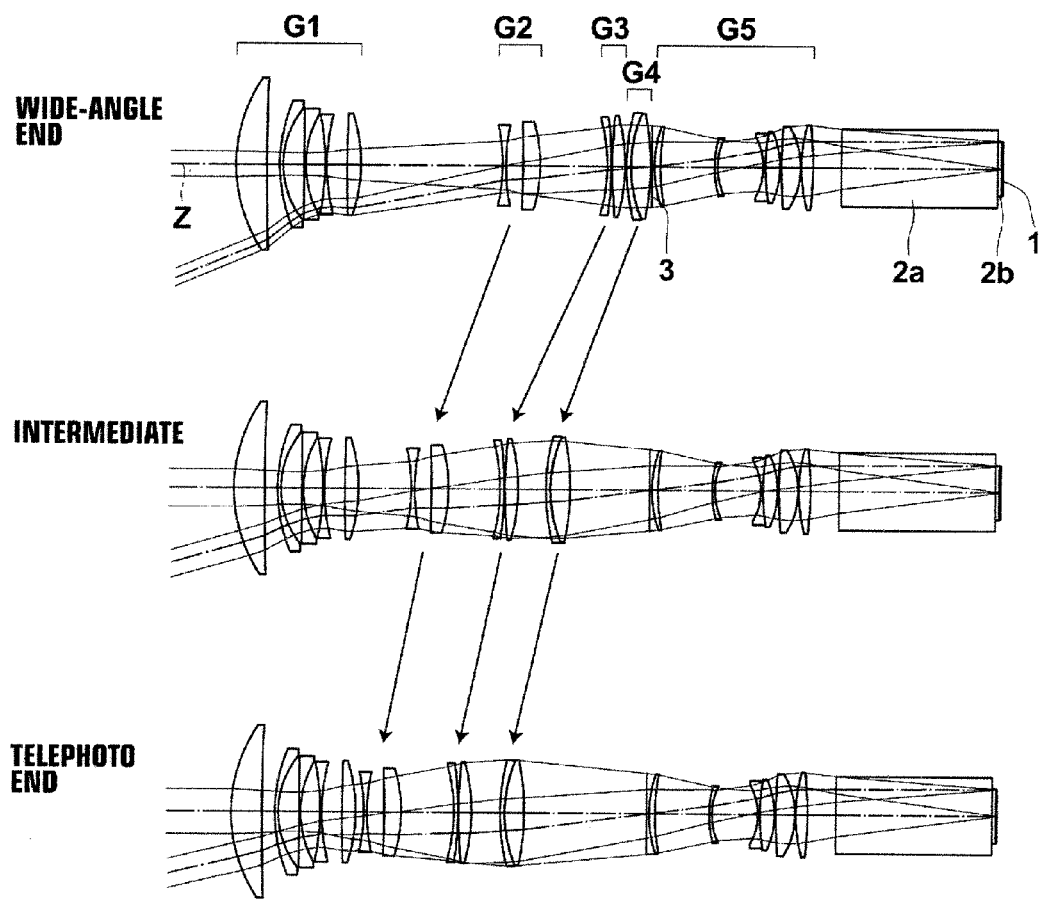
FIG. 4 is a diagram illustrating positions of lens groups and ray trajectories in different magnification positions of the variable-magnification projection optical system according to Example 2 of the invention.

FIGS. 3 and 4 show the lens configuration and ray trajectories at the wide-angle end of the variable-magnification projection optical system of Example 2, and positions of the lens groups and ray trajectories in different magnification positions of the variable-magnification projection optical system of Example 2, respectively. The configuration of the variable-magnification projection optical system according to Example 2 is substantially the same as that of the variable-magnification projection optical system according to Example 1, except that the fifth lens L5 of the first lens group G1 is formed by a biconvex lens, and the seventh lens L7 of the second lens group G2 is formed by a positive meniscus lens with the convex surface facing the reduction side.

Figure 32:
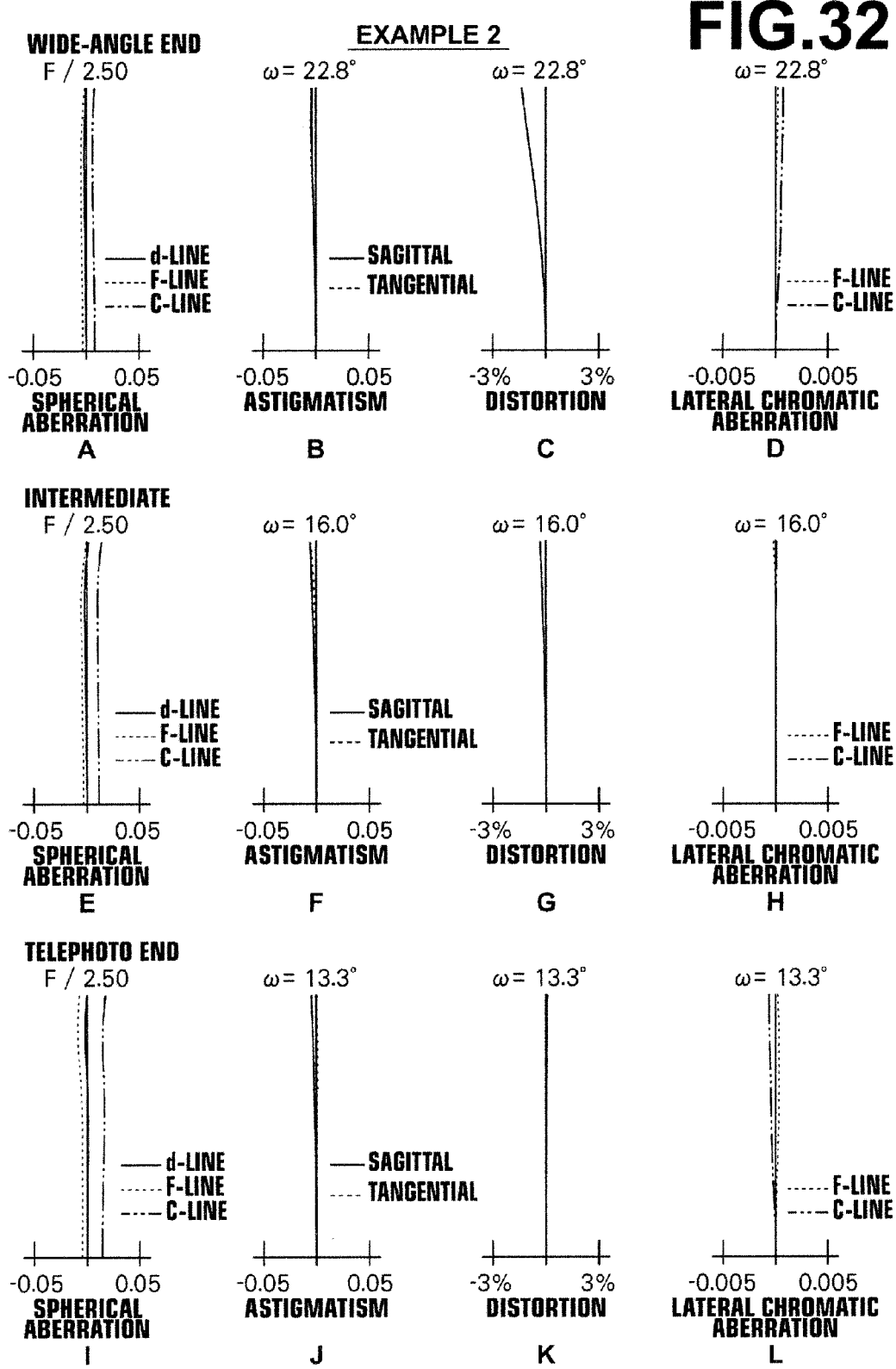
FIG. 32 shows, at A to L, aberration diagrams of the variable-magnification projection optical system according to Example 2 of the invention.

The f-number "Fno." and the total angle of view "2ω" of the variable-magnification projection optical system of Example 2 are shown above Table 2, the basic lens data is shown in the upper table of Table 2, and the values of the focal length of the entire system and the variable intervals at the wide-angle end, at the intermediate focal position and at the telephoto end are shown in the lower table of Table 2, respectively. Further, FIG. 32 shows, at A to L, aberration diagrams of the variable-magnification projection optical system of Example 2.

TABLE 2

Example 2
Fno. = 2.50, 2ω = 45.6° to 26.6°

| Si | Ri | Di | Ndj | νdj |
|---|---|---|---|---|
| 1 | 24.2600 | 4.7187 | 1.48749 | 70.23 |
| 2 | 340.5666 | 2.0335 | | |
| 3 | 25.4311 | 0.5175 | 1.49700 | 81.61 |
| 4 | 13.8459 | 3.2277 | | |
| 5 | ∞ | 0.2482 | 1.49700 | 81.61 |
| 6 | 15.8079 | 2.9984 | | |
| 7 | −38.0538 | 0.2484 | 1.80000 | 29.84 |
| 8 | 31.1538 | 3.0719 | | |
| 9 | 196.0048 | 2.1052 | 1.71736 | 29.52 |
| 10 | −25.9771 | (variable 1) | | |
| 11 | −26.4992 | 0.4857 | 1.58913 | 61.14 |
| 12 | 31.0597 | 2.6396 | | |
| 13 | −163.3827 | 2.5981 | 1.51742 | 52.43 |
| 14 | −23.1212 | (variable 2) | | |
| 15 | −27.1227 | 0.6624 | 1.74000 | 28.30 |
| 16 | −53.6491 | 0.0828 | | |
| 17 | 70.5615 | 2.0110 | 1.52249 | 59.84 |
| 18 | −29.3067 | (variable 3) | | |
| 19 | 33.4845 | 0.6728 | 1.83400 | 37.16 |
| 20 | 21.1184 | 0.0384 | | |
| 21 | 21.5587 | 2.9905 | 1.49700 | 81.61 |

TABLE 2-continued

Example 2
Fno. = 2.50, 2ω = 45.6° to 26.6°

| Si | Ri | Di | Ndj | νdj |
|---|---|---|---|---|
| 22 | −39.2959 | (variable 4) | | |
| 23 (stop) | ∞ | 0.4145 | | |
| 24 | 19.1797 | 0.9127 | 1.80518 | 25.42 |
| 25 | 33.2855 | 8.3432 | | |
| 26 | 17.6560 | 0.4140 | 1.83400 | 37.16 |
| 27 | 10.4495 | 6.9867 | | |
| 28 | −9.6692 | 0.3104 | 1.83481 | 42.71 |
| 29 | 33.7738 | 0.0102 | | |
| 30 | 34.5594 | 2.2749 | 1.49700 | 81.61 |
| 31 | −13.3615 | 0.2070 | | |
| 32 | 75.0517 | 2.9316 | 1.49700 | 81.61 |
| 33 | −12.2832 | 0.0824 | | |
| 34 | 24.5412 | 1.8522 | 1.49700 | 81.61 |
| 35 | −57.3297 | 4.3472 | | |
| 36 | ∞ | 24.1164 | 1.51633 | 64.14 |
| 37 | ∞ | 0.6210 | 1.50847 | 61.19 |
| 38 | ∞ | | | |

| | Focal length | (Variable 1) | (Variable 2) | (Variable 3) | (Variable 4) |
|---|---|---|---|---|---|
| Wide-angle | 10.00 | 21.8301 | 10.2715 | 0.2070 | 0.2068 |
| Intermediate | 14.47 | 8.0961 | 7.9584 | 4.2559 | 12.2050 |
| Telephoto | 17.45 | 1.2341 | 8.0965 | 4.4275 | 18.7573 |

Example 3

Figure 5:
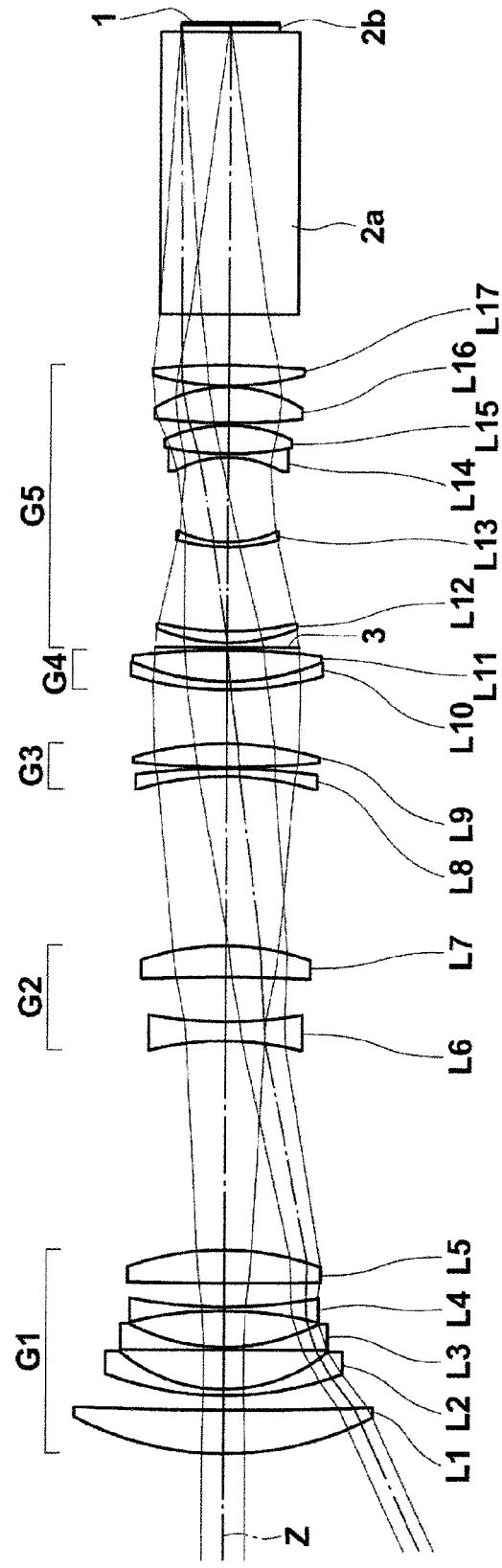
FIG. 5 is a sectional view illustrating the lens configuration and ray trajectories of a variable-magnification projection optical system according to Example 3 of the invention.
Figure 6:
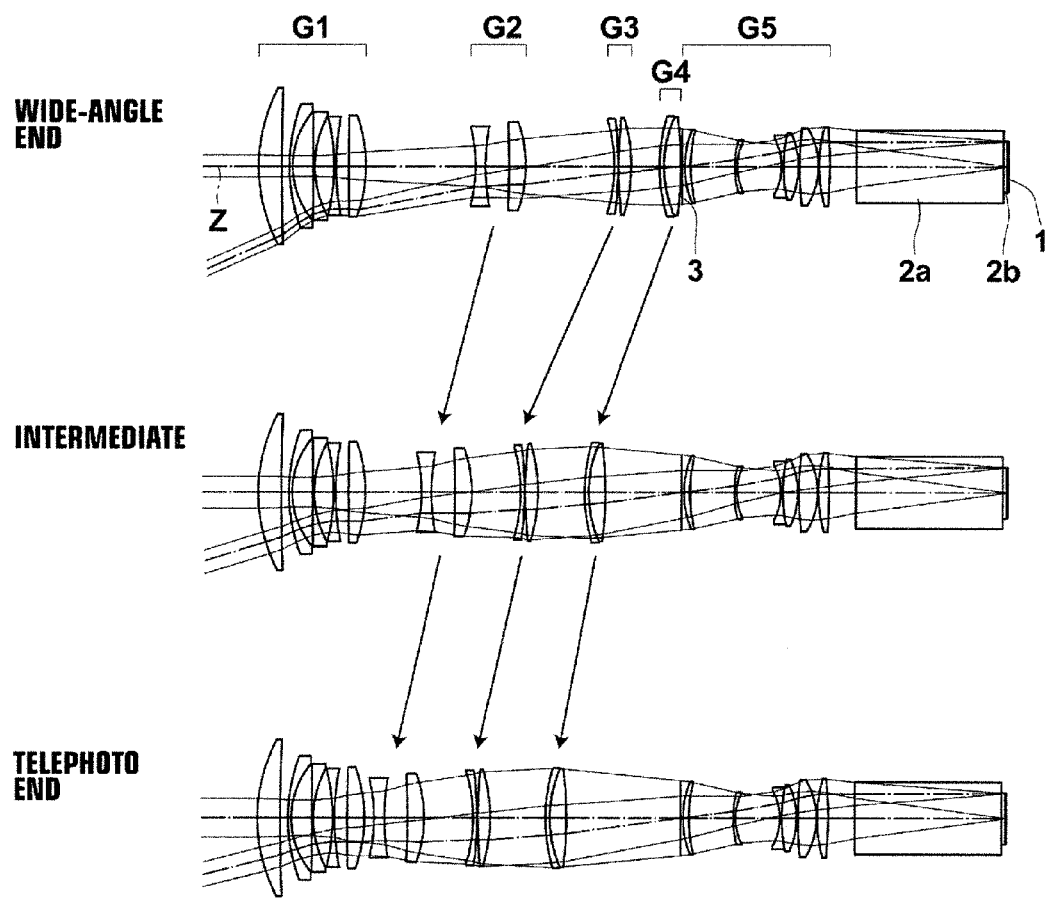
FIG. 6 is a diagram illustrating positions of lens groups and ray trajectories in different magnification positions of the variable-magnification projection optical system according to Example 3 of the invention.

FIGS. 5 and 6 show the lens configuration and ray trajectories at the wide-angle end of the variable-magnification projection optical system of Example 3, and positions of the lens groups and ray trajectories in different magnification positions of the variable-magnification projection optical system of Example 3, respectively. The configuration of the variable-magnification projection optical system according to Example 3 is substantially the same as that of the variable-magnification projection optical system according to Example 1, except that the fifth lens L5 of the first lens group G1 is formed by a biconvex lens, and the seventh lens L7 of the second lens group G2 is formed by a positive meniscus lens with the convex surface facing the reduction side.

Figure 33:
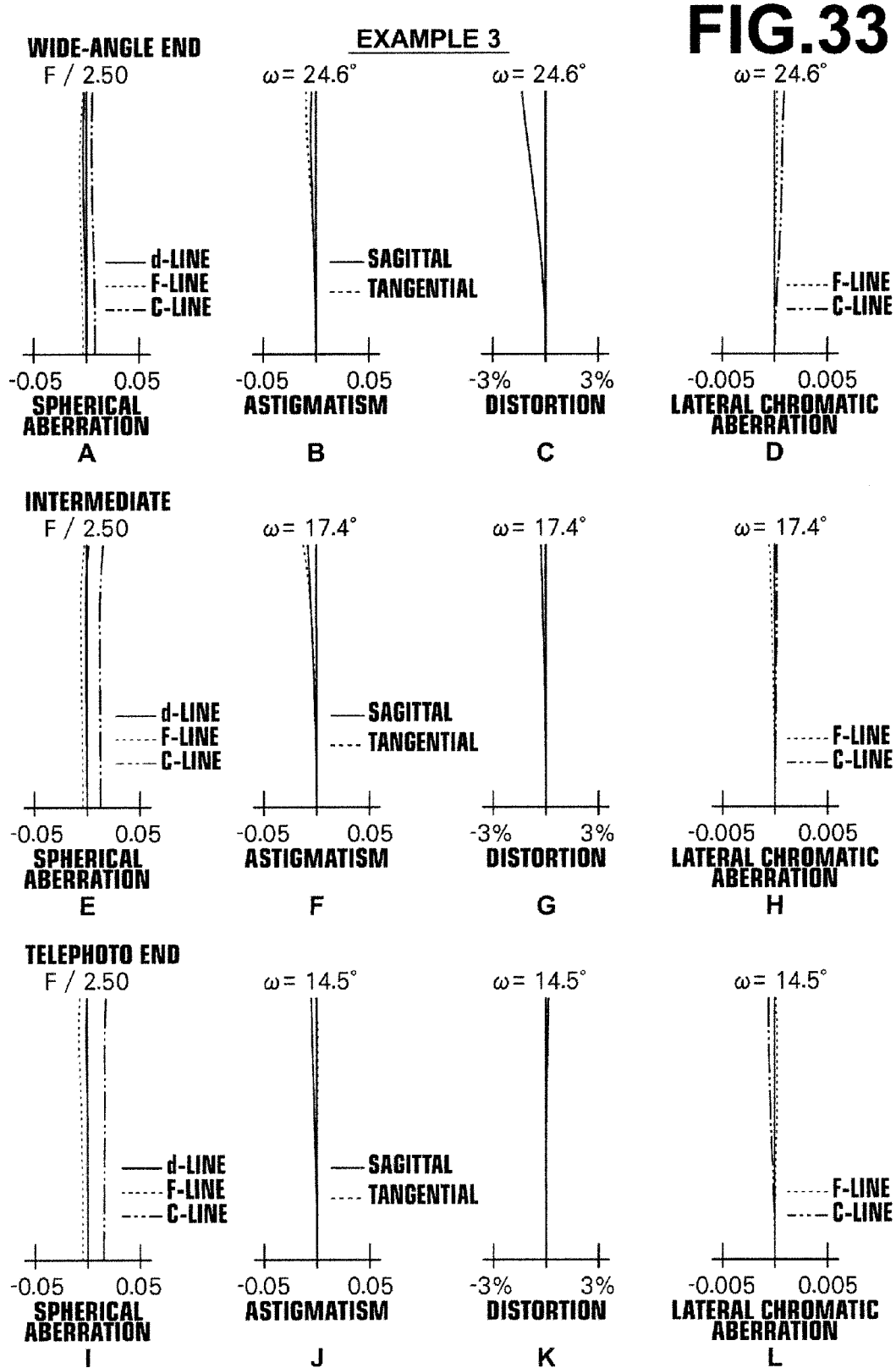
FIG. 33 shows, at A to L, aberration diagrams of the variable-magnification projection optical system according to Example 3 of the invention.

The f-number "Fno." and the total angle of view "2ω" of the variable-magnification projection optical system of Example 3 are shown above Table 3, the basic lens data is shown in the upper table of Table 3, and the values of the focal length of the entire system and the variable intervals at the wide-angle end, at the intermediate focal position and at the telephoto end are shown in the lower table of Table 3, respectively. Further, FIG. 33 shows, at A to L, aberration diagrams of the variable-magnification projection optical system of Example 3.

TABLE 3

Example 3
Fno. = 2.50, 2ω = 49.2° to 29.0°

| Si | Ri | Di | Ndj | νdj |
|---|---|---|---|---|
| 1 | 30.5719 | 4.0949 | 1.48749 | 70.23 |
| 2 | 366.5598 | 1.3692 | | |
| 3 | 31.9920 | 0.5650 | 1.49700 | 81.61 |
| 4 | 15.2357 | 3.6863 | | |
| 5 | ∞ | 0.2713 | 1.49700 | 81.61 |
| 6 | 18.9551 | 3.4060 | | |
| 7 | −37.8057 | 0.3524 | 1.80000 | 29.84 |
| 8 | 47.3831 | 2.2292 | | |
| 9 | 491.1618 | 3.1212 | 1.71736 | 29.52 |
| 10 | −26.4287 | (variable 1) | | |
| 11 | −28.7667 | 1.8081 | 1.58913 | 61.14 |
| 12 | 41.2062 | 4.1904 | | |
| 13 | −154.6014 | 2.9101 | 1.51742 | 52.43 |
| 14 | −23.4983 | (variable 2) | | |
| 15 | −28.4019 | 0.7232 | 1.74000 | 28.30 |
| 16 | −62.5855 | 0.0904 | | |
| 17 | 83.7273 | 2.2434 | 1.52249 | 59.84 |
| 18 | −29.9507 | (variable 3) | | |
| 19 | 32.5365 | 0.7345 | 1.83400 | 37.16 |
| 20 | 22.4006 | 0.0380 | | |
| 21 | 22.8149 | 2.9376 | 1.49700 | 81.61 |
| 22 | −71.4494 | (variable 4) | | |
| 23 (stop) | ∞ | 0.4520 | | |
| 24 | 17.3899 | 1.0430 | 1.80518 | 25.42 |
| 25 | 27.8819 | 7.8781 | | |
| 26 | 17.7725 | 0.4520 | 1.83400 | 37.16 |
| 27 | 10.6152 | 7.9073 | | |
| 28 | −10.2014 | 0.3391 | 1.83481 | 42.71 |
| 29 | 30.5797 | 0.0112 | | |
| 30 | 31.1813 | 2.6386 | 1.49700 | 81.61 |
| 31 | −14.1901 | 0.2260 | | |
| 32 | 69.4417 | 3.3776 | 1.49700 | 81.61 |
| 33 | −12.8988 | 0.0903 | | |
| 34 | 26.5995 | 1.9313 | 1.49700 | 81.61 |
| 35 | −79.7029 | 4.7462 | | |
| 36 | ∞ | 26.3302 | 1.51633 | 64.14 |
| 37 | ∞ | 0.6780 | 1.50847 | 61.19 |
| 38 | ∞ | | | |

| | Focal length | (Variable 1) | (Variable 2) | (Variable 3) | (Variable 4) |
|---|---|---|---|---|---|
| Wide-angle | 10.00 | 19.5273 | 15.8089 | 5.0358 | 0.2255 |
| Intermediate | 14.48 | 10.0256 | 8.7056 | 8.3965 | 13.4697 |
| Telephoto | 17.46 | 1.7498 | 8.7251 | 9.8397 | 20.2828 |

Example 4

Figure 7:
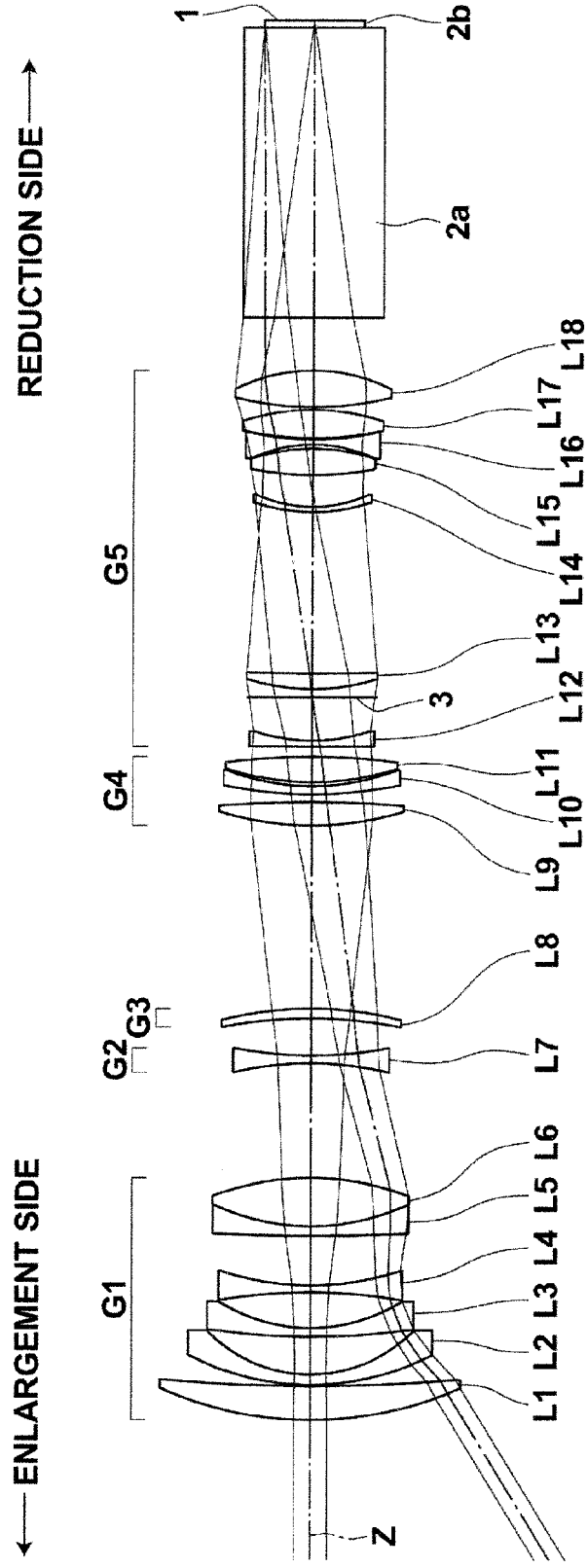
FIG. 7 is a sectional view illustrating the lens configuration and ray trajectories of a variable-magnification projection optical system according to Example 4 of the invention.
Figure 8:
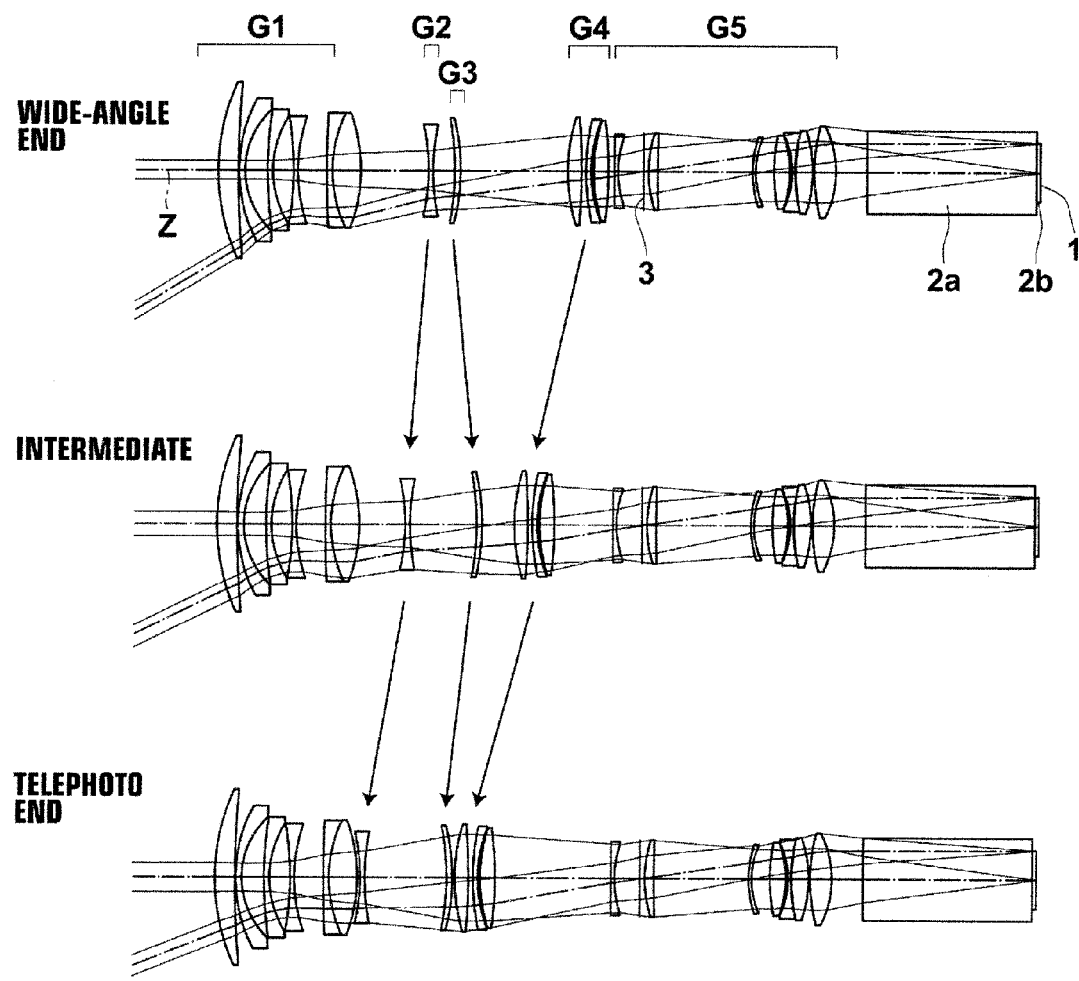
FIG. 8 is a diagram illustrating positions of lens groups and ray trajectories in different magnification positions of the variable-magnification projection optical system according to Example 4 of the invention.

FIGS. 7 and 8 show the lens configuration and ray trajectories at the wide-angle end of the variable-magnification projection optical system of Example 4, and positions of the lens groups and ray trajectories in different magnification positions of the variable-magnification projection optical system of Example 4, respectively. The symbol (positive or negative) of the refractive power of each of the first to the fifth lens groups G1 to G5, the lens groups that are fixed during magnification change, and the lens groups that are moved during magnification change of the variable-magnification projection optical system according to Example 4 are the same as those of the variable-magnification projection optical system according to Example 1. The variable-magnification projection optical system of Example 4 differs from the variable-magnification projection optical system of Example 1 in that the lens groups of the variable-magnification projection optical system of Example 4 have the following lens configurations.

The first lens group G1 includes, in order from the enlargement side, a first lens L1 formed by a positive meniscus lens with the convex surface facing the enlargement side, a second lens L2 formed by a negative meniscus lens with the concave surface facing the reduction side, a third lens L3 formed by a negative meniscus lens with the concave surface facing the reduction side, a fourth lens L4 formed by a biconcave lens, a fifth lens L5 formed by a negative meniscus lens with the convex surface facing the enlargement side, and a sixth lens L6 formed by a biconvex lens. The fifth lens L5 and the sixth lens L6 are cemented together.

The second lens group G2 includes a seventh lens L7 formed by a biconcave lens. The third lens group G3 includes an eighth lens L8 formed by a positive meniscus lens with the convex surface facing the reduction side. The fourth lens group G4 includes, in order from the enlargement side, a ninth lens L9 formed by a biconvex lens, a tenth lens L10 formed by a negative meniscus lens with the convex surface facing the enlargement side, and an eleventh lens L11 formed by a biconvex lens.

The fifth lens group G5 includes, in order from the enlargement side, a twelfth lens L12 formed by a negative meniscus lens with the convex surface facing the enlargement side, the stop (including an aperture and a variable stop) 3, a thirteenth lens L13 formed by a positive meniscus lens with the convex surface facing the enlargement side, a fourteenth lens L14 formed by a negative meniscus lens with the convex surface facing the enlargement side, a fifteenth lens L15 formed by a biconvex lens, a sixteenth lens L16 formed by a biconcave lens, a seventeenth lens L17 formed by a biconvex lens, and an eighteenth lens L18 formed by a biconvex lens.

In the variable-magnification projection optical system of Example 4, all the lenses on the reduction side of the first lens group G1 are formed by single lenses without using a cemented lens. Further, all the lens surfaces are spherical surfaces and no aspherical surface is used. This is advantageous in view of costs.

Figure 34:
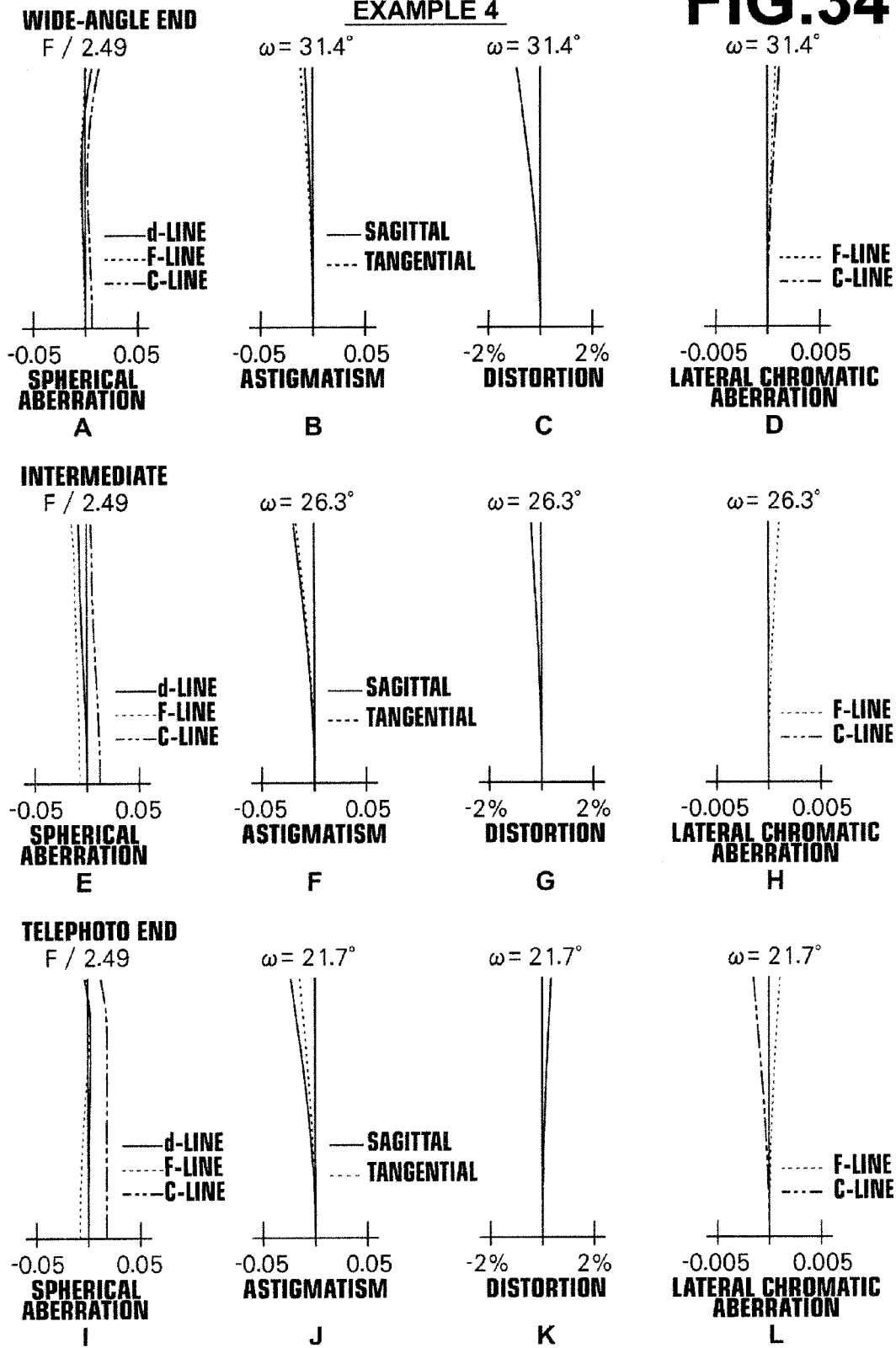
FIG. 34 shows, at A to L, aberration diagrams of the variable-magnification projection optical system according to Example 4 of the invention.

The f-number "Fno." and the total angle of view "2ω" of the variable-magnification projection optical system of Example 4 are shown above Table 4, the basic lens data is shown in the upper table of Table 4, and the values of the focal length of the entire system and the variable intervals at the wide-angle end, at the intermediate focal position and at the telephoto end are shown in the lower table of Table 4, respectively. Further, FIG. 34 shows, at A to L, aberration diagrams of the variable-magnification projection optical system of Example 4.

TABLE 4

Example 4
Fno. = 2.49, 2ω = 62.8° to 43.4°

| Si | Ri | Di | Ndj | νdj |
|---|---|---|---|---|
| 1 | 44.6090 | 4.1518 | 1.51633 | 64.14 |
| 2 | 205.8109 | 0.1514 | | |
| 3 | 31.8049 | 1.2719 | 1.71300 | 53.87 |
| 4 | 17.5005 | 4.6255 | | |
| 5 | 84.8909 | 1.0902 | 1.61800 | 63.33 |
| 6 | 21.0943 | 4.3438 | | |
| 7 | −64.9333 | 0.8479 | 1.77250 | 49.60 |
| 8 | 35.0921 | 6.0713 | | |
| 9 | 257.4667 | 1.1568 | 1.62588 | 35.70 |
| 10 | 27.8784 | 5.8884 | 1.74320 | 49.34 |
| 11 | −34.1683 | (variable 1) | | |
| 12 | −41.2069 | 0.9388 | 1.48749 | 70.23 |
| 13 | 49.3014 | (variable 2) | | |
| 14 | −56.2615 | 1.2113 | 1.60342 | 38.03 |
| 15 | −43.6332 | (variable 3) | | |
| 16 | 38.5260 | 2.8749 | 1.48749 | 70.23 |
| 17 | −139.5180 | 0.9084 | | |
| 18 | 51.4520 | 1.0205 | 1.80518 | 25.42 |
| 19 | 28.8501 | 0.4856 | | |
| 20 | 34.2926 | 3.0963 | 1.48749 | 70.23 |
| 21 | −81.4870 | (variable 4) | | |
| 22 | 1480.2720 | 0.7571 | 1.61800 | 63.33 |
| 23 | 22.3263 | 5.2903 | | |
| 24 (stop) | ∞ | 1.0107 | | |
| 25 | 26.6157 | 1.8762 | 1.75520 | 27.51 |
| 26 | 278.8295 | 19.7493 | | |
| 27 | 22.6656 | 0.6057 | 1.80400 | 46.57 |
| 28 | 16.8399 | 3.8491 | | |
| 29 | 40.0569 | 3.2467 | 1.49700 | 81.54 |
| 30 | −23.1167 | 0.4821 | | |
| 31 | −17.6750 | 0.5936 | 1.83400 | 37.16 |
| 32 | 34.2588 | 0.1517 | | |
| 33 | 39.7228 | 3.4865 | 1.49700 | 81.54 |
| 34 | −27.1199 | 0.3025 | | |
| 35 | 38.4529 | 4.4873 | 1.49700 | 81.54 |
| 36 | −21.1982 | 6.4763 | | |
| 37 | ∞ | 35.2799 | 1.51633 | 64.14 |
| 38 | ∞ | 0.9085 | 1.50847 | 61.19 |
| 39 | ∞ | | | |

| | Focal length | (Variable 1) | (Variable 2) | (Variable 3) | (Variable 4) |
|---|---|---|---|---|---|
| Wide-angle | 10.00 | 14.0090 | 4.5432 | 22.3053 | 1.2112 |
| Intermediate | 12.31 | 9.5536 | 13.8208 | 6.6203 | 12.0740 |
| Telephoto | 15.16 | 0.6442 | 16.9588 | 0.4538 | 24.0119 |

Example 5

Figure 9:
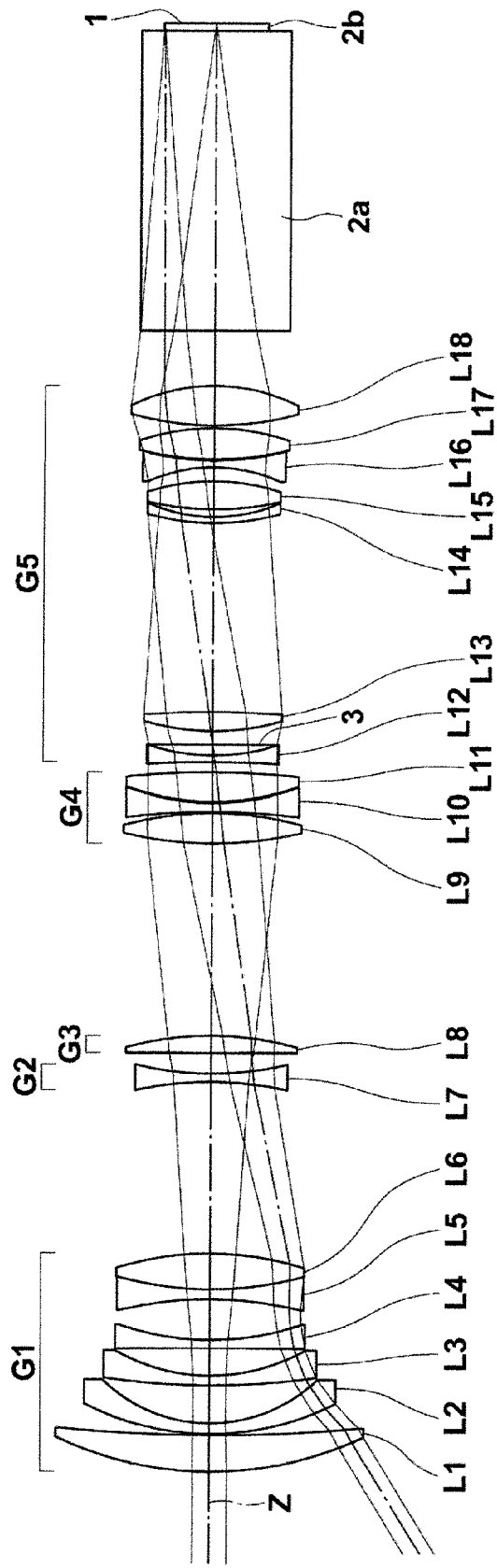
FIG. 9 is a sectional view illustrating the lens configuration and ray trajectories of a variable-magnification projection optical system according to Example 5 of the invention.
Figure 10:
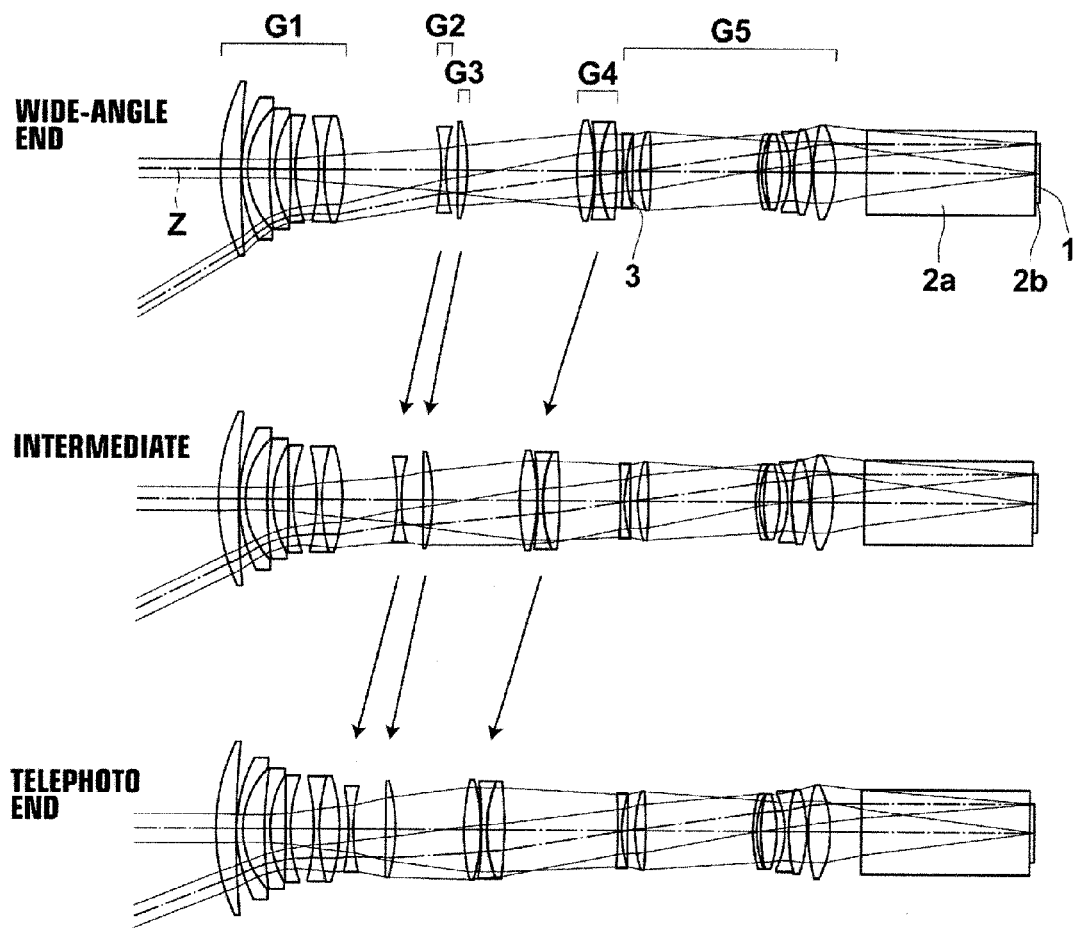
FIG. 10 is a diagram illustrating positions of lens groups and ray trajectories in different magnification positions of the variable-magnification projection optical system according to Example 5 of the invention.

FIGS. 9 and 10 show the lens configuration and ray trajectories at the wide-angle end of the variable-magnification projection optical system of Example 5, and positions of the lens groups and ray trajectories in different magnification positions of the variable-magnification projection optical system of Example 5, respectively. The configuration of the variable-magnification projection optical system according to Example 5 is substantially the same as that of the variable-magnification projection optical system according to Example 4, except that the fifth lens L5 of the first lens group G1 is formed by a biconcave lens, the eighth lens L8 of the third lens group G3 is formed by a biconvex lens, the tenth lens L10 of the fourth lens group G4 is formed by a biconcave lens, the twelfth lens L12 of the fifth lens group G5 is formed by a biconcave lens, and the thirteenth lens L13 of the fifth lens group G5 is formed by a biconvex lens.

Figure 35:
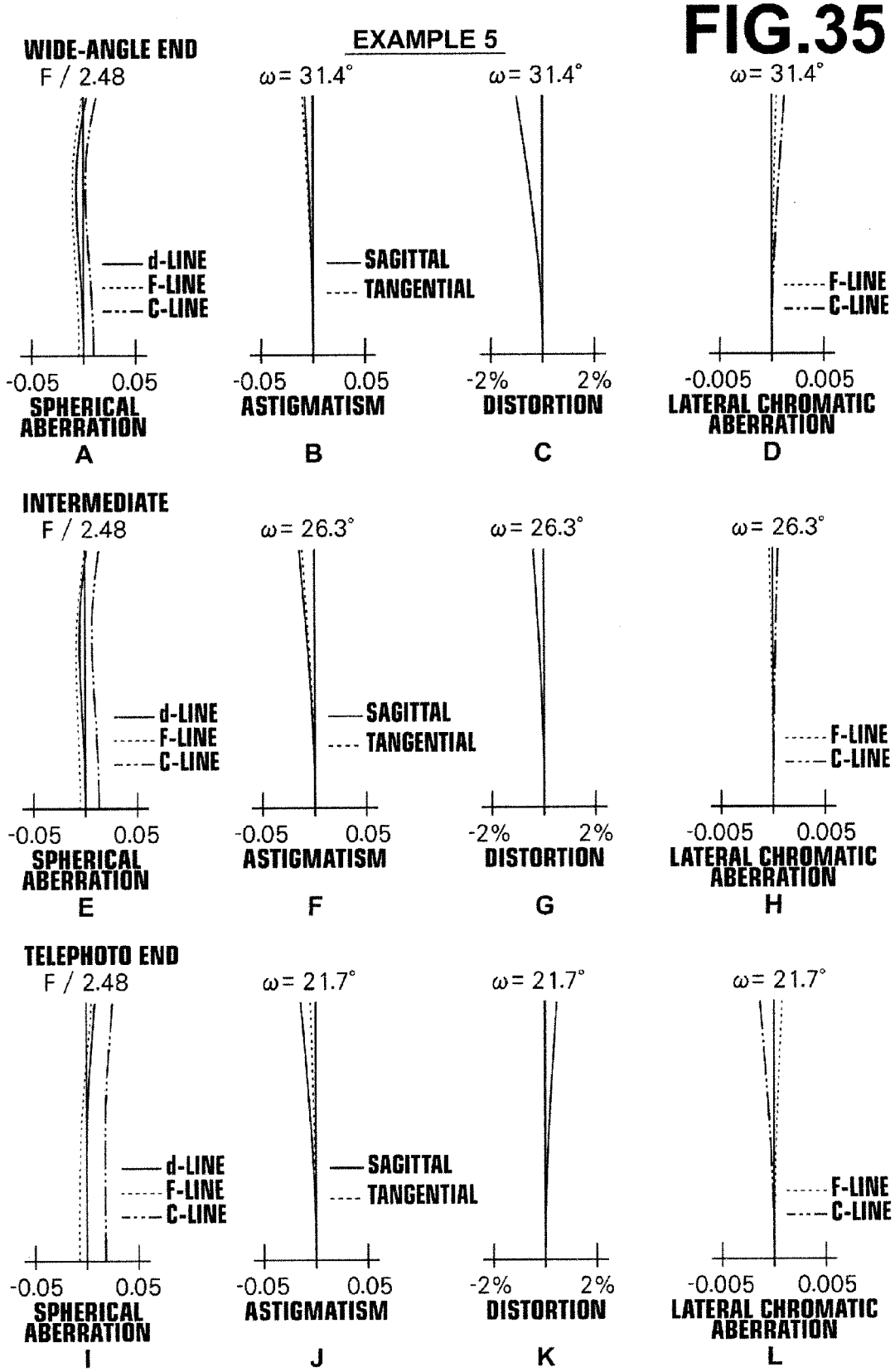
FIG. 35 shows, at A to L, aberration diagrams of the variable-magnification projection optical system according to Example 5 of the invention.

The f-number "Fno." and the total angle of view "2ω" of the variable-magnification projection optical system of Example 5 are shown above Table 5, the basic lens data is shown in the upper table of Table 5, and the values of the focal length of the entire system and the variable intervals at the wide-angle end, at the intermediate focal position and at the telephoto end are shown in the lower table of Table 5, respectively. Further, FIG. 35 shows, at A to L, aberration diagrams of the variable-magnification projection optical system of Example 5.

TABLE 5

Example 5
Fno. = 2.48, 2ω = 62.8° to 43.4°

| Si | Ri | Di | Ndj | νdj |
|---|---|---|---|---|
| 1 | 42.5017 | 4.2988 | 1.51633 | 64.14 |
| 2 | 187.0723 | 0.1514 | | |
| 3 | 32.2705 | 1.2720 | 1.71300 | 53.87 |
| 4 | 18.2209 | 4.4855 | | |
| 5 | 87.7631 | 1.1508 | 1.61800 | 63.33 |
| 6 | 22.7541 | 3.2552 | | |
| 7 | −1364.2849 | 0.9691 | 1.80518 | 25.42 |
| 8 | 32.8880 | 4.8142 | | |
| 9 | −43.8508 | 1.1508 | 1.62299 | 58.16 |
| 10 | 41.3549 | 4.2464 | 1.78590 | 44.20 |
| 11 | −36.7718 | (variable 1) | | |
| 12 | −41.2529 | 0.9389 | 1.49700 | 81.54 |
| 13 | 36.1369 | (variable 2) | | |

TABLE 5-continued

Example 5
Fno. = 2.48, 2ω = 62.8° to 43.4°

| | | | | |
|---|---|---|---|---|
| 14 | 4148.8695 | 2.0172 | 1.56732 | 42.82 |
| 15 | −37.4794 | (variable 3) | | |
| 16 | 44.8317 | 3.5723 | 1.48749 | 70.23 |
| 17 | −40.0222 | 0.1514 | | |
| 18 | −82.5462 | 1.0206 | 1.64769 | 33.79 |
| 19 | 27.8924 | 0.1514 | | |
| 20 | 29.9056 | 3.4766 | 1.63854 | 55.38 |
| 21 | −96.4925 | (variable 4) | | |
| 22 | −131.4182 | 0.7571 | 1.61800 | 63.33 |
| 23 | 23.6253 | 1.2899 | | |
| 24 (stop) | ∞ | 1.5969 | | |
| 25 | 28.3701 | 2.2272 | 1.71736 | 29.52 |
| 26 | −119.3088 | 22.2961 | | |
| 27 | 28.7690 | 0.7571 | 1.80610 | 40.92 |
| 28 | 19.4916 | 0.8900 | | |
| 29 | 36.2914 | 3.2853 | 1.49700 | 81.54 |
| 30 | −25.3192 | 1.6682 | | |
| 31 | −18.6130 | 0.7571 | 1.83400 | 37.16 |
| 32 | 32.7187 | 0.1514 | | |
| 33 | 37.2398 | 3.6659 | 1.49700 | 81.54 |
| 34 | −26.7447 | 0.3029 | | |
| 35 | 36.8106 | 4.6967 | 1.49700 | 81.54 |
| 36 | −21.8000 | 6.4799 | | |
| 37 | ∞ | 35.2824 | 1.51633 | 64.14 |
| 38 | ∞ | 0.9086 | 1.50847 | 61.19 |
| 39 | ∞ | | | |

| | Focal length | (Variable 1) | (Variable 2) | (Variable 3) | (Variable 4) |
|---|---|---|---|---|---|
| Wide-angle | 10.00 | 20.2354 | 2.4923 | 22.6972 | 1.2114 |
| Intermediate | 12.31 | 11.3766 | 4.5220 | 18.0744 | 12.6634 |
| Telephoto | 15.16 | 1.8835 | 6.8056 | 14.2808 | 23.6666 |

Example 6

Figure 11:
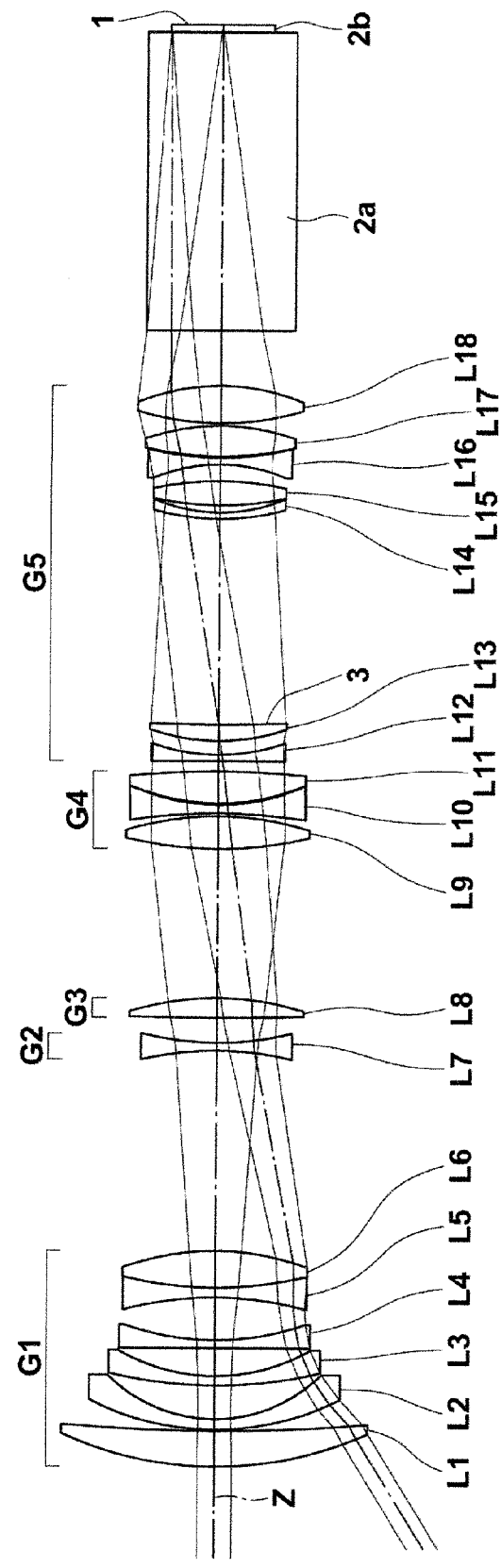
FIG. 11 is a sectional view illustrating the lens configuration and ray trajectories of a variable-magnification projection optical system according to Example 6 of the invention.
Figure 12:
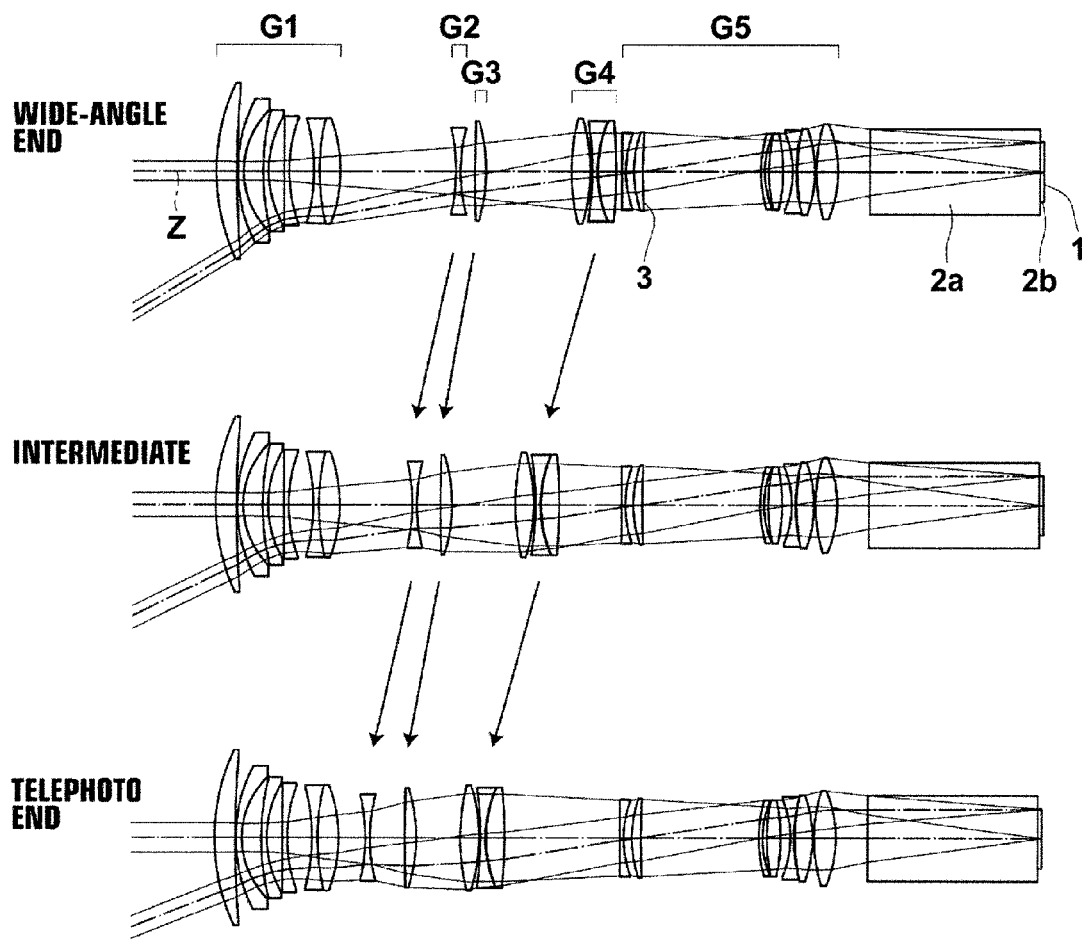
FIG. 12 is a diagram illustrating positions of lens groups and ray trajectories in different magnification positions of the variable-magnification projection optical system according to Example 6 of the invention.

FIGS. 11 and 12 show the lens configuration and ray trajectories at the wide-angle end of the variable-magnification projection optical system of Example 6, and positions of the lens groups and ray trajectories in different magnification positions of the variable-magnification projection optical system of Example 6, respectively. The configuration of the variable-magnification projection optical system according to Example 6 is substantially the same as that of the variable-magnification projection optical system according to Example 4, except that the fourth lens L4 of the first lens group G1 is formed by a plano-concave lens with the planer surface facing the enlargement side, the fifth lens L5 of the first lens group G1 is formed by a biconcave lens, the eighth lens L8 of the third lens group G3 is formed by a biconvex lens, the tenth lens L10 of the fourth lens group G4 is formed by a biconcave lens, the twelfth lens L12 of the fifth lens group G5 is formed by a plano-concave lens with the planer surface facing the enlargement side, and the stop 3 is disposed on the reduction-side surface of the thirteenth lens L13.

Figure 36:
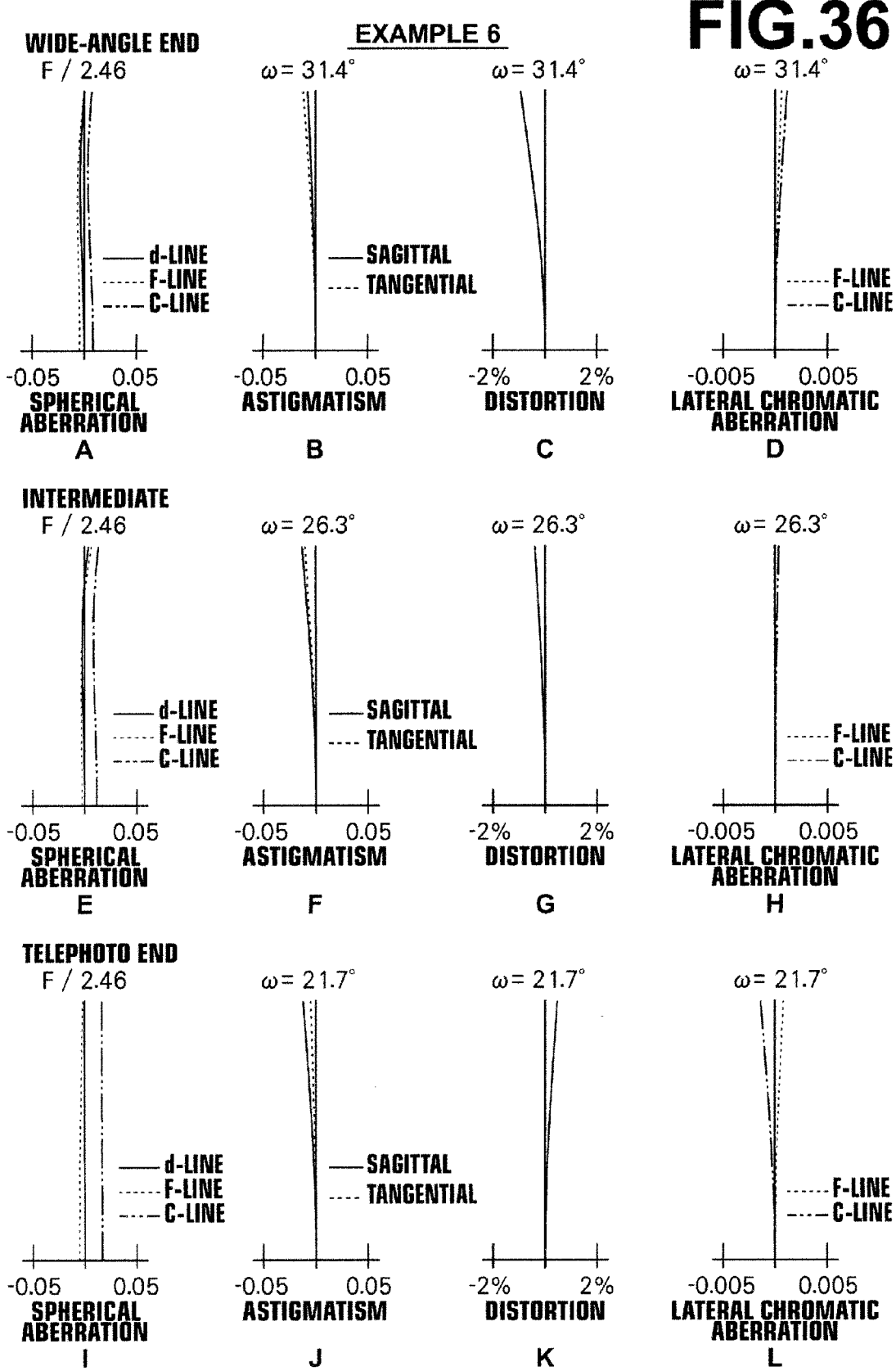
FIG. 36 shows, at A to L, aberration diagrams of the variable-magnification projection optical system according to Example 6 of the invention.

The f-number "Fno." and the total angle of view "2ω" of the variable-magnification projection optical system of Example 6 are shown above Table 6, the basic lens data is shown in the upper table of Table 6, and the values of the focal length of the entire system and the variable intervals at the wide-angle end, at the intermediate focal position and at the telephoto end are shown in the lower table of Table 6, respectively. Further, FIG. 36 shows, at A to L, aberration diagrams of the variable-magnification projection optical system of Example 6.

TABLE 6

Example 6
Fno. = 2.46, 2ω = 62.8° to 43.4°

| Si | Ri | Di | Ndj | νdj |
|---|---|---|---|---|
| 1 | 44.1363 | 4.2172 | 1.48749 | 70.23 |
| 2 | 210.2475 | 0.1514 | | |
| 3 | 32.3507 | 1.2718 | 1.71300 | 53.87 |
| 4 | 17.8497 | 3.9714 | | |
| 5 | 51.9764 | 1.1507 | 1.61800 | 63.33 |
| 6 | 22.6570 | 3.2949 | | |
| 7 | ∞ | 0.9690 | 1.80518 | 25.42 |
| 8 | 32.0860 | 5.06955 | | |
| 9 | −40.3252 | 1.1507 | 1.49700 | 81.54 |
| 10 | 45.4084 | 4.3719 | 1.56732 | 42.82 |
| 11 | −31.3197 | (variable 1) | | |
| 12 | −38.8168 | 0.9387 | 1.49700 | 81.54 |
| 13 | 36.0398 | (variable 2) | | |
| 14 | 409.5495 | 2.3266 | 1.51633 | 64.14 |
| 15 | −34.8947 | (variable 3) | | |
| 16 | 45.7200 | 3.8823 | 1.48749 | 70.23 |
| 17 | −36.8140 | 0.3301 | | |
| 18 | −69.6730 | 1.0205 | 1.60342 | 38.03 |
| 19 | 25.4405 | 0.1502 | | |
| 20 | 26.9583 | 3.7572 | 1.62041 | 60.29 |
| 21 | −108.7469 | (variable 4) | | |
| 22 | ∞ | 0.7570 | 1.61800 | 63.33 |
| 23 | 23.0494 | 1.6611 | | |
| 24 | 25.1282 | 1.9273 | 1.76182 | 26.52 |
| 25 (stop) | 204.5487 | 24.3704 | | |
| 26 | 28.5168 | 0.7570 | 1.83400 | 37.16 |
| 27 | 20.0685 | 0.8560 | | |
| 28 | 37.2483 | 2.8562 | 1.49700 | 81.54 |
| 29 | −37.2491 | 1.9760 | | |
| 30 | −20.0979 | 0.7570 | 1.74950 | 35.33 |
| 31 | 34.9883 | 0.1718 | | |
| 32 | 40.9108 | 3.6193 | 1.49700 | 81.54 |
| 33 | −26.6298 | 0.3023 | | |
| 34 | 34.1487 | 4.4594 | 1.49700 | 81.54 |
| 35 | −25.1862 | 6.4770 | | |
| 36 | ∞ | 35.2779 | 1.51633 | 64.14 |
| 37 | ∞ | 0.9084 | 1.50847 | 61.19 |
| 38 | ∞ | | | |

| | Focal length | (Variable 1) | (Variable 2) | (Variable 3) | (Variable 4) |
|---|---|---|---|---|---|
| Wide-angle | 10.00 | 23.7279 | 2.9786 | 17.6719 | 1.2111 |
| Intermediate | 12.31 | 14.8699 | 4.9202 | 13.0477 | 12.7517 |
| Telephoto | 15.16 | 5.5626 | 7.1188 | 9.0321 | 23.8760 |

Example 7

Figure 13:
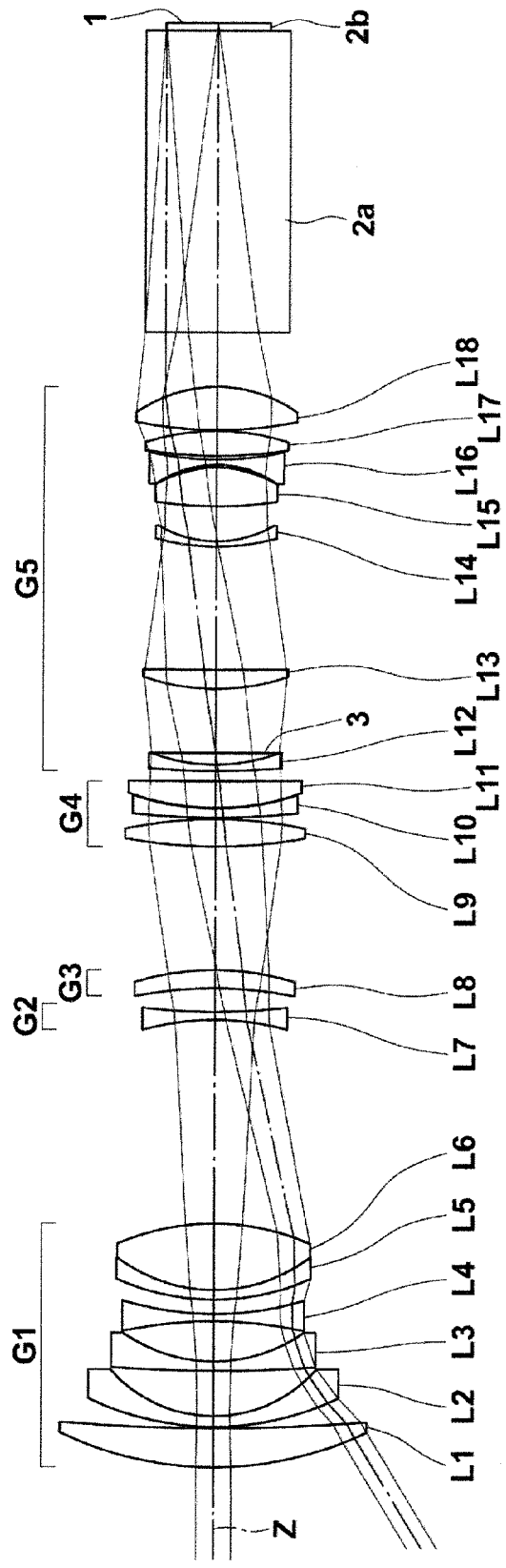
FIG. 13 is a sectional view illustrating the lens configuration and ray trajectories of a variable-magnification projection optical system according to Example 7 of the invention.
Figure 14:
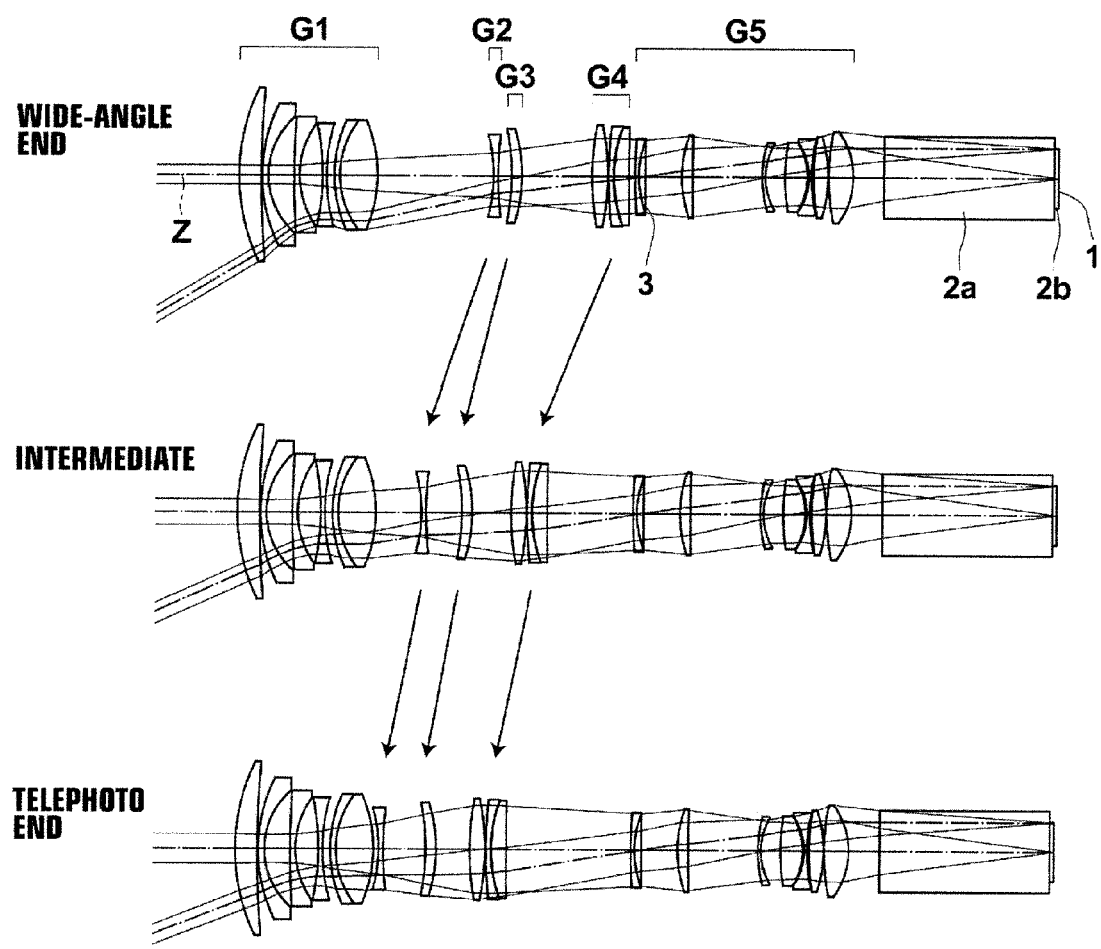
FIG. 14 is a diagram illustrating positions of lens groups and ray trajectories in different magnification positions of the variable-magnification projection optical system according to Example 7 of the invention.

FIGS. 13 and 14 show the lens configuration and ray trajectories at the wide-angle end of the variable-magnification projection optical system of Example 7, and positions of the lens groups and ray trajectories in different magnification positions of the variable-magnification projection optical system of Example 7, respectively. The configuration of the variable-magnification projection optical system according to Example 7 is substantially the same as that of the variable-magnification projection optical system according to Example 4, except that the eleventh lens L11 of the fourth lens group G4 is formed by a positive meniscus lens with the convex surface facing the enlargement side.

Figure 37:
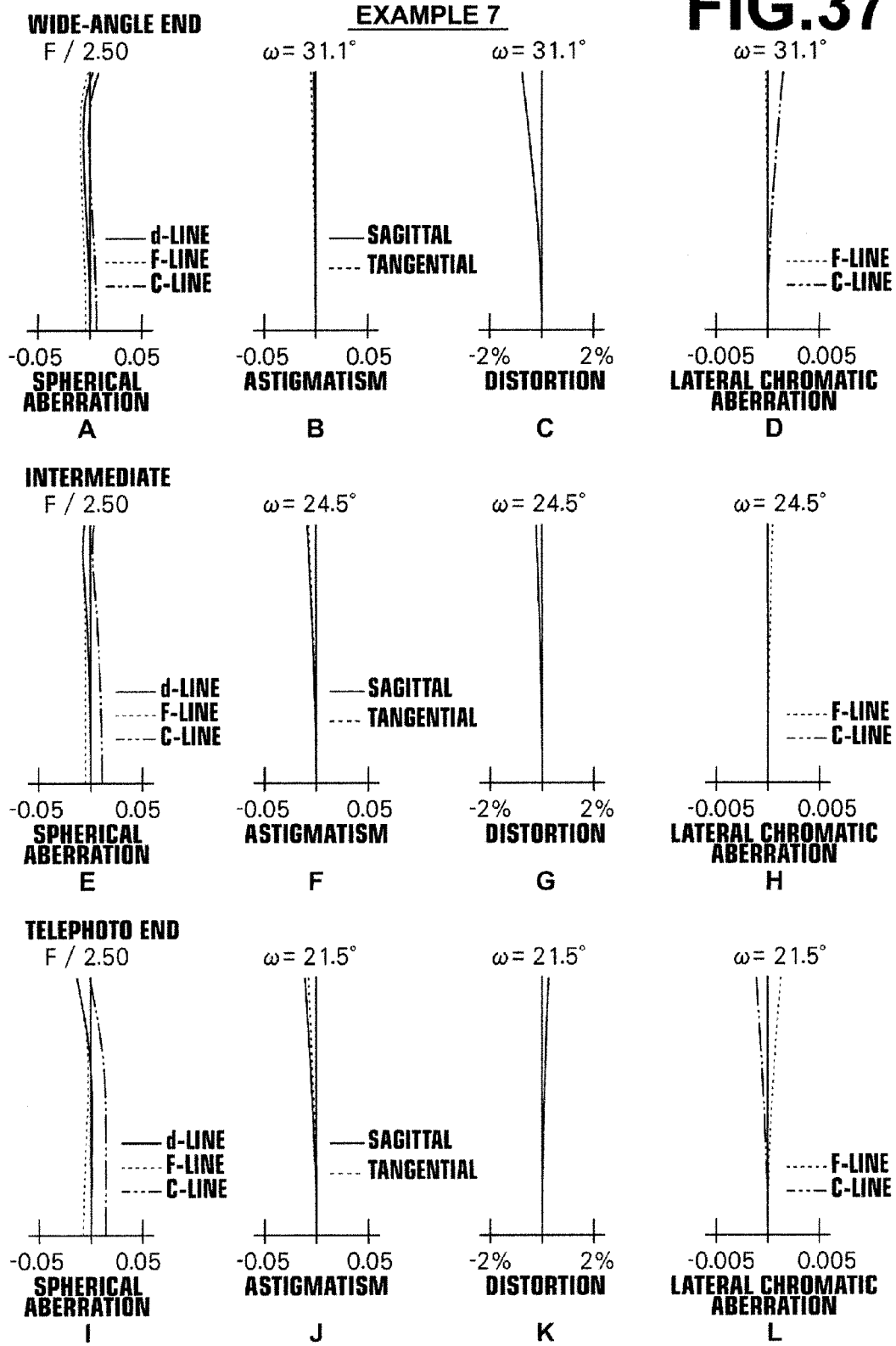
FIG. 37 shows, at A to L, aberration diagrams of the variable-magnification projection optical system according to Example 7 of the invention.

The f-number "Fno." and the total angle of view "2ω" of the variable-magnification projection optical system of Example 7 are shown above Table 7, the basic lens data is shown in the upper table of Table 7, and the values of the focal length of the entire system and the variable intervals at the wide-angle end, at the intermediate focal position and at the telephoto end are shown in the lower table of Table 7, respectively. Further, FIG. 37 shows, at A to L, aberration diagrams of the variable-magnification projection optical system of Example 7.

TABLE 7

Example 7
Fno. = 2.50, 2ω = 62.2° to 43.0°

| Si | Ri | Di | Ndj | νdj |
|---|---|---|---|---|
| 1 | 40.7791 | 4.5573 | 1.48749 | 70.23 |
| 2 | 216.2678 | 0.1497 | | |
| 3 | 33.0429 | 1.2576 | 1.61800 | 63.33 |
| 4 | 15.871 | 5.2943 | | |
| 5 | 167.7705 | 1.0779 | 1.61800 | 63.33 |
| 6 | 18.2551 | 4.6726 | | |
| 7 | −48.459 | 0.8384 | 1.77250 | 49.60 |
| 8 | 36.4235 | 1.64133 | | |
| 9 | 27.0783 | 1.1438 | 1.80518 | 25.42 |
| 10 | 18.4794 | 7.7009 | 1.56732 | 42.82 |
| 11 | −27.8512 | (variable 1) | | |
| 12 | −31.5151 | 0.9282 | 1.56384 | 60.67 |
| 13 | 69.1095 | (variable 2) | | |
| 14 | −46.9436 | 2.1153 | 1.51742 | 52.43 |
| 15 | −31.6058 | (variable 3) | | |
| 16 | 56.6095 | 3.1720 | 1.49700 | 81.61 |
| 17 | −49.1548 | 0.1465 | | |
| 18 | 88.8389 | 1.0091 | 1.75520 | 27.51 |
| 19 | 28.6964 | 0.0984 | | |
| 20 | 30.0492 | 3.0710 | 1.74320 | 49.34 |
| 21 | 1044.9703 | (variable 4) | | |
| 22 | 99.8123 | 0.7486 | 1.48749 | 70.23 |
| 23 | 20.9293 | 1.3722 | | |
| 24 (stop) | ∞ | 7.3986 | | |
| 25 | 25.4958 | 2.2186 | 1.69895 | 30.13 |
| 26 | 918.1326 | 14.2754 | | |
| 27 | 26.8003 | 0.5988 | 1.48749 | 70.23 |
| 28 | 13.2243 | 4.0701 | | |
| 29 | 45.8951 | 4.4895 | 1.49700 | 81.61 |
| 30 | −13.7727 | 0.2782 | | |
| 31 | −12.678 | 0.5869 | 1.83400 | 37.16 |
| 32 | 34.9578 | 0.4349 | | |
| 33 | 53.7178 | 2.9066 | 1.49700 | 81.61 |
| 34 | −27.123 | 0.0899 | | |
| 35 | 47.0731 | 5.0170 | 1.49700 | 81.61 |
| 36 | −16.0495 | 6.3175 | | |
| 37 | ∞ | 34.8824 | 1.51633 | 64.14 |
| 38 | ∞ | 0.8983 | 1.50847 | 61.19 |
| 39 | ∞ | | | |

| | Focal length | (Variable 1) | (Variable 2) | (Variable 3) | (Variable 4) |
|---|---|---|---|---|---|
| Wide-angle | 10.00 | 23.5793 | 2.7621 | 14.3148 | 1.1958 |
| Intermediate | 13.20 | 9.2258 | 7.3108 | 7.9050 | 17.4104 |
| Telephoto | 15.16 | 1.0456 | 8.6182 | 6.8364 | 25.3518 |

Example 8

Figure 15:
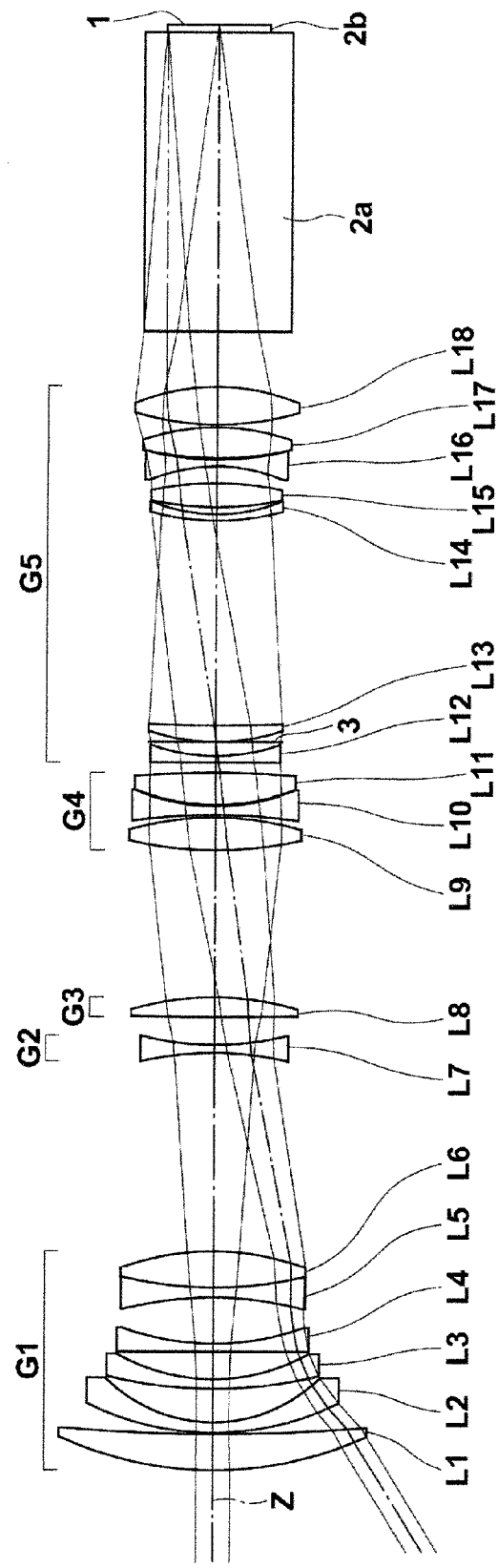
FIG. 15 is a sectional view illustrating the lens configuration and ray trajectories of a variable-magnification projection optical system according to Example 8 of the invention.
Figure 16:
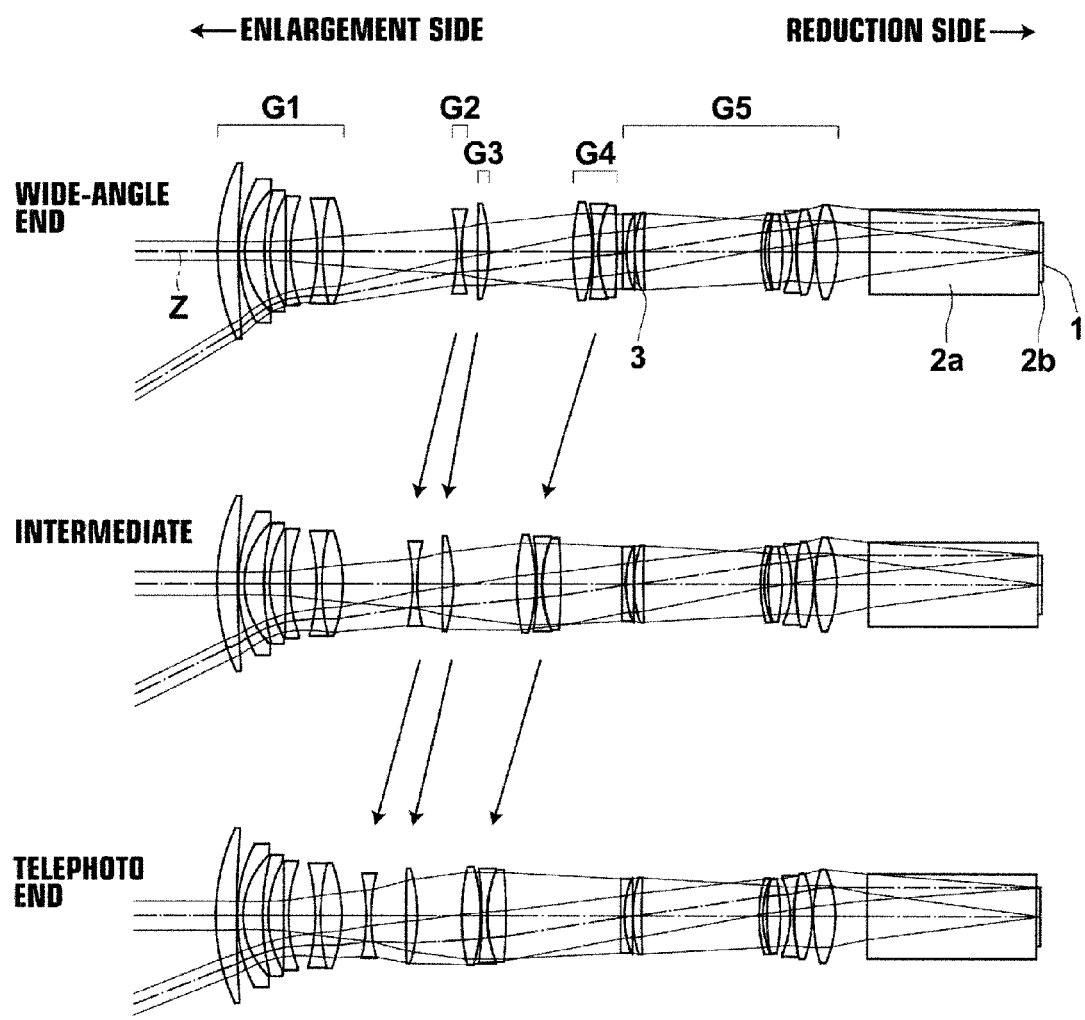
FIG. 16 is a diagram illustrating positions of lens groups and ray trajectories in different magnification positions of the variable-magnification projection optical system according to Example 8 of the invention.

FIGS. 15 and 16 show the lens configuration and ray trajectories at the wide-angle end of the variable-magnification projection optical system of Example 8, and positions of the lens groups and ray trajectories in different magnification positions of the variable-magnification projection optical system of Example 8, respectively. The configuration of the variable-magnification projection optical system according to Example 8 is substantially the same as that of the variable-magnification projection optical system according to Example 4, except that the fourth lens L4 of the first lens group G1 is formed by a plano-concave lens with the planer surface facing the enlargement side, the fifth lens L5 of the first lens group G1 is formed by a biconcave lens, the eighth lens L8 of the third lens group G3 is formed by a biconvex lens, the tenth lens L10 of the fourth lens group G4 is formed by a biconcave lens, and the twelfth lens L12 of the fifth lens group G5 is formed by a plano-concave lens with the planer surface facing the enlargement side.

Figure 38:
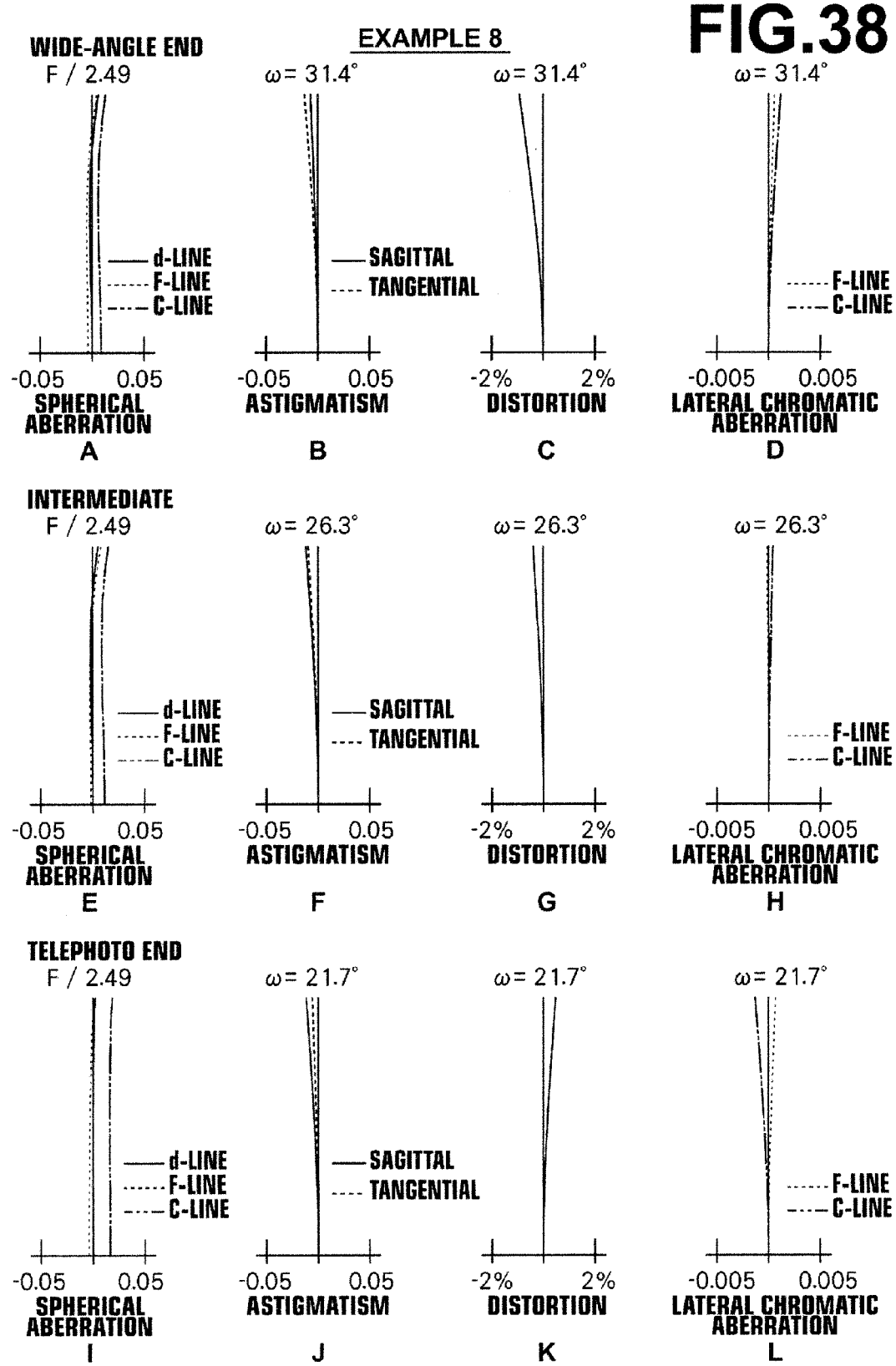
FIG. 38 shows, at A to L, aberration diagrams of the variable-magnification projection optical system according to Example 8 of the invention.

The f-number "Fno." and the total angle of view "2ω" of the variable-magnification projection optical system of Example 8 are shown above Table 8, the basic lens data is shown in the upper table of Table 8, and the values of the focal length of the entire system and the variable intervals at the wide-angle end, at the intermediate focal position and at the telephoto end are shown in the lower table of Table 8, respectively. Further, FIG. 38 shows, at A to L, aberration diagrams of the variable-magnification projection optical system of Example 8.

TABLE 8

Example 8
Fno. = 2.50, 2ω = 62.2° to 43.4°

| Si | Ri | Di | Ndj | νdj |
|---|---|---|---|---|
| 1 | 43.6785 | 4.2525 | 1.48749 | 70.23 |
| 2 | 208.3442 | 0.1514 | | |
| 3 | 32.9280 | 1.2721 | 1.71300 | 53.87 |
| 4 | 17.8699 | 3.9534 | | |
| 5 | 51.4768 | 1.1510 | 1.61800 | 63.33 |
| 6 | 23.0431 | 3.2607 | | |
| 7 | ∞ | 0.9692 | 1.80518 | 25.42 |
| 8 | 31.8946 | 5.47926 | | |
| 9 | −41.6211 | 1.1510 | 1.49700 | 81.54 |
| 10 | 45.8932 | 4.3161 | 1.56732 | 42.82 |
| 11 | −31.5477 | (variable 1) | | |
| 12 | −39.3762 | 0.9389 | 1.49700 | 81.54 |
| 13 | 35.0884 | (variable 2) | | |
| 14 | 456.3834 | 2.3119 | 1.51633 | 64.14 |
| 15 | −35.0956 | (variable 3) | | |
| 16 | 46.0257 | 3.8863 | 1.48749 | 70.23 |
| 17 | −36.7160 | 0.2931 | | |
| 18 | −72.9339 | 1.0207 | 1.60342 | 38.03 |
| 19 | 24.8746 | 0.1277 | | |
| 20 | 26.2264 | 3.7989 | 1.62041 | 60.29 |
| 21 | −116.5405 | (variable 4) | | |
| 22 | ∞ | 0.7572 | 1.61800 | 63.33 |
| 23 | 22.7748 | 1.6679 | | |
| 24 (stop) | ∞ | 0.0000 | | |
| 25 | 24.8323 | 1.9392 | 1.76182 | 26.52 |
| 26 | 199.8094 | 24.1936 | | |
| 27 | 28.5748 | 0.7572 | 1.83400 | 37.16 |
| 28 | 20.0323 | 0.8645 | | |
| 29 | 37.6272 | 2.8294 | 1.49700 | 81.54 |
| 30 | −37.6272 | 1.9935 | | |
| 31 | −19.9589 | 0.7572 | 1.74950 | 35.33 |
| 32 | 34.3304 | 0.1510 | | |
| 33 | 39.2197 | 3.6844 | 1.49700 | 81.54 |
| 34 | −26.1446 | 0.3029 | | |
| 35 | 34.1567 | 4.4604 | 1.49700 | 81.54 |
| 36 | −25.1921 | 6.5365 | | |
| 37 | ∞ | 35.2861 | 1.51633 | 64.14 |
| 38 | ∞ | 0.9087 | 1.50847 | 61.19 |
| 39 | ∞ | | | |

| | Focal length | (Variable 1) | (Variable 2) | (Variable 3) | (Variable 4) |
|---|---|---|---|---|---|
| Wide-angle | 10.00 | 23.4433 | 3.3226 | 17.4265 | 1.2092 |
| Intermediate | 12.31 | 14.4809 | 5.1707 | 13.0168 | 12.7332 |
| Telephoto | 15.16 | 5.1583 | 7.3011 | 9.0954 | 23.8468 |

Example 9

Figure 17:
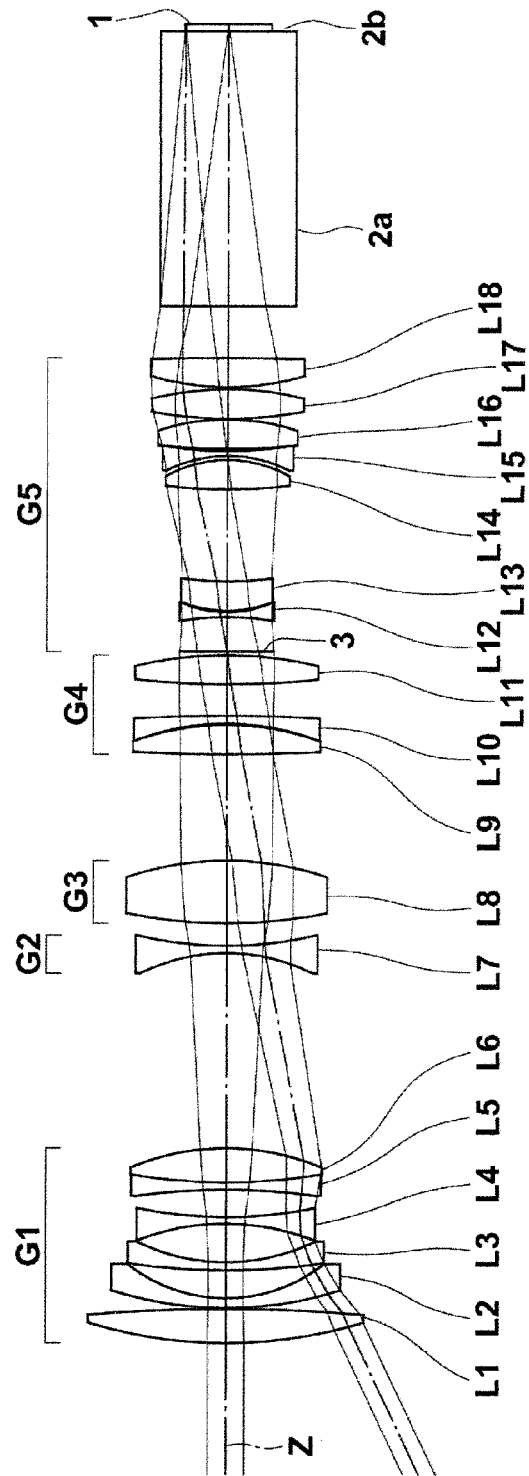
FIG. 17 is a sectional view illustrating the lens configuration and ray trajectories of a variable-magnification projection optical system according to Example 9 of the invention.
Figure 18:
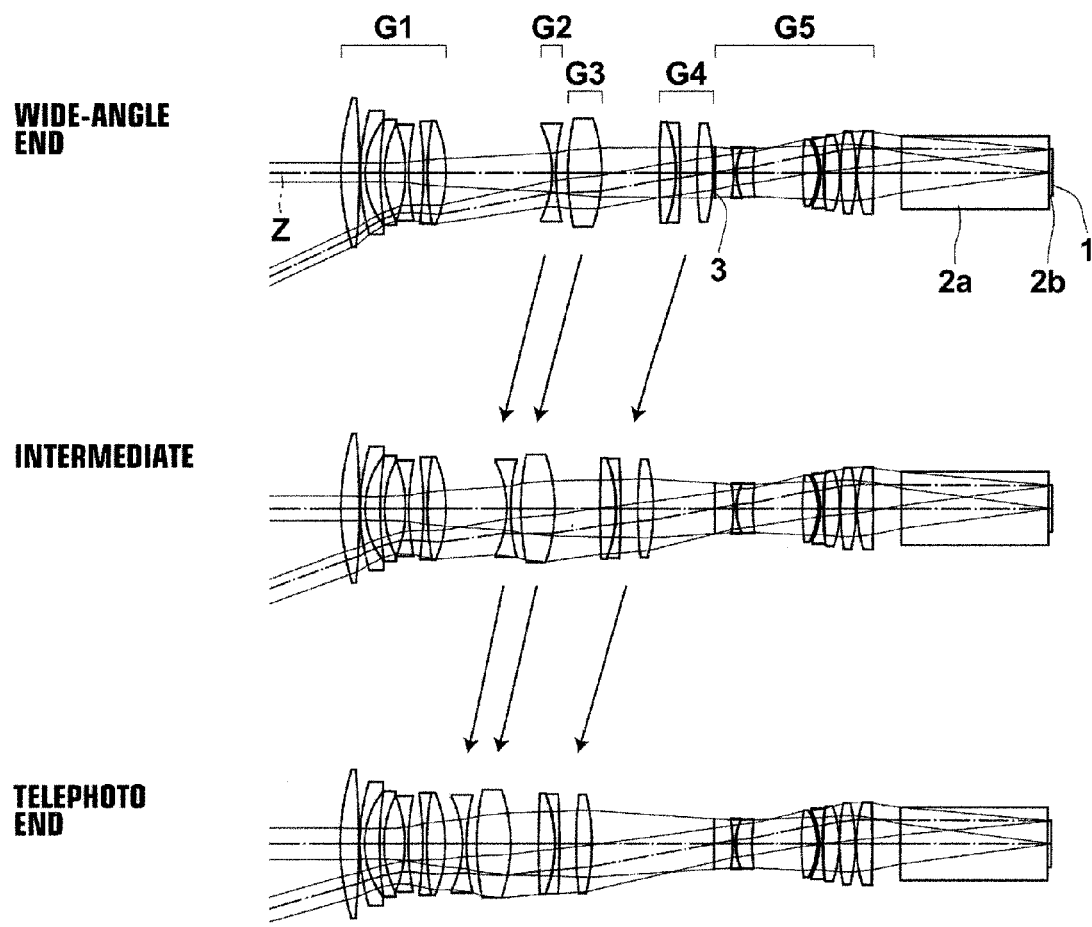
FIG. 18 is a diagram illustrating positions of lens groups and ray trajectories in different magnification positions of the variable-magnification projection optical system according to Example 9 of the invention.

FIGS. 17 and 18 show the lens configuration and ray trajectories at the wide-angle end of the variable-magnification projection optical system of Example 9, and positions of the lens groups and ray trajectories in different magnification positions of the variable-magnification projection optical system of Example 9, respectively. The symbol (positive or negative) of the refractive power of each of the first to the fifth lens groups G1 to G5, the lens groups that are fixed during magnification change, and the lens groups that are moved during magnification change of the variable-magnification projection optical system according to Example 9 are the same as those of the variable-magnification projection optical system according to Example 1. The variable-magnification projection optical system of Example 9 differs from the variable-magnification projection optical system of Example 1 in that the lens groups of the variable-magnification projection optical system of Example 9 have the following lens configurations.

The first lens group G1 includes, in order from the enlargement side, a first lens L1 formed by a biconvex lens, a second lens L2 formed by a negative meniscus lens with the concave surface facing the reduction side, a third lens L3 formed by a negative meniscus lens with the concave surface facing the reduction side, a fourth lens L4 formed by a biconcave lens, a fifth lens L5 formed by a biconcave lens, and a sixth lens L6 formed by a biconvex lens. The fifth lens L5 and the sixth lens L6 are cemented together.

The second lens group G2 includes a seventh lens L7 formed by a biconcave lens. The third lens group G3 includes an eighth lens L8 formed by a biconvex lens. The fourth lens group G4 includes, in order from the enlargement side, a ninth lens L9 formed by a biconvex lens, a tenth lens L10 formed by a negative meniscus lens with the concave surface facing the enlargement side, and an eleventh lens L11 formed by a biconvex lens.

The fifth lens group G5 includes, in order from the enlargement side, the stop (including an aperture and a variable stop) 3, a twelfth lens L12 formed by a biconcave lens, a thirteenth lens L13 formed by a positive meniscus lens with the convex surface facing the enlargement side, a fourteenth lens L14 formed by a biconvex lens, a fifteenth lens L15 formed by a biconcave lens, a sixteenth lens L16 formed by a biconvex lens, a seventeenth lens L17 formed by a biconvex lens, and an eighteenth lens L18 formed by a biconvex lens.

In the variable-magnification projection optical system of Example 9, all the lenses on the reduction side of the first lens group G1 are formed by single lenses without using a cemented lens. Further, all the lens surfaces are spherical surfaces and no aspherical surface is used. This is advantageous in view of costs.

Figure 39:
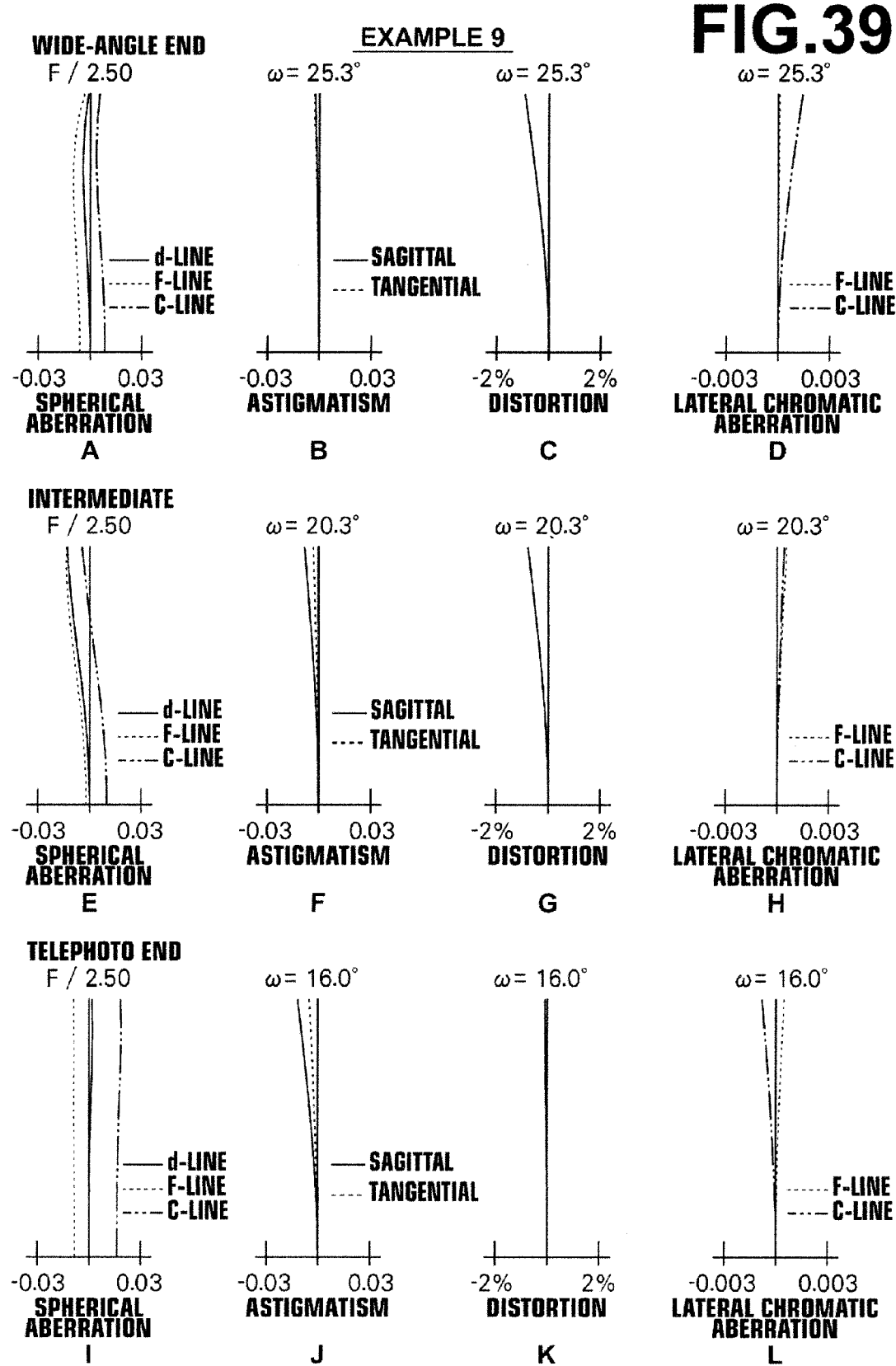
FIG. 39 shows, at A to L, aberration diagrams of the variable-magnification projection optical system according to Example 9 of the invention.

The f-number "Fno." and the total angle of view "2ω" of the variable-magnification projection optical system of Example 9 are shown above Table 9, the basic lens data is shown in the upper table of Table 9, and the values of the focal length of the entire system and the variable intervals at the wide-angle end, at the intermediate focal position and at the telephoto end are shown in the lower table of Table 9, respectively. Further, FIG. 39 shows, at A to L, aberration diagrams of the variable-magnification projection optical system of Example 9.

TABLE 9

Example 9
Fno. = 2.50, 2ω = 50.6° to 32.0°

| Si | Ri | Di | Ndj | vdj |
|---|---|---|---|---|
| 1 | 52.7511 | 3.7664 | 1.51633 | 64.14 |
| 2 | −179.0013 | 0.1304 | | |
| 3 | 41.9573 | 1.0955 | 1.49700 | 81.54 |
| 4 | 17.5693 | 3.0706 | | |
| 5 | 73.2743 | 0.9390 | 1.49700 | 81.54 |
| 6 | 22.6200 | 4.2524 | | |
| 7 | −26.6171 | 0.7303 | 1.80518 | 25.42 |
| 8 | 48.6226 | 2.9822 | | |
| 9 | −73.6070 | 0.7971 | 1.48749 | 70.23 |
| 10 | 62.6373 | 3.7971 | 1.80610 | 33.27 |
| 11 | −27.1619 | (variable 1) | | |
| 12 | −21.3014 | 0.8085 | 1.48749 | 70.23 |

TABLE 9-continued

Example 9
Fno. = 2.50, 2ω = 50.6° to 32.0°

| 13 | 42.5918 | (variable 2) | | |
|---|---|---|---|---|
| 14 | 55.2070 | 6.9495 | 1.78590 | 44.20 |
| 15 | −34.1978 | (variable 3) | | |
| 16 | 199.8885 | 3.2610 | 1.51633 | 64.14 |
| 17 | −30.1092 | 0.1304 | | |
| 18 | −28.2750 | 0.8790 | 1.75520 | 27.51 |
| 19 | −182.1918 | 3.4555 | | |
| 20 | 91.3653 | 3.2603 | 1.49700 | 81.54 |
| 21 | −43.7151 | (variable 4) | | |
| 22 (stop) | ∞ | 3.8397 | | |
| 23 | −30.5677 | 0.5216 | 1.51633 | 64.14 |
| 24 | 12.1529 | 0.1454 | | |
| 25 | 13.5053 | 3.2603 | 1.76182 | 26.52 |
| 26 | 36.8959 | 10.1472 | | |
| 27 | 58.9625 | 3.2603 | 1.49700 | 81.54 |
| 28 | −13.6149 | 0.4719 | | |
| 29 | −14.8476 | 0.5112 | 1.83400 | 37.16 |
| 30 | 44.4103 | 0.2475 | | |
| 31 | 71.3901 | 3.2603 | 1.48749 | 70.23 |
| 32 | −23.8850 | 0.0783 | | |
| 33 | 46.3156 | 3.2603 | 1.49700 | 81.54 |
| 34 | −34.9073 | 0.2087 | | |
| 35 | 29.5036 | 3.2603 | 1.51633 | 64.14 |
| 36 | −312.5146 | 5.7148 | | |
| 37 | ∞ | 30.3856 | 1.51633 | 64.14 |
| 38 | ∞ | 0.7825 | 1.50847 | 61.19 |
| 39 | ∞ | | | |

| | Focal length | (Variable 1) | (Variable 2) | (Variable 3) | (Variable 4) |
|---|---|---|---|---|---|
| Wide-angle | 10.00 | 21.6386 | 2.5044 | 11.7104 | 0.3897 |
| Intermediate | 12.81 | 12.3787 | 2.0625 | 9.3345 | 12.4674 |
| Telephoto | 16.40 | 3.5320 | 2.0484 | 5.7140 | 24.9486 |

Example 10

Figure 19:
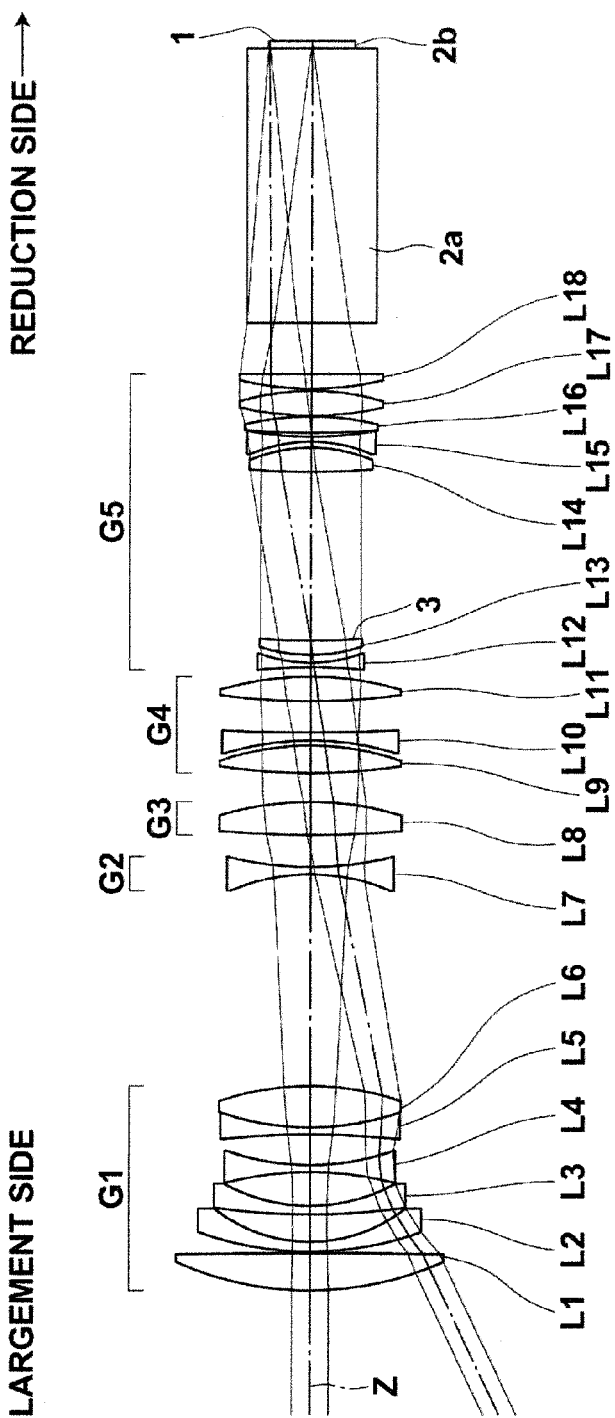
FIG. 19 is a sectional view illustrating the lens configuration and ray trajectories of a variable-magnification projection optical system according to Example 10 of the invention.
Figure 20:
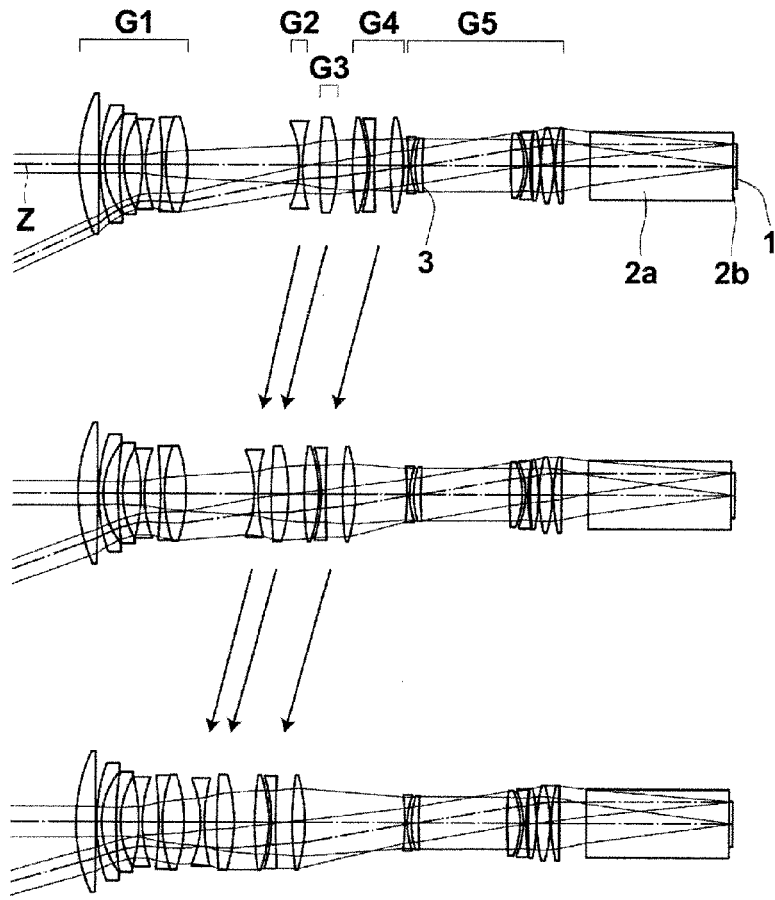
FIG. 20 is a diagram illustrating positions of lens groups and ray trajectories in different magnification positions of the variable-magnification projection optical system according to Example 10 of the invention.

FIGS. 19 and 20 show the lens configuration and ray trajectories at the wide-angle end of the variable-magnification projection optical system of Example 10, and positions of the lens groups and ray trajectories in different magnification positions of the variable-magnification projection optical system of Example 10, respectively. The configuration of the variable-magnification projection optical system according to Example 10 is substantially the same as that of the variable-magnification projection optical system according to Example 9, except that the tenth lens L10 of the fourth lens group G4 is formed by a biconcave lens, the eighteenth lens L18 of the fifth lens group G5 is formed by a plano-concave lens with the planer surface facing the reduction side, and the stop 3 is disposed on the reduction-side surface of the thirteenth lens L13.

Figure 40:
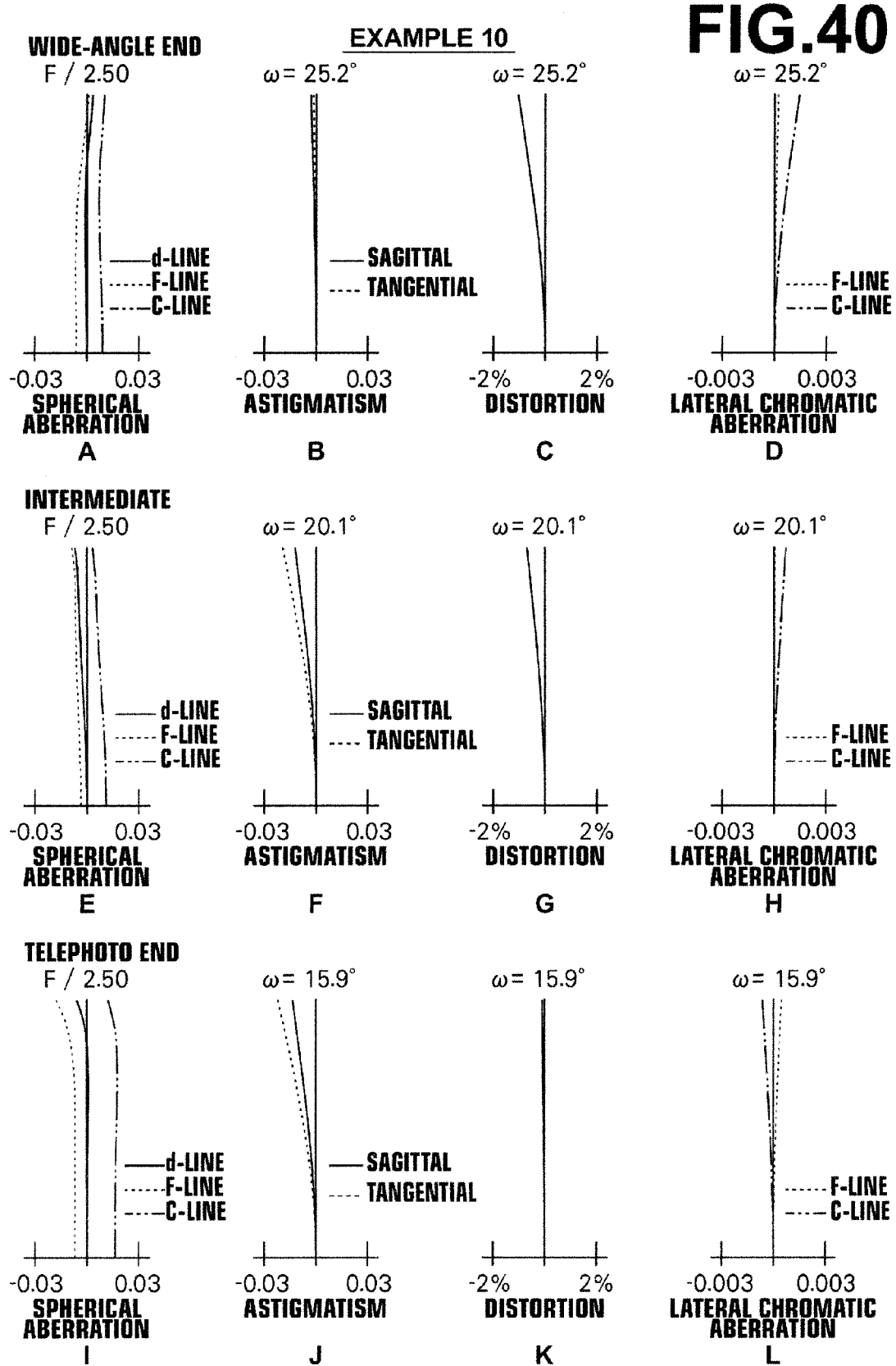
FIG. 40 shows, at A to L, aberration diagrams of the variable-magnification projection optical system according to Example 10 of the invention.

The f-number "Fno." and the total angle of view "2ω" of the variable-magnification projection optical system of Example 10 are shown above Table 10, the basic lens data is shown in the upper table of Table 10, and the values of the focal length of the entire system and the variable intervals at the wide-angle end, at the intermediate focal position and at the telephoto end are shown in the lower table of Table 10, respectively. Further, FIG. 40 shows, at A to L, aberration diagrams of the variable-magnification projection optical system of Example 10.

TABLE 10

Example 10
Fno. = 2.50, 2ω = 50.4° to 31.8°

| Si | Ri | Di | Ndj | νdj |
|---|---|---|---|---|
| 1 | 36.3101 | 4.1405 | 1.51633 | 64.14 |
| 2 | −815.8218 | 0.1294 | | |
| 3 | 36.0303 | 1.0870 | 1.49700 | 81.54 |
| 4 | 16.9207 | 3.0393 | | |
| 5 | 74.0956 | 0.9318 | 1.49700 | 81.54 |
| 6 | 19.3336 | 3.7748 | | |
| 7 | −35.2635 | 0.7247 | 1.80518 | 25.42 |
| 8 | 28.1965 | 3.35341 | | |
| 9 | −87.2321 | 0.7910 | 1.48749 | 70.23 |
| 10 | 30.6187 | 4.5759 | 1.80610 | 33.27 |
| 11 | −30.5789 | (variable 1) | | |
| 12 | −21.9727 | 0.8023 | 1.48749 | 70.23 |
| 13 | 37.5612 | (variable 2) | | |
| 14 | 117.3454 | 3.6227 | 1.80400 | 46.57 |
| 15 | −34.8498 | (variable 3) | | |
| 16 | 66.1243 | 3.0585 | 1.49700 | 81.54 |
| 17 | −29.8390 | 0.5387 | | |
| 18 | −32.5800 | 0.8722 | 1.75520 | 27.51 |
| 19 | 196.6172 | 3.4616 | | |
| 20 | 73.7270 | 2.7004 | 1.58913 | 61.14 |
| 21 | −35.3816 | (variable 4) | | |
| 22 | −54.1061 | 0.5176 | 1.60311 | 60.64 |
| 23 | 16.1421 | 0.8570 | | |
| 24 | 17.9372 | 1.5512 | 1.76182 | 26.52 |
| 25 (stop) | 82.3964 | 18.5826 | | |
| 26 | 84.7093 | 2.6870 | 1.49700 | 81.54 |
| 27 | −16.9537 | 0.6584 | | |
| 28 | −16.9211 | 0.5073 | 1.83400 | 37.16 |
| 29 | 39.2952 | 0.4115 | | |
| 30 | 91.2062 | 1.8161 | 1.48749 | 70.23 |
| 31 | −31.0265 | 0.0778 | | |
| 32 | 33.3978 | 2.7515 | 1.49700 | 81.54 |
| 33 | −27.7823 | 0.2136 | | |
| 34 | 33.4830 | 1.5907 | 1.51633 | 64.14 |
| 35 | ∞ | 5.6729 | | |
| 36 | ∞ | 30.1524 | 1.51633 | 64.14 |
| 37 | ∞ | 0.7765 | 1.50847 | 61.19 |
| 38 | ∞ | | | |

| | Focal length | (Variable 1) | (Variable 2) | (Variable 3) | (Variable 4) |
|---|---|---|---|---|---|
| Wide-angle | 10.00 | 23.3327 | 3.5330 | 3.1302 | 1.0344 |
| Intermediate | 12.81 | 14.2413 | 2.8007 | 3.2237 | 10.7646 |
| Telephoto | 16.40 | 3.3995 | 2.6158 | 4.2499 | 20.7651 |

Example 11

Figure 21:
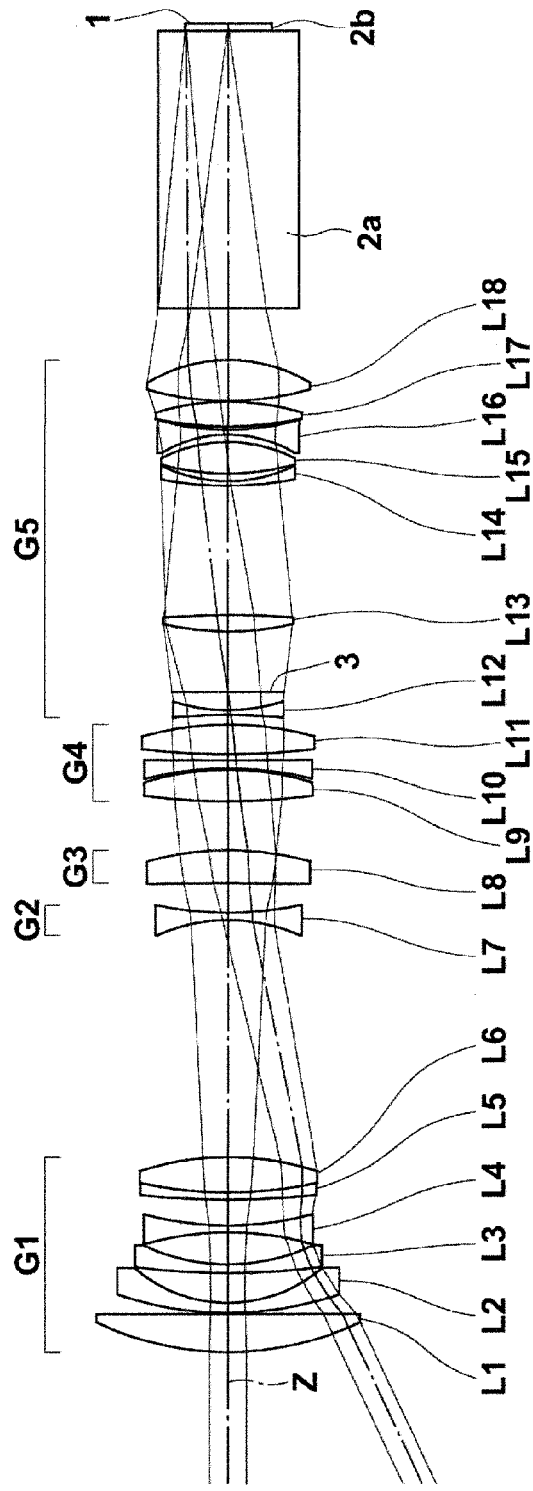
FIG. 21 is a sectional view illustrating the lens configuration and ray trajectories of a variable-magnification projection optical system according to Example 11 of the invention.
Figure 22:
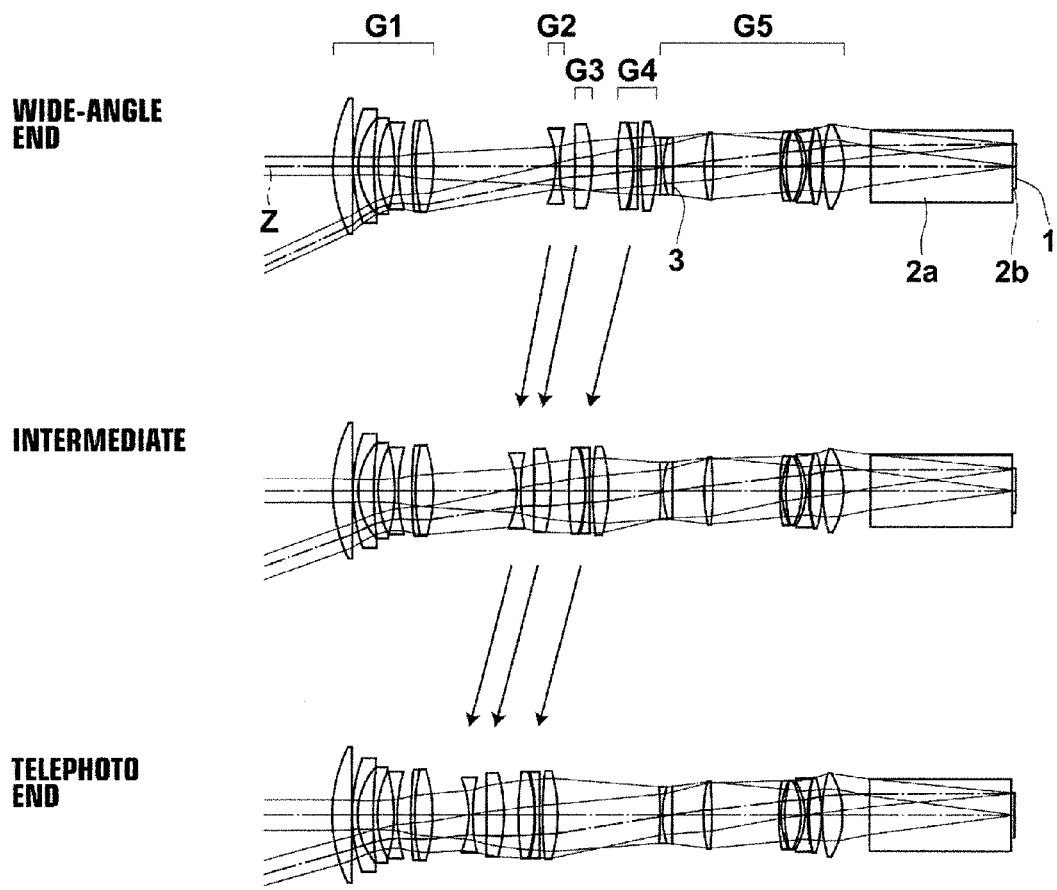
FIG. 22 is a diagram illustrating positions of lens groups and ray trajectories in different magnification positions of the variable-magnification projection optical system according to Example 11 of the invention.

FIGS. 21 and 22 show the lens configuration and ray trajectories at the wide-angle end of the variable-magnification projection optical system of Example 11, and positions of the lens groups and ray trajectories in different magnification positions of the variable-magnification projection optical system of Example 11, respectively. The configuration of the variable-magnification projection optical system according to Example 11 is substantially the same as that of the variable-magnification projection optical system according to Example 9, except that the fifth lens L5 of the first lens group G1 is formed by a negative meniscus lens with the convex surface facing the enlargement side, the eighth lens L8 of the third lens group G3 is formed by a positive meniscus lens with the convex surface facing the reduction side, the tenth lens L10 of the fourth lens group G4 is formed by a biconcave lens, the thirteenth lens L13 of the fifth lens group G5 is formed by a biconvex lens, the fourteenth lens L14 of the fifth lens group G5 is formed by a negative meniscus lens with the convex surface facing the enlargement side, the fifteenth lens L15 of the fifth lens group G5 is formed by a biconvex lens, the sixteenth lens L16 of the fifth lens group G5 is formed by a biconcave lens, and the stop 3 is disposed between the twelfth lens L12 and the thirteenth lens L13.

Figure 41:
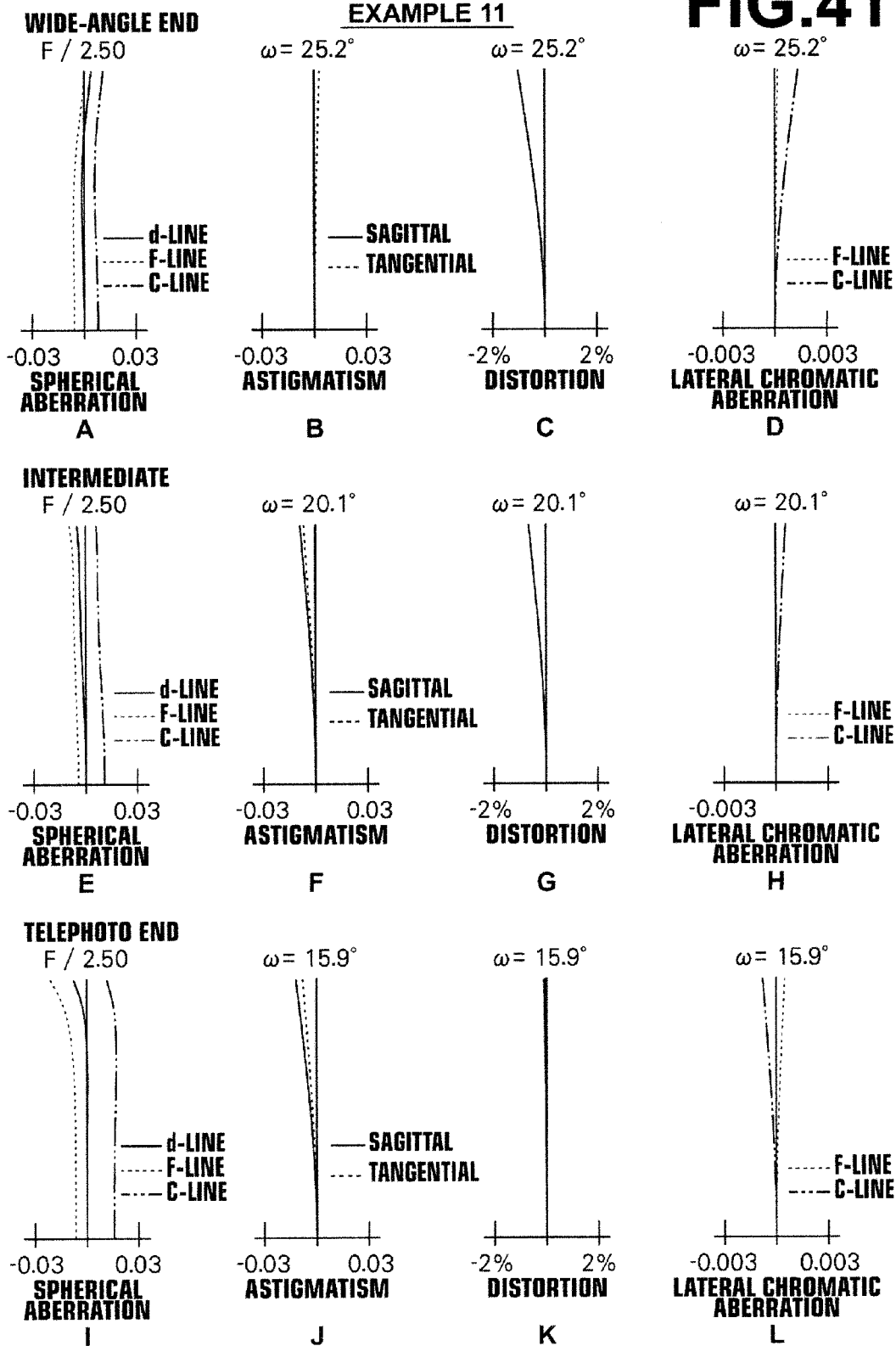
FIG. 41 shows, at A to L, aberration diagrams of the variable-magnification projection optical system according to Example 11 of the invention.

The f-number "Fno." and the total angle of view "2ω" of the variable-magnification projection optical system of Example 11 are shown above Table 11, the basic lens data is shown in the upper table of Table 11, and the values of the focal length of the entire system and the variable intervals at the wide-angle end, at the intermediate focal position and at the telephoto end are shown in the lower table of Table 11, respectively. Further, FIG. 41 shows, at A to L, aberration diagrams of the variable-magnification projection optical system of Example 11.

TABLE 11

Example 11
Fno. = 2.50, 2ω = 50.4° to 31.8°

| Si | Ri | Di | Ndj | νdj |
|---|---|---|---|---|
| 1 | 33.3905 | 4.1412 | 1.51633 | 64.14 |
| 2 | −8347.0919 | 0.1294 | | |
| 3 | 36.8994 | 1.0870 | 1.49700 | 81.54 |
| 4 | 15.6200 | 3.2812 | | |
| 5 | 82.0485 | 0.9317 | 1.61800 | 63.33 |
| 6 | 21.3024 | 3.5239 | | |
| 7 | −33.0292 | 0.7246 | 1.80518 | 25.42 |
| 8 | 34.8664 | 2.84947 | | |
| 9 | 91.5821 | 0.7909 | 1.48749 | 70.23 |
| 10 | 45.8149 | 3.8561 | 1.71736 | 29.52 |
| 11 | −31.1374 | (variable 1) | | |
| 12 | −19.0932 | 0.8023 | 1.48749 | 70.23 |
| 13 | 37.8512 | (variable 2) | | |
| 14 | −427.4612 | 3.6234 | 1.80610 | 40.92 |
| 15 | −33.4968 | (variable 3) | | |
| 16 | 69.5298 | 3.4225 | 1.49700 | 81.54 |
| 17 | −31.1446 | 0.1293 | | |
| 18 | −37.5321 | 0.8721 | 1.80518 | 25.42 |
| 19 | 883.0624 | 0.6488 | | |
| 20 | 78.4021 | 3.2994 | 1.65160 | 58.55 |
| 21 | −34.5603 | (variable 4) | | |
| 22 | −63.3925 | 0.5176 | 1.48749 | 70.23 |
| 23 | 19.6986 | 2.0000 | | |
| 24 (stop) | ∞ | 6.5806 | | |
| 25 | 31.7906 | 1.8009 | 1.71736 | 29.52 |
| 26 | −89.2150 | 14.0884 | | |
| 27 | 37.9558 | 0.5176 | 1.54814 | 45.79 |
| 28 | 16.5501 | 0.8307 | | |
| 29 | 27.7986 | 3.4248 | 1.49700 | 81.54 |
| 30 | −15.9269 | 0.8385 | | |
| 31 | −13.9005 | 0.5072 | 1.83400 | 37.16 |
| 32 | 28.9288 | 0.3070 | | |
| 33 | 39.7315 | 2.7190 | 1.48749 | 70.23 |
| 34 | −27.0943 | 0.0774 | | |
| 35 | 32.1183 | 4.4556 | 1.49700 | 81.54 |
| 36 | −17.2297 | 5.6723 | | |
| 37 | ∞ | 30.1498 | 1.51633 | 64.14 |
| 38 | ∞ | 0.7764 | 1.50847 | 61.19 |
| 39 | ∞ | | | |

| | Focal length | (Variable 1) | (Variable 2) | (Variable 3) | (Variable 4) |
|---|---|---|---|---|---|
| Wide-angle | 10.00 | 25.8355 | 3.2144 | 5.3126 | 1.0339 |
| Intermediate | 12.81 | 17.5757 | 2.8894 | 3.7331 | 11.1982 |
| Telephoto | 16.40 | 7.7427 | 2.9009 | 3.0720 | 21.6808 |

Example 12

Figure 23:
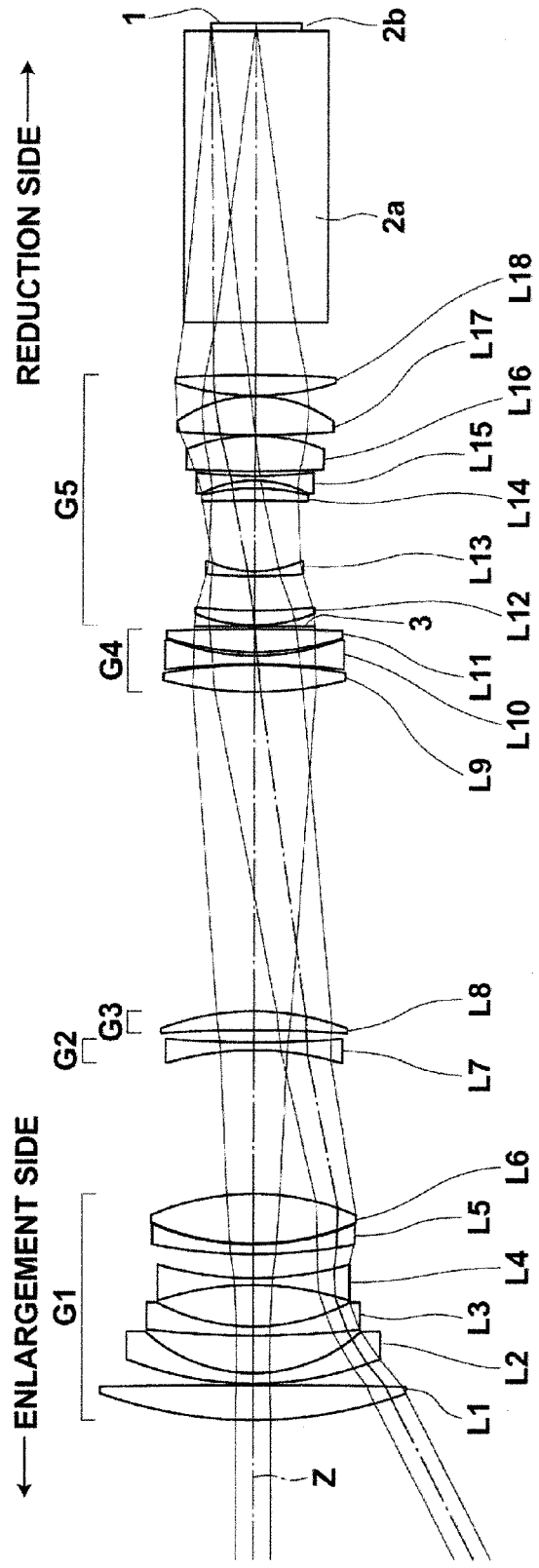
FIG. 23 is a sectional view illustrating the lens configuration and ray trajectories of a variable-magnification projection optical system according to Example 12 of the invention.
Figure 24:
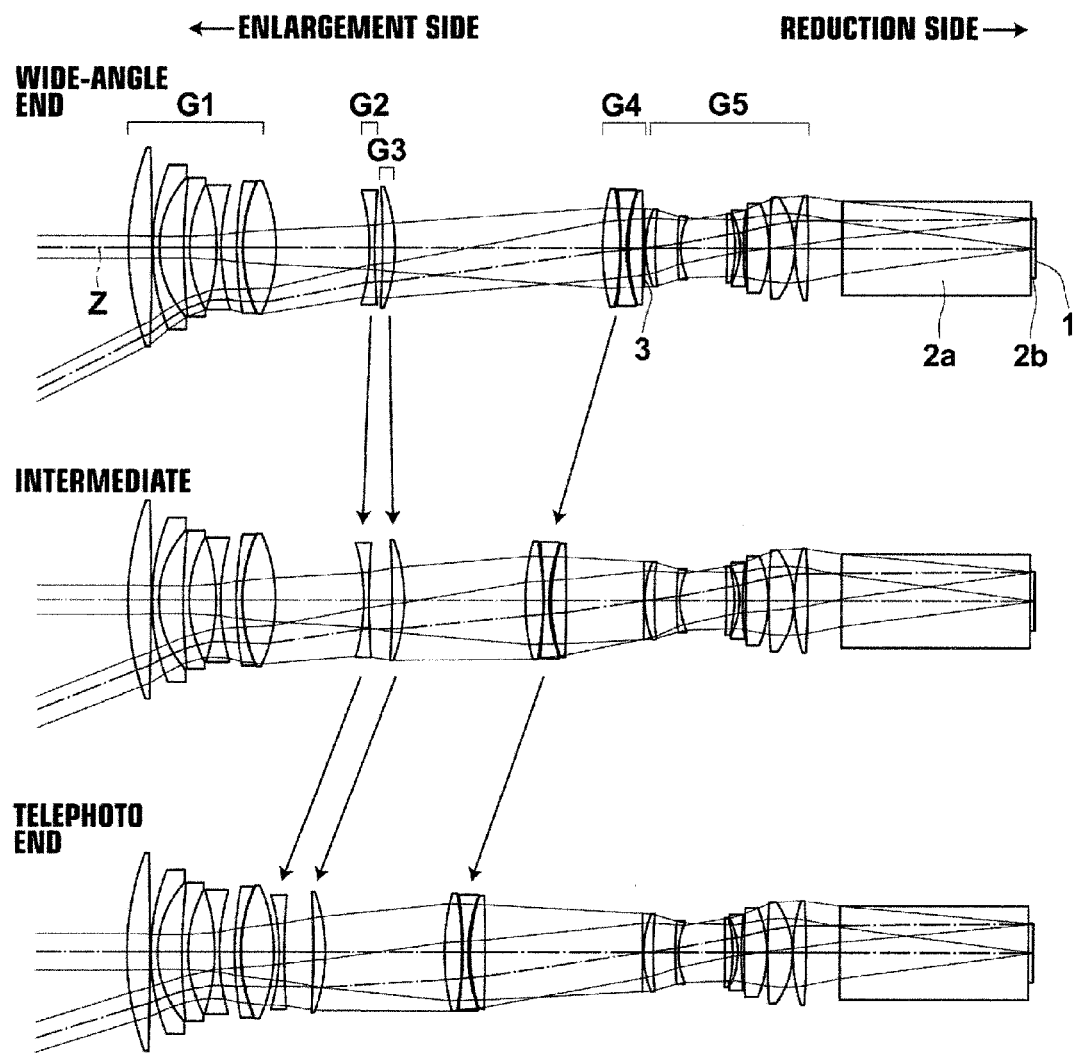
FIG. 24 is a diagram illustrating positions of lens groups and ray trajectories in different magnification positions of the variable-magnification projection optical system according to Example 12 of the invention.

FIGS. 23 and 24 show the lens configuration and ray trajectories at the wide-angle end of the variable-magnification projection optical system of Example 12, and positions of the lens groups and ray trajectories in different magnification positions of the variable-magnification projection optical system of Example 12, respectively. The configuration of the variable-magnification projection optical system according to Example 12 is substantially the same as that of the variable-magnification projection optical system according to Example 11, except that the fifth lens L5 and the sixth lens L6 of the first lens group G1 are not cemented together, the twelfth lens L12 of the fifth lens group G5 is formed by a positive meniscus lens with the convex surface facing the enlargement side, the thirteenth lens L13 of the fifth lens group G5 is formed by a negative meniscus lens with the convex surface facing the enlargement side, the fourteenth lens L14 of the fifth lens group G5 is formed by a positive meniscus lens with the convex surface facing the reduction side, the fifteenth lens L15 of the fifth lens group G5 is formed by a biconcave lens, the sixteenth lens L16 of the fifth lens group G5 is formed by a biconvex lens, and the stop 3 is disposed at the most enlargement-side position in the fifth lens group G5.

Figure 42:
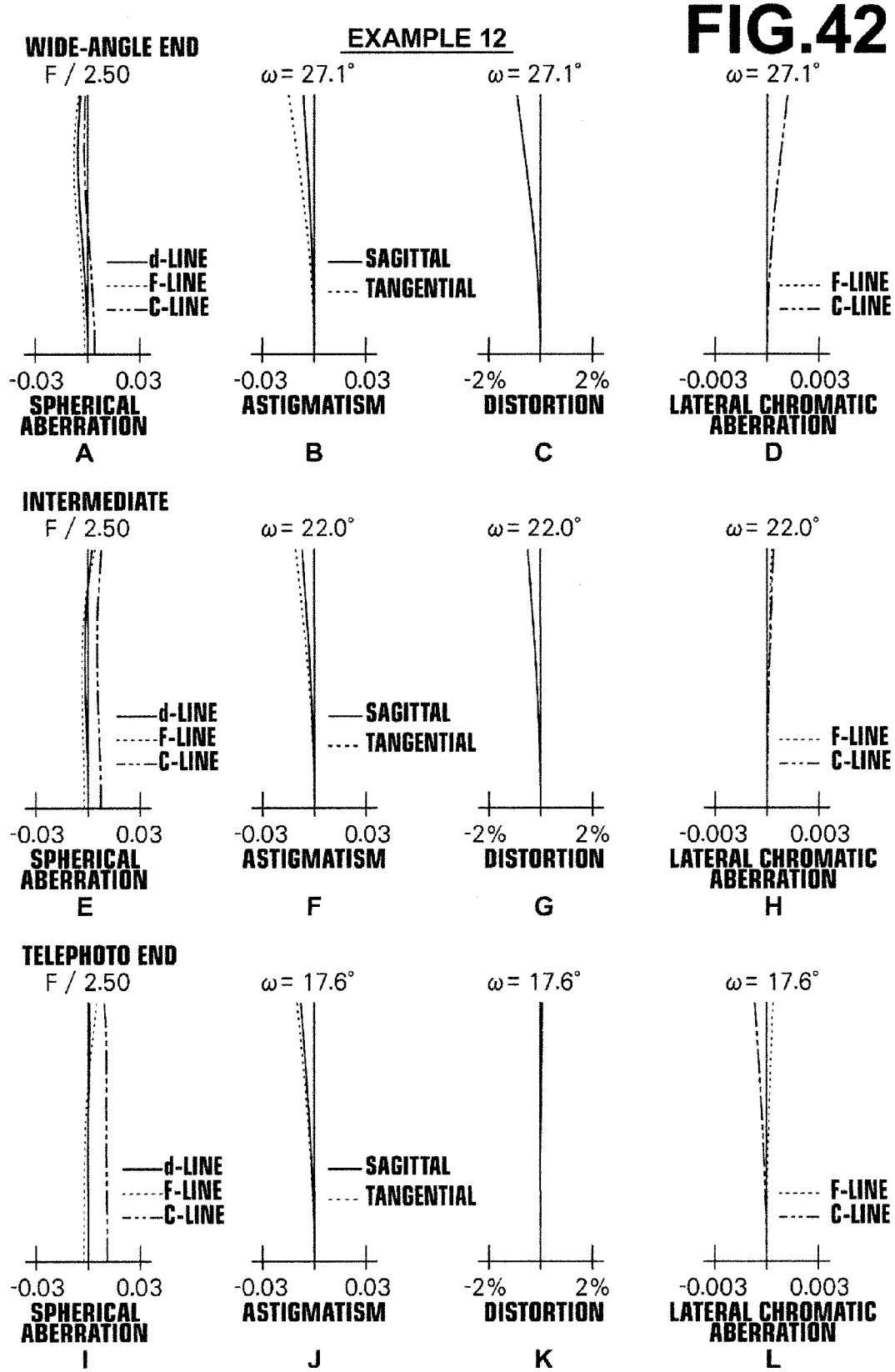
FIG. 42 shows, at A to L, aberration diagrams of the variable-magnification projection optical system according to Example 12 of the invention.

The f-number "Fno." and the total angle of view "2ω" of the variable-magnification projection optical system of Example 12 are shown above Table 12, the basic lens data is shown in the upper table of Table 12, and the values of the focal length of the entire system and the variable intervals at the wide-angle end, at the intermediate focal position and at the telephoto end are shown in the lower table of Table 12, respectively. Further, FIG. 42 shows, at A to L, aberration diagrams of the variable-magnification projection optical system of Example 12.

TABLE 12

Example 12
Fno. = 2.50 to 2.50, 2ω = 54.2° to 35.2°

| Si | Ri | Di | Ndj | vdj |
|---|---|---|---|---|
| 1 | 50.5206 | 3.9977 | 1.51633 | 64.14 |
| 2 | −817.9363 | 0.1410 | | |
| 3 | 38.3226 | 1.1843 | 1.49700 | 81.54 |
| 4 | 18.0911 | 4.2542 | | |
| 5 | 108.4125 | 1.0151 | 1.61800 | 63.33 |
| 6 | 22.9716 | 4.7139 | | |
| 7 | −34.2090 | 0.7895 | 1.77250 | 49.60 |
| 8 | 38.9583 | 2.6793 | | |
| 9 | 58.3196 | 1.0772 | 1.80518 | 25.42 |
| 10 | 28.8367 | 0.1227 | | |
| 11 | 29.0032 | 5.6598 | 1.65412 | 39.68 |
| 12 | −28.6146 | (variable 1) | | |
| 13 | −33.9212 | 0.8741 | 1.61800 | 63.33 |
| 14 | 125.7057 | (variable 2) | | |
| 15 | −169.2957 | 2.1268 | 1.51633 | 64.14 |
| 16 | −29.4570 | (variable 3) | | |
| 17 | 41.1532 | 3.0760 | 1.62041 | 60.29 |
| 18 | −58.1652 | 0.0845 | | |
| 19 | −83.0004 | 0.9503 | 1.60342 | 38.03 |
| 20 | 27.5780 | 0.3860 | | |
| 21 | 31.6391 | 2.6096 | 1.61800 | 63.33 |
| 22 | −309.5511 | (variable 4) | | |
| 23 (stop) | ∞ | 0.1410 | | |
| 24 | 18.0016 | 1.6726 | 1.78472 | 25.68 |
| 25 | 68.2901 | 3.8715 | | |
| 26 | 57.6794 | 0.5640 | 1.74950 | 35.33 |
| 27 | 12.8976 | 7.9852 | | |
| 28 | −233.7350 | 1.3643 | 1.49700 | 81.54 |
| 29 | −24.7501 | 0.8693 | | |
| 30 | −13.3024 | 0.5527 | 1.83400 | 37.16 |
| 31 | 58.0072 | 0.5426 | | |
| 32 | 152.3124 | 3.9634 | 1.43875 | 94.93 |
| 33 | −20.1753 | 0.0846 | | |
| 34 | 118.0486 | 4.3432 | 1.43875 | 94.93 |
| 35 | −15.2879 | 0.0846 | | |
| 36 | 29.5252 | 2.3138 | 1.49700 | 81.54 |
| 37 | −146.0513 | 5.9236 | | |
| 38 | ∞ | 32.8507 | 1.51633 | 64.14 |
| 39 | ∞ | 0.8459 | 1.50847 | 61.19 |
| 40 | ∞ | | | |

TABLE 12-continued

Example 12
Fno. = 2.50 to 2.50, 2ω = 54.2° to 35.2°

| | Focal length | (Variable 1) | (Variable 2) | (Variable 3) | (Variable 4) |
|---|---|---|---|---|---|
| Wide-angle | 10.00 | 16.1938 | 1.3839 | 35.9988 | 0.2717 |
| Intermediate | 12.65 | 15.3181 | 4.0188 | 20.9644 | 13.5469 |
| Telephoto | 15.99 | 0.9535 | 4.9581 | 20.6643 | 27.3088 |

Example 13

Figure 25:
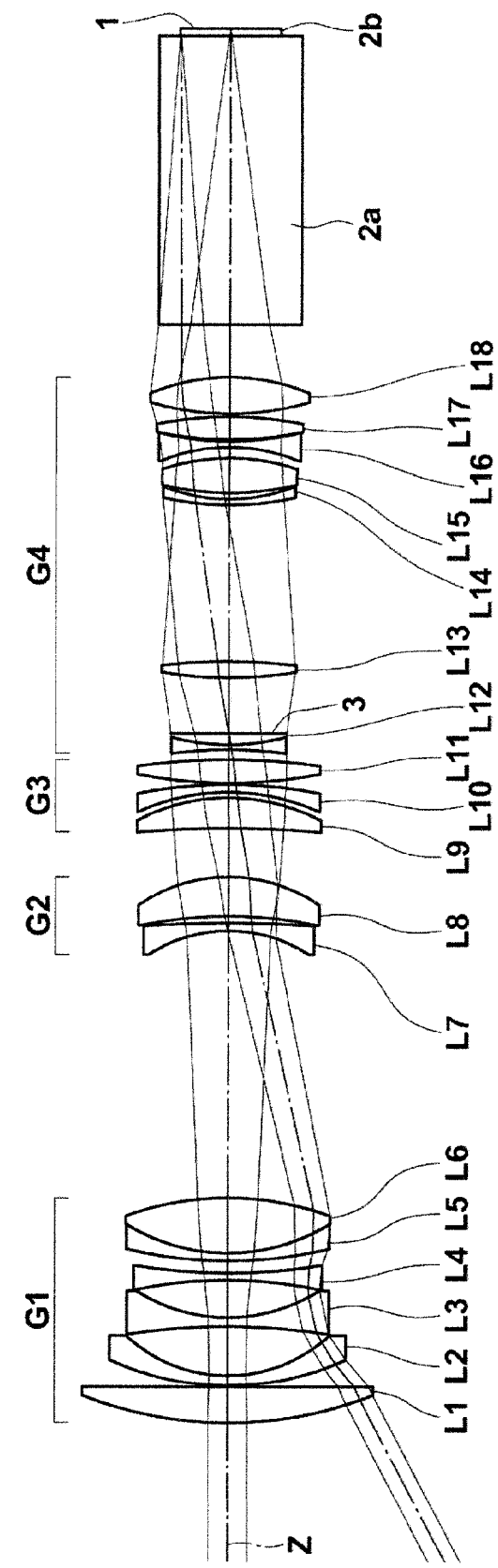
FIG. 25 is a sectional view illustrating the lens configuration and ray trajectories of a variable-magnification projection optical system according to Example 13 of the invention.
Figure 26:
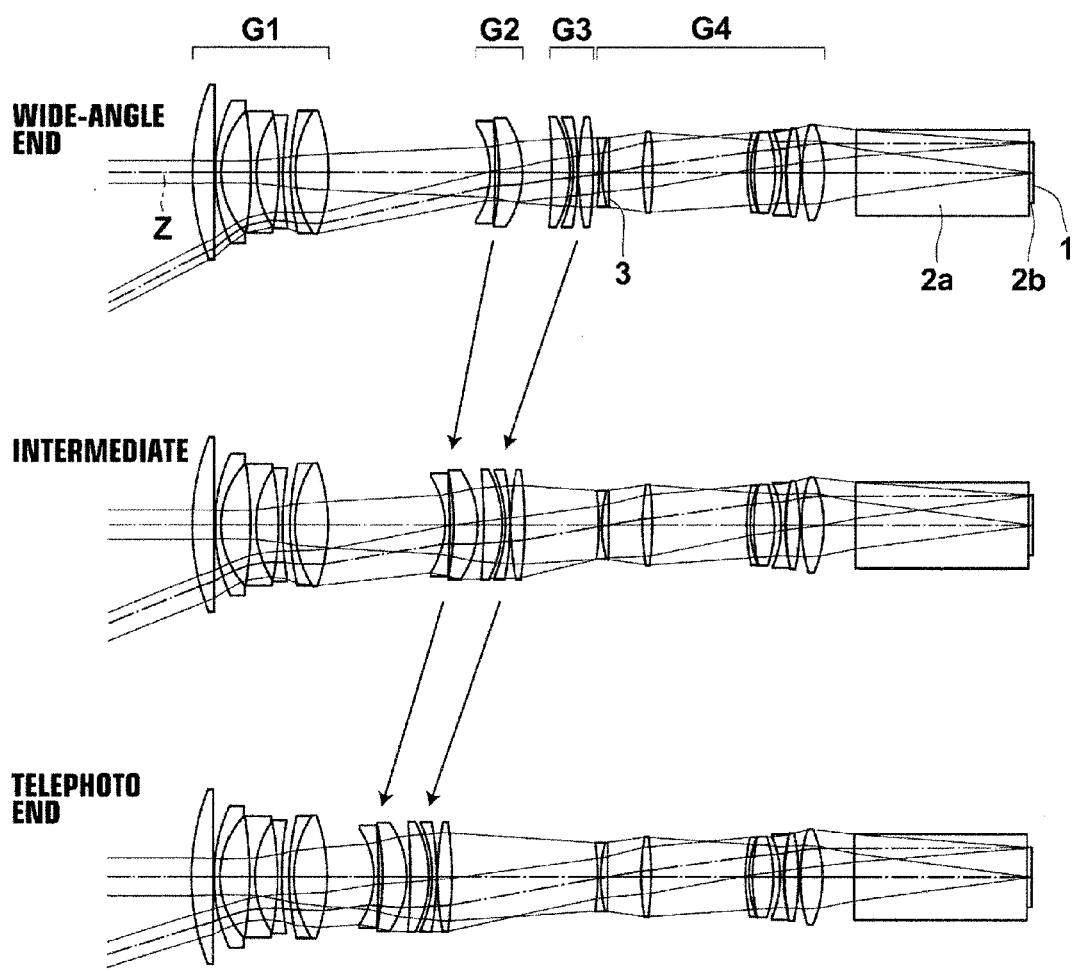
FIG. 26 is a diagram illustrating positions of lens groups and ray trajectories in different magnification positions of the variable-magnification projection optical system according to Example 13 of the invention.

FIGS. 25 and 26 show the lens configuration and ray trajectories at the wide-angle end of the variable-magnification projection optical system of Example 13, and positions of the lens groups and ray trajectories in different magnification positions of the variable-magnification projection optical system of Example 13, respectively. The variable-magnification projection optical system according to Example 13 has a four-group configuration including, in order from the enlargement side, a first lens group G1 having a negative refractive power, a second lens group G2 having a negative refractive power, a third lens group G3 having a positive refractive power and a fourth lens group G4 having a positive refractive power. The variable-magnification projection optical system of Example 13 is telecentric on the reduction side. On the reduction side of the fourth lens group G4, the image display surface 1 of the light valve formed by a reflective liquid crystal display panel, or the like, and the glass blocks 2a and 2b, such as the color composition prism (including filters, such as an infrared cutoff filter, a low-pass filter, etc.), are disposed.

During magnification change, the first lens group G1 and the fourth lens group G4 are fixed, and the second lens group G2 and the third lens group G3 are movable. How the lens groups are moved is shown in FIG. 22. Further, the numerical aperture is set to be constant across the entire magnification range.

The first lens group G1 includes, in order from the enlargement side, a first lens L1 formed by a plano-convex lens with the convex surface facing the enlargement side, a second lens L2 formed by a negative meniscus lens with the concave surface facing the reduction side, a third lens L3 and a fourth lens L4 formed by biconcave lenses, a fifth lens L5 formed by a negative meniscus lens with the concave surface facing the reduction side, and a sixth lens L6 formed by a biconvex lens. The fifth lens L5 and the sixth lens L6 are cemented together.

The second lens group G2 includes, in order from the enlargement side, a seventh lens L7 formed by a negative meniscus lens with the convex surface facing the reduction side, and an eighth lens L8 formed by a positive meniscus lens with the convex surface facing the reduction side. The third lens group G3 includes, in order from the enlargement side, a ninth lens L9 formed by a positive meniscus lens with the convex surface facing the reduction side, a tenth lens L10 formed by a negative meniscus lens with the convex surface facing the reduction side, and an eleventh lens L11 formed by a biconvex lens.

The fourth lens group G4 includes, in order from the enlargement side, a twelfth lens L12 formed by a biconcave lens, the stop (including an aperture and a variable stop) 3, a thirteenth lens L13 formed by a biconvex lens, a fourteenth lens L14 formed by a negative meniscus lens with the concave surface facing the reduction side, a fifteenth lens L15 formed by a biconvex lens, a sixteenth lens L16 formed by a biconcave lens, a seventeenth lens L17 formed by a biconvex lens, and an eighteenth lens L18 formed by a biconvex lens.

All the lenses of the variable-magnification projection optical system of Example 13 are formed by single lenses without using a cemented lens. Further, all the lens surfaces are spherical surfaces, and no aspherical surface is used. This is advantageous in view of costs.

Figure 43:
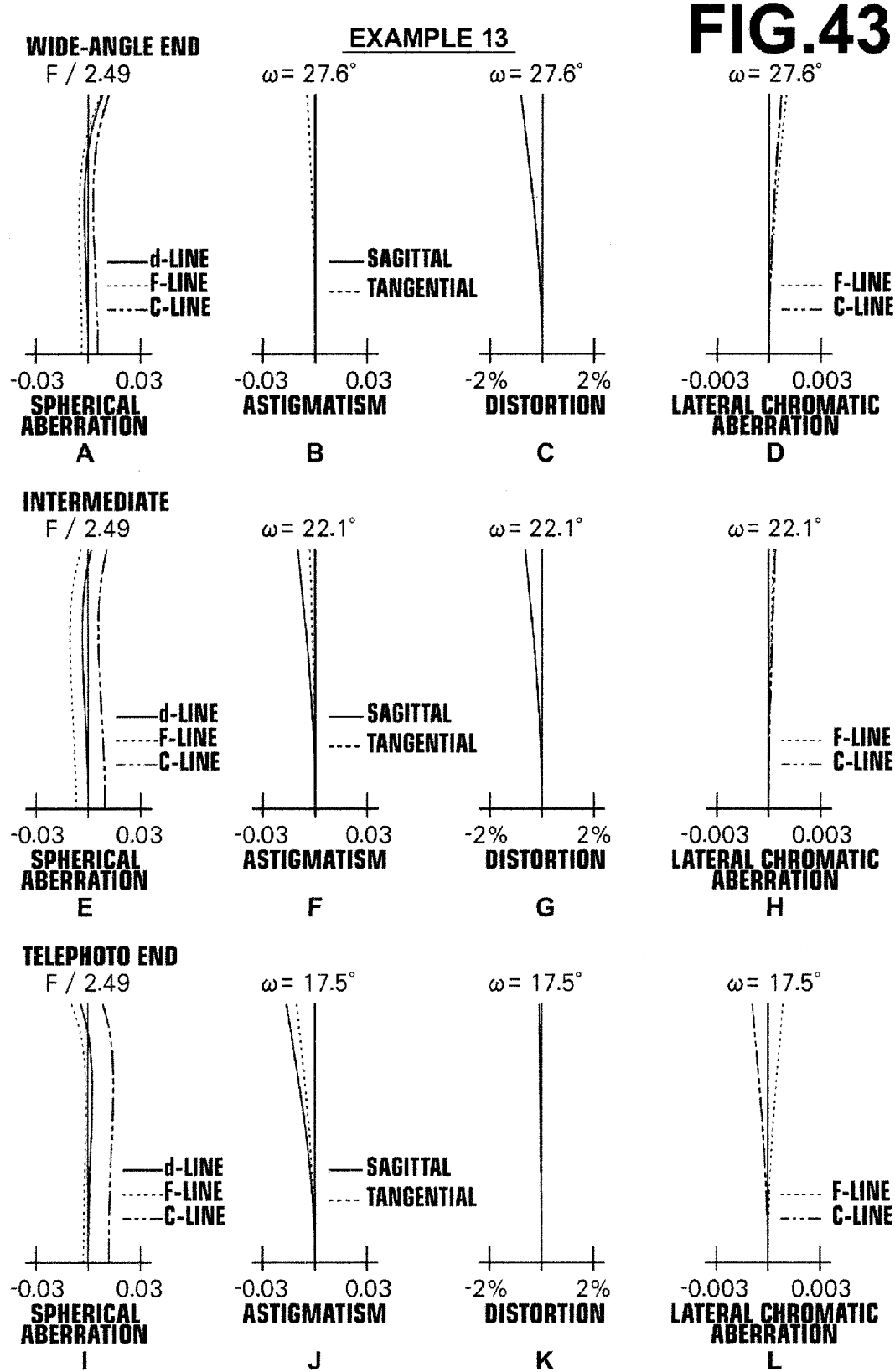
FIG. 43 shows, at A to L, aberration diagrams of the variable-magnification projection optical system according to Example 13 of the invention.

The f-number "Fno." and the total angle of view "2ω" of the variable-magnification projection optical system of Example 13 are shown above Table 13, the basic lens data is shown in the upper table of Table 13, and the values of the focal length of the entire system and the variable intervals at the wide-angle end, at the intermediate focal position and at the telephoto end are shown in the lower table of Table 13, respectively. Further, FIG. 43 shows, at A to L, aberration diagrams of the variable-magnification projection optical system of Example 13.

TABLE 13

Example 13
Fno. = 2.49, 2ω = 55.2°~35.0°

| Si | Ri | Di | Ndj | vdj |
|---|---|---|---|---|
| 1 | 41.6206 | 3.7713 | 1.51680 | 64.20 |
| 2 | ∞ | 0.1295 | | |
| 3 | 29.7794 | 1.0359 | 1.71300 | 53.94 |
| 4 | 15.5304 | 5.1631 | | |
| 5 | −68.8546 | 0.9323 | 1.61800 | 63.33 |
| 6 | 17.6567 | 3.9429 | | |
| 7 | −46.8452 | 0.7251 | 1.78590 | 44.20 |
| 8 | 58.8265 | 1.2903 | | |
| 9 | 44.9401 | 0.8287 | 1.76182 | 26.52 |
| 10 | 20.3125 | 5.8002 | 1.80610 | 40.92 |
| 11 | −31.0284 | (variable 1) | | |
| 12 | −15.1858 | 0.8028 | 1.63854 | 55.38 |
| 13 | −132.6224 | 0.7126 | | |
| 14 | −44.0024 | 4.1372 | 1.58144 | 40.75 |
| 15 | −16.4796 | (variable 2) | | |
| 16 | −111.9759 | 3.1759 | 1.49700 | 81.61 |
| 17 | −20.6819 | 0.5754 | | |
| 18 | −22.9086 | 0.8028 | 1.76182 | 26.52 |
| 19 | −49.1414 | 0.1523 | | |
| 20 | 49.3308 | 2.4700 | 1.61800 | 63.33 |
| 21 | −67.9405 | (variable 3) | | |
| 22 | −44.2904 | 0.5179 | 1.48749 | 70.23 |
| 23 | 22.8154 | 1.2000 | | |
| 24 (stop) | ∞ | 5.8245 | | |
| 25 | 41.8849 | 1.7003 | 1.69895 | 30.13 |
| 26 | −56.5567 | 16.3976 | | |
| 27 | 31.4631 | 0.5956 | 1.77250 | 49.60 |
| 28 | 18.0432 | 0.6869 | | |
| 29 | 29.6834 | 3.5956 | 1.49700 | 81.61 |
| 30 | −22.1345 | 1.1426 | | |
| 31 | −18.6327 | 0.6215 | 1.74950 | 35.28 |
| 32 | 30.7321 | 0.1920 | | |
| 33 | 37.8583 | 2.3906 | 1.49700 | 81.61 |
| 34 | −37.8583 | 0.3012 | | |
| 35 | 29.2036 | 3.8136 | 1.49700 | 81.61 |
| 36 | −21.5389 | 5.5426 | | |
| 37 | ∞ | 30.1692 | 1.51633 | 64.14 |
| 38 | ∞ | 0.7769 | 1.50847 | 61.19 |
| 39 | ∞ | | | |

| | Focal length | (variable 1) | (variable 2) | (variable 3) |
|---|---|---|---|---|
| Wide-angle | 10.00 | 27.9979 | 5.0631 | 1.0333 |
| Intermediate | 12.81 | 20.2130 | 1.0422 | 12.8391 |
| Telephoto | 16.40 | 8.1069 | 0.6278 | 25.3596 |

Example 14

Figure 27:
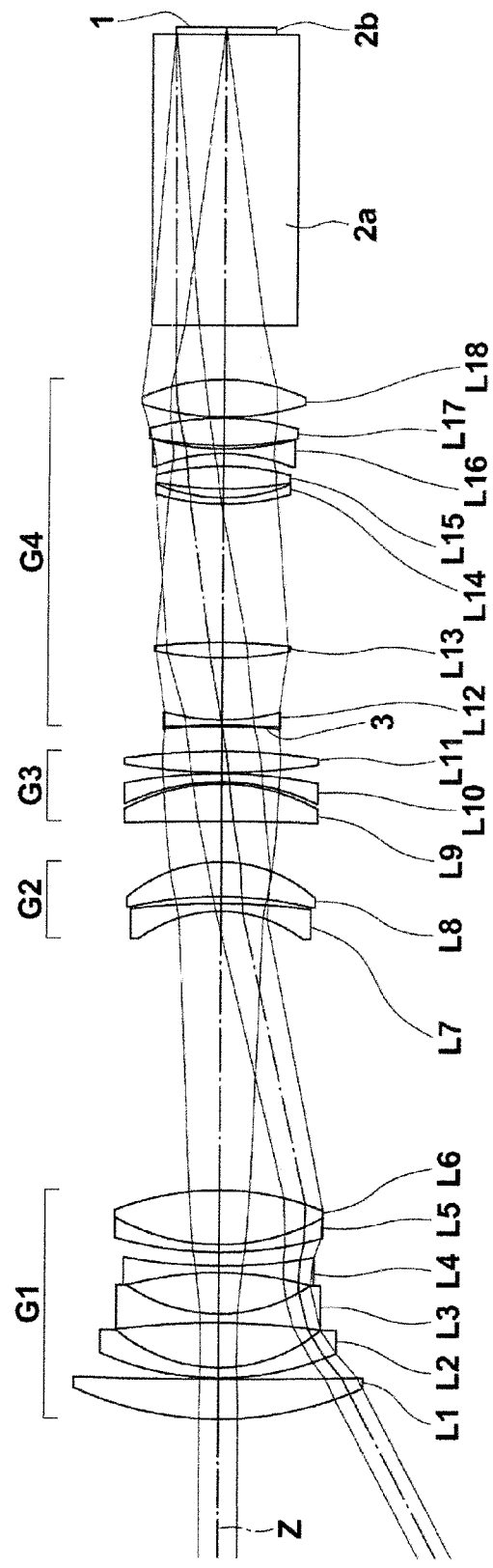
FIG. 27 is a sectional view illustrating the lens configuration and ray trajectories of a variable-magnification projection optical system according to Example 14 of the invention.
Figure 28:
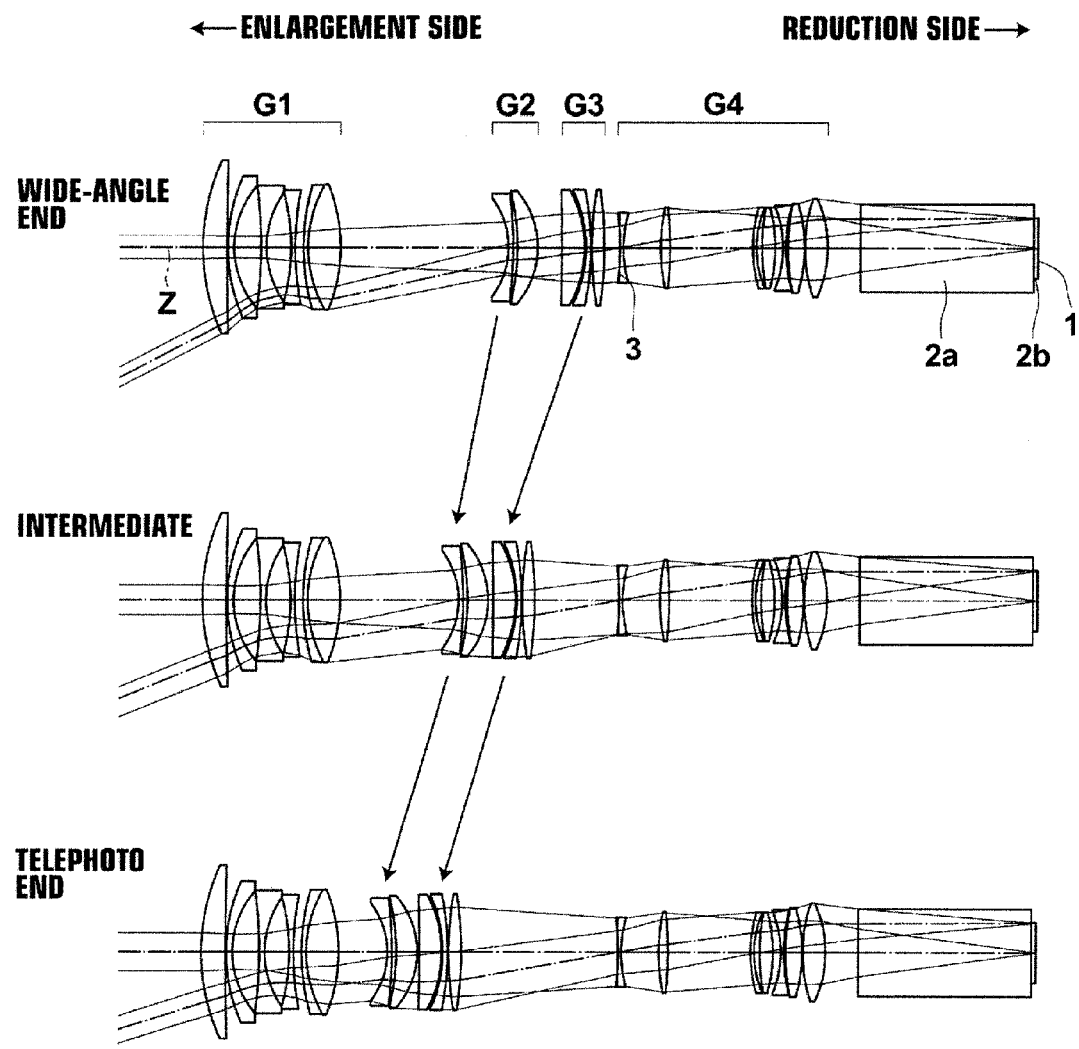
FIG. 28 is a diagram illustrating positions of lens groups and ray trajectories in different magnification positions of the variable-magnification projection optical system according to Example 14 of the invention.

FIGS. 27 and 28 show the lens configuration and ray trajectories at the wide-angle end of the variable-magnification projection optical system of Example 14, and positions of the lens groups and ray trajectories in different magnification positions of the variable-magnification projection optical system of Example 14, respectively. The configuration of the variable-magnification projection optical system according to Example 14 is substantially the same as that of the variable-magnification projection optical system according to Example 13, except that the first lens L1 of the first lens group G1 is formed by a positive meniscus lens with the convex surface facing the enlargement side, and the arrangement order of the stop 3 and the twelfth lens L12 is changed such that the stop 3 is disposed at the most enlargement-side position in the fourth lens group G4.

Figure 44:
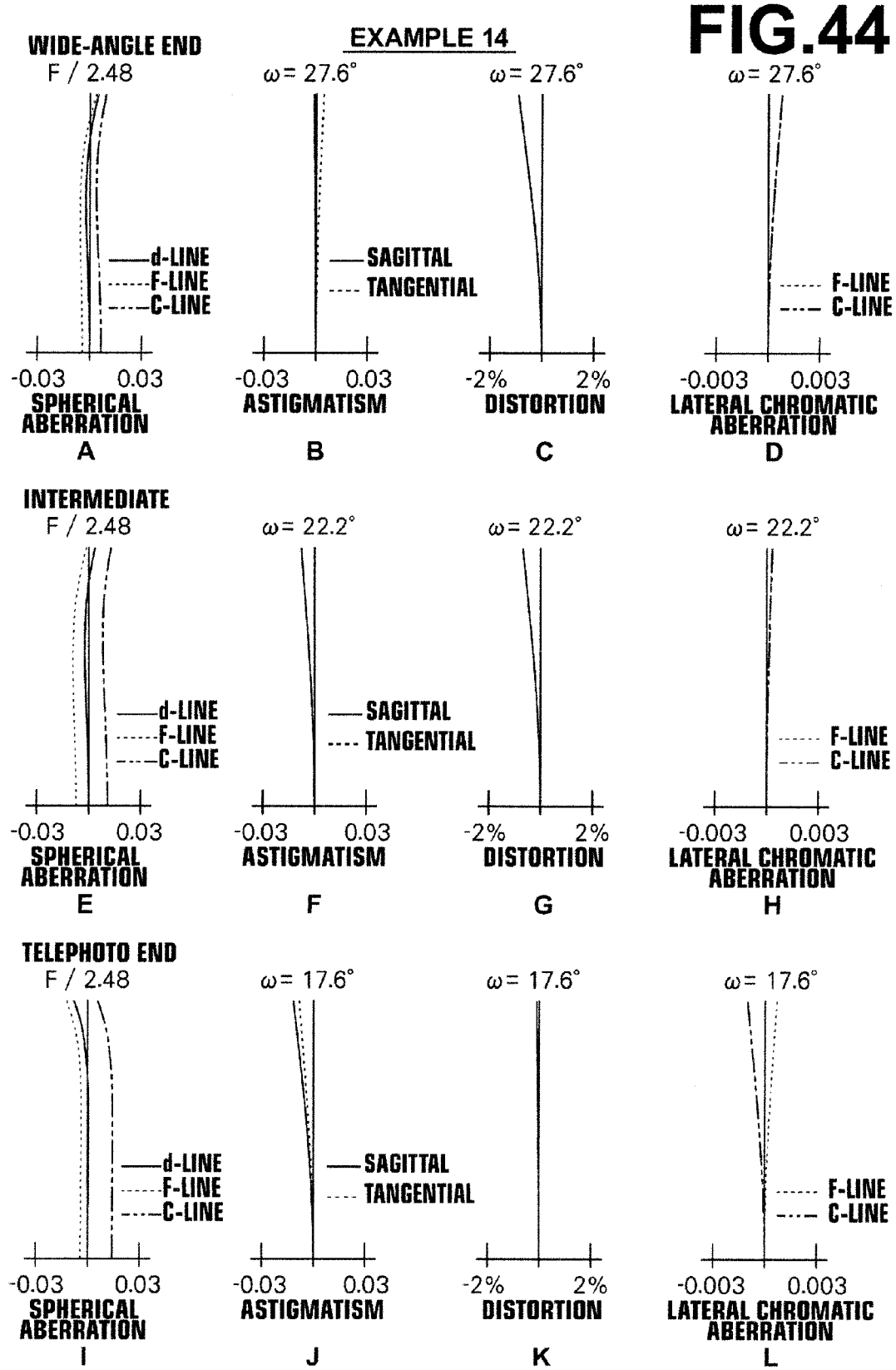
FIG. 44 shows, at A to L, aberration diagrams of the variable-magnification projection optical system according to Example 14 of the invention.

The f-number "Fno." and the total angle of view "2ω" of the variable-magnification projection optical system of Example 14 are shown above Table 14, the basic lens data is shown in the upper table of Table 14, and the values of the focal length of the entire system and the variable intervals at the wide-angle end, at the intermediate focal position and at the telephoto end are shown in the lower table of Table 14, respectively. Further, FIG. 44 shows, at A to L, aberration diagrams of the variable-magnification projection optical system of Example 14.

TABLE 14

Example 14
Fno. = 2.48, 2ω = 55.2°~35.2°

| Si | Ri | Di | Ndj | vdj |
|---|---|---|---|---|
| 1 | 36.6835 | 4.1480 | 1.51633 | 64.14 |
| 2 | 554.8811 | 0.1296 | | |
| 3 | 30.6404 | 1.0885 | 1.77250 | 49.60 |
| 4 | 16.4348 | 4.6744 | | |
| 5 | −82.0371 | 0.9330 | 1.61800 | 63.33 |
| 6 | 16.8029 | 4.3045 | | |
| 7 | −35.5268 | 0.7256 | 1.71300 | 53.87 |
| 8 | 55.4508 | 1.4132 | | |
| 9 | 40.3543 | 0.7920 | 1.80518 | 25.42 |
| 10 | 22.1112 | 5.7069 | 1.78590 | 44.20 |
| 11 | −29.1090 | (variable 1) | | |
| 12 | −14.2649 | 0.8034 | 1.77250 | 49.60 |
| 13 | −74.5529 | 0.7234 | | |
| 14 | −40.2855 | 3.6185 | 1.60342 | 38.03 |
| 15 | −14.8838 | (variable 2) | | |
| 16 | −325.3959 | 3.8751 | 1.49700 | 81.54 |
| 17 | −20.6531 | 0.2041 | | |
| 18 | −23.0649 | 0.8734 | 1.80518 | 25.42 |
| 19 | −50.0925 | 0.1294 | | |
| 20 | 63.5801 | 2.1786 | 1.69680 | 55.53 |
| 21 | −70.4492 | (variable 3) | | |
| 22 (stop) | ∞ | 0.1739 | | |
| 23 | −39.1251 | 0.5183 | 1.48749 | 70.23 |
| 24 | 23.1781 | 6.4538 | | |
| 25 | 35.1193 | 1.6228 | 1.71736 | 29.52 |
| 26 | −65.8813 | 14.4119 | | |
| 27 | 24.4471 | 0.6479 | 1.77250 | 49.60 |
| 28 | 17.5037 | 0.9646 | | |
| 29 | 39.4913 | 2.3103 | 1.49700 | 81.61 |
| 30 | −27.1504 | 1.3214 | | |
| 31 | −19.0473 | 0.5080 | 1.80610 | 33.27 |
| 32 | 28.8819 | 0.3361 | | |
| 33 | 41.8900 | 2.8543 | 1.49700 | 81.61 |
| 34 | −27.7179 | 0.0778 | | |
| 35 | 27.9946 | 3.9187 | 1.49700 | 81.61 |
| 36 | −20.6709 | 5.6825 | | |
| 37 | ∞ | 30.1920 | 1.51633 | 64.14 |
| 38 | ∞ | 0.7775 | 1.50847 | 61.19 |
| 39 | ∞ | | | |

| | Focal length | (variable 1) | (variable 2) | (variable 3) |
|---|---|---|---|---|
| Wide-angle | 10.00 | 29.0713 | 4.2253 | 2.5880 |
| Intermediate | 12.81 | 20.5109 | 0.9012 | 14.4725 |
| Telephoto | 16.40 | 8.4379 | 0.3626 | 27.0842 |

Example 15

Figure 29:
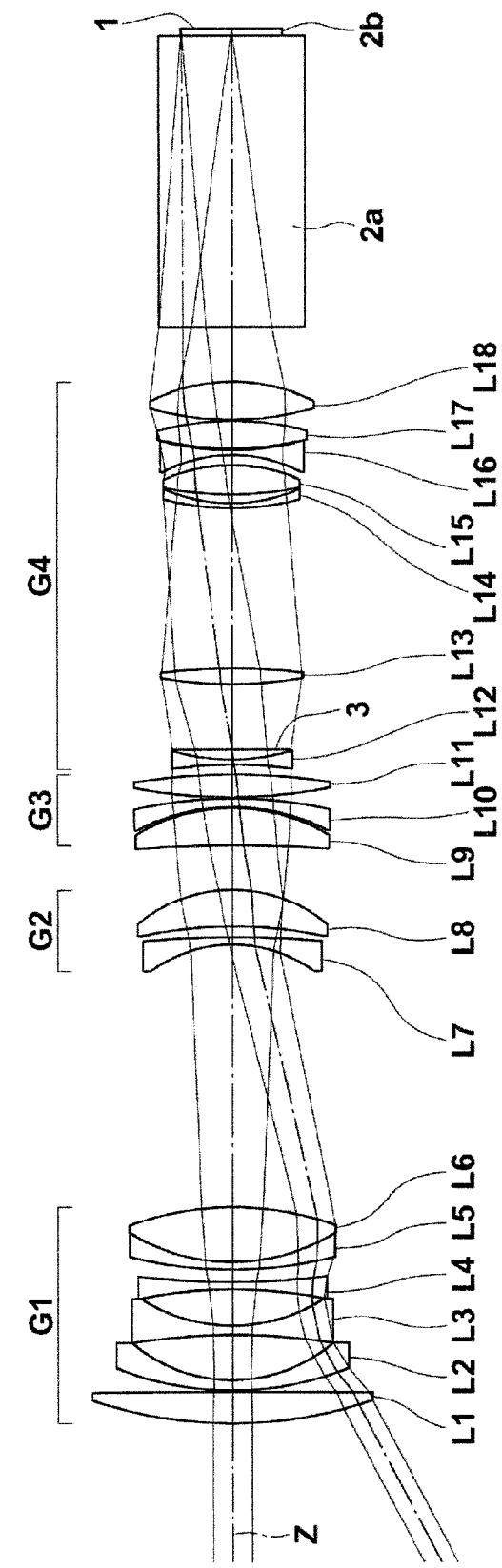
FIG. 29 is a sectional view illustrating the lens configuration and ray trajectories of a variable-magnification projection optical system according to Example 15 of the invention.
Figure 30:
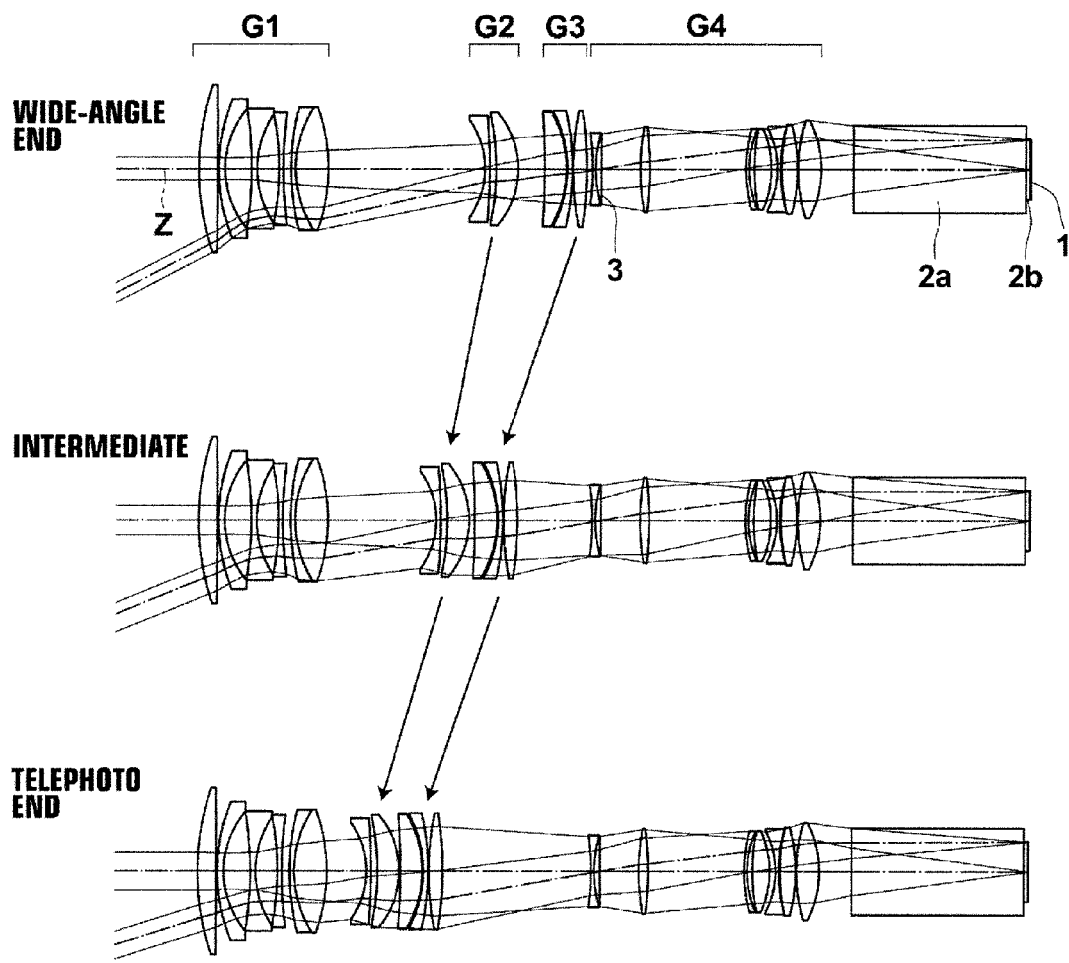
FIG. 30 is a diagram illustrating positions of lens groups and ray trajectories in different magnification positions of the variable-magnification projection optical system according to Example 15 of the invention.

FIGS. 29 and 30 show the lens configuration and ray trajectories at the wide-angle end of the variable-magnification projection optical system of Example 15, and positions of the lens groups and ray trajectories in different magnification positions of the variable-magnification projection optical system of Example 15, respectively. The configuration of the variable-magnification projection optical system according to Example 15 is substantially the same as that of the variable-magnification projection optical system according to Example 13, except that the first lens L1 of the first lens group G1 is formed by a biconvex lens.

Figure 45:
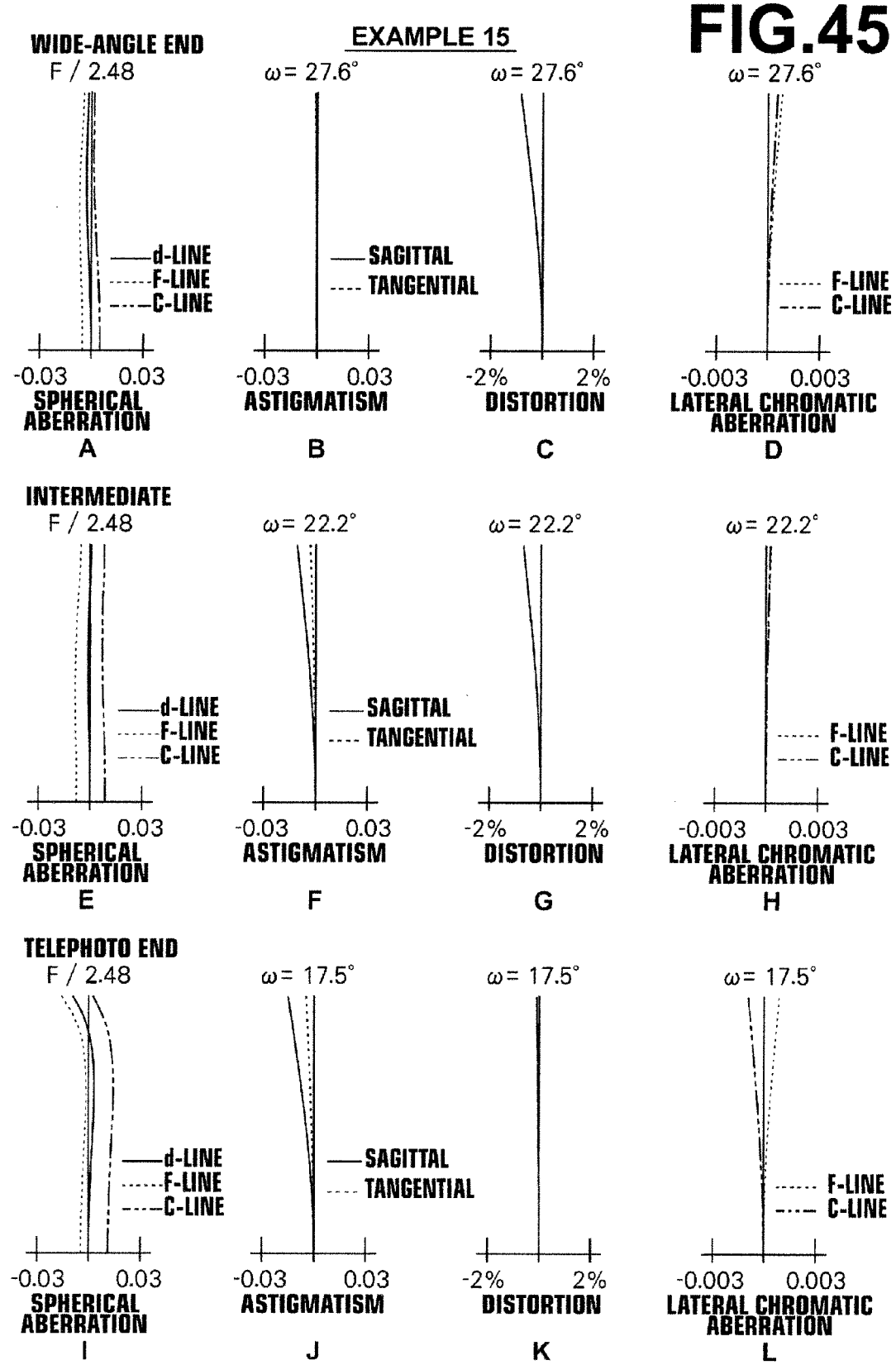
FIG. 45 shows, at A to L, aberration diagrams of the variable-magnification projection optical system according to Example 15 of the invention.

The f-number "Fno." and the total angle of view "2ω" of the variable-magnification projection optical system of Example 15 are shown above Table 15, the basic lens data is shown in the upper table of Table 15, and the values of the focal length of the entire system and the variable intervals at the wide-angle end, at the intermediate focal position and at the telephoto end are shown in the lower table of Table 15, respectively. Further, FIG. 45 shows, at A to L, aberration diagrams of the variable-magnification projection optical system of Example 15.

TABLE 15

Example 15
Fno. = 2.48, 2ω = 55.2°~35.0°

| Si | Ri | Di | Ndj | vdj |
|---|---|---|---|---|
| 1 | 45.9299 | 3.2958 | 1.51633 | 64.14 |
| 2 | −1272.8642 | 0.1295 | | |
| 3 | 32.6029 | 1.0878 | 1.71300 | 53.87 |
| 4 | 16.0461 | 4.7192 | | |
| 5 | −65.7812 | 0.9324 | 1.61800 | 63.33 |
| 6 | 17.4318 | 3.7953 | | |
| 7 | −47.5579 | 0.7252 | 1.80610 | 40.92 |
| 8 | 78.1980 | 1.3220 | | |
| 9 | 43.2564 | 0.7915 | 1.76182 | 26.52 |
| 10 | 20.2171 | 5.7093 | 1.80610 | 40.92 |

TABLE 15-continued

Example 15
Fno. = 2.48, 2ω = 55.2°~35.0°

| | | | | |
|---|---|---|---|---|
| 11 | −31.5136 | (variable 1) | | |
| 12 | −14.4923 | 0.8029 | 1.71300 | 53.87 |
| 13 | −111.5868 | 1.1190 | | |
| 14 | −45.4442 | 3.7910 | 1.57501 | 41.50 |
| 15 | −15.3715 | (variable 2) | | |
| 16 | −131.8496 | 3.8114 | 1.49700 | 81.54 |
| 17 | −19.6620 | 0.1294 | | |
| 18 | −21.5083 | 0.8728 | 1.75520 | 27.51 |
| 19 | −45.0890 | 0.1295 | | |
| 20 | 54.5055 | 2.3731 | 1.61800 | 63.33 |
| 21 | −66.3736 | (variable 3) | | |
| 22 | −42.3620 | 0.5180 | 1.48749 | 70.23 |
| 23 | 21.7869 | 1.0000 | | |
| 24 (stop) | ∞ | 6.8288 | | |
| 25 | 41.5083 | 1.6191 | 1.80610 | 33.27 |
| 26 | −62.9566 | 16.6479 | | |
| 27 | 27.1678 | 0.5180 | 1.71300 | 53.87 |
| 28 | 17.4161 | 0.9496 | | |
| 29 | 37.2278 | 2.9872 | 1.49700 | 81.54 |
| 30 | −17.4902 | 1.0544 | | |
| 31 | −15.4182 | 0.5076 | 1.83400 | 37.16 |
| 32 | 28.1430 | 0.1875 | | |
| 33 | 33.7712 | 2.8680 | 1.49700 | 81.54 |
| 34 | −29.0679 | 0.0777 | | |
| 35 | 30.6653 | 3.9897 | 1.49700 | 81.54 |
| 36 | −18.8389 | 5.6778 | | |
| 37 | ∞ | 30.1720 | 1.51633 | 64.14 |
| 38 | ∞ | 0.7770 | 1.50847 | 61.19 |
| 39 | ∞ | | | |

| | Focal length | (variable 1) | (variable 2) | (variable 3) |
|---|---|---|---|---|
| Wide-angle | 10.00 | 27.2754 | 4.6531 | 1.0354 |
| Intermediate | 12.81 | 18.8919 | 1.0172 | 13.0547 |
| Telephoto | 16.40 | 6.9006 | 0.2606 | 25.8026 |

Table 16 shows values corresponding to and values relating to the conditional expressions (1) to (6) of the above-described Examples 1 to 15. As shown in Table 16, the variable-magnification projection optical systems of Examples 1 to 15 satisfy all the conditional expressions (1) to (6).

TABLE 16

| Conditional expression | Example 1 | Example 2 | Example 3 | Example 4 | Example 5 | Example 6 | Example 7 | Example 8 |
|---|---|---|---|---|---|---|---|---|
| (1) Bf/fw | 2.08 | 2.08 | 2.27 | 3.03 | 3.04 | 3.03 | 2.99 | 3.04 |
| (2) f2/fw | −7.56 | −5.50 | −8.62 | −4.59 | −3.86 | −3.74 | −3.83 | −3.72 |
| (3) Bf/Imφ | 2.51 | 2.52 | 2.52 | 2.51 | 2.51 | 2.51 | 2.50 | 2.51 |
| (4) f1/fw | −3.68 | −3.48 | −3.62 | −5.47 | −3.03 | −2.83 | −3.72 | −2.87 |
| (5) fe/fw | 3.02 | 3.23 | 3.47 | 3.43 | 3.72 | 3.77 | 3.70 | 3.77 |
| (6) Zr | 1.745 | 1.745 | 1.746 | 1.516 | 1.516 | 1.516 | 1.516 | 1.516 |

| Conditional expression | Example 9 | Example 10 | Example 11 | Example 12 | Example 13 | Example 14 | Example 15 |
|---|---|---|---|---|---|---|---|
| (1) Bf/fw | 2.63 | 2.61 | 2.61 | 2.82 | 2.60 | 2.61 | 2.61 |
| (2) f2/fw | −2.90 | −2.83 | −2.59 | −4.31 | −10.73 | −9.00 | −9.01 |
| (3) Bf/Imφ | 2.80 | 2.80 | 2.80 | 2.77 | 2.51 | 2.52 | 2.52 |
| (4) f1/fw | −3.93 | −4.09 | −4.00 | −4.26 | −4.65 | −4.74 | −4.89 |
| (5) fe/fw | 2.56 | 2.66 | 2.96 | 3.47 | 2.95 | 2.98 | 2.99 |
| (6) Zr | 1.641 | 1.640 | 1.640 | 1.599 | 1.640 | 1.640 | 1.640 |

| | Example 1 | Example 2 | Example 3 | Example 4 | Example 5 | Example 6 | Example 7 | Example 8 |
|---|---|---|---|---|---|---|---|---|
| Bf | 20.811 | 20.827 | 22.737 | 30.345 | 30.351 | 30.344 | 29.917 | 30.410 |
| Imφ | 8.278 | 8.280 | 9.040 | 12.113 | 12.114 | 12.113 | 11.977 | 12.115 |
| fw | 10.000 | 10.000 | 10.000 | 10.000 | 10.000 | 10.000 | 10.000 | 10.000 |
| f1 | −36.821 | −34.784 | −36.206 | −54.745 | −30.314 | −28.284 | −37.221 | −28.720 |
| f2 | −75.634 | −55.030 | −86.155 | −45.888 | −38.603 | −37.447 | −38.261 | −37.177 |
| fe | 30.209 | 32.270 | 34.733 | 34.346 | 37.227 | 37.650 | 36.962 | 37.681 |

| | Example 9 | Example 10 | Example 11 | Example 12 | Example 13 | Example 14 | Example 15 |
|---|---|---|---|---|---|---|---|
| Bf | 26.276 | 26.077 | 26.074 | 28.150 | 25.956 | 26.112 | 26.094 |
| Imφ | 9.390 | 9.317 | 9.317 | 10.151 | 10.359 | 10.366 | 10.359 |

TABLE 16-continued

| fw | 10.000 | 10.000 | 10.000 | 10.000 | 10.000 | 10.000 | 10.000 |
|----|--------|--------|--------|--------|--------|--------|--------|
| f1 | −39.295 | −40.856 | −40.048 | −42.625 | −46.541 | −47.377 | −48.908 |
| f2 | −29.008 | −28.313 | −25.914 | −43.134 | −107.264 | −89.999 | −90.144 |
| fe | 25.605 | 26.602 | 29.643 | 34.688 | 29.451 | 29.839 | 29.891 |

The above-described Examples 1 to 15 are telecentric on the reduction side, have a long back focus, can minimize the size increase of the outer diameters of the enlargement side lenses even when the projection optical system is in the form of a wide-angle projection optical system, have a small f-number of about 2.5 across the entire magnification range from the wide-angle end to the telephoto end and have a high zoom ratio of about 1.52 to 1.75 while suppressing fluctuation of aberration along with magnification change, have successfully corrected aberrations and have high optical performance without using an aspherical surface.

Modification of Example 1

The above-described Example 1 is configured to be converted into a zoom lens only by changing the intervals between the lens groups. Table 17 shows values of the focal length of the entire system and distances of the variable intervals at the wide-angle end, at the intermediate focal position and at the telephoto end when the projection distance is infinity in the case where the above-described Example 1 is used as a zoom lens only by changing the intervals between the lens groups. When the modification of Example 1 is used as a zoom lens, focusing when the projection distance is changed is achieved by using the inner focus method, where the fifth lens L5 at the most reduction-side position in the first lens group G1 is moved in the optical axis direction to achieve focusing. In Table 17, the surface interval that is changed during this focusing, i.e., the interval between the fourth lens L4 and the fifth lens L5 is denoted by "D8".

TABLE 17

| | Focal length | D8 | (Variable 1) | (Variable 2) | (Variable 3) | (Variable 4) |
|---|---|---|---|---|---|---|
| Wide-angle | 9.99 | 3.6344 | 19.8241 | 10.9381 | 1.2940 | 0.2476 |
| Intermediate | 14.46 | 3.6344 | 8.0058 | 8.2791 | 2.0235 | 13.9955 |
| Telephoto | 17.44 | 3.6344 | 1.6605 | 8.6589 | 0.4129 | 21.5714 |

Modification of Example 13

The above-described Example 13 is also configured to be converted into a zoom lens only by changing the intervals between the lens groups. Table 18 shows values of the focal length of the entire system and distances of the variable intervals at the wide-angle end, at the intermediate focal position and at the telephoto end when the projection distance is infinity in the case where the above-described Example 13 is used as a zoom lens only by changing the intervals between the lens groups. When the modification of Example 13 is used as a zoom lens, focusing when the projection distance is changed is achieved by using the inner focus method, where the cemented lens formed by the fifth lens L5 and the sixth lens L6 cemented together of the first lens group G1 is moved in the optical axis direction to achieve focusing. In Table 18, the surface interval that is changed during this focusing, i.e., the interval between the fourth lens L4 and fifth lens L5 is denoted by "D8".

TABLE 18

| | Focal length | D8 | (Variable 1) | (Variable 2) | (Variable 3) |
|---|---|---|---|---|---|
| Wide-angle | 9.99 | 1.2631 | 28.0251 | 5.0631 | 1.0333 |
| Intermediate | 12.79 | 1.2631 | 20.1347 | 1.1353 | 12.8515 |
| Telephoto | 16.38 | 1.2631 | 7.9500 | 0.8005 | 25.3710 |

The present invention has been described with reference to the embodiments and examples. However, the variable-magnification projection optical system of the invention is not limited to those of the above-described examples and various modifications of the aspect may be made. For example, the radius of curvature, the surface interval, the refractive index and the Abbe number of each lens may be changed as appropriate.

Also, the projection display device of the invention is not limited to those having the above-described configurations. For example, the light valves used and the optical members used for separating or combining bundles of rays are not limited to those of the above-described configurations, and various modifications of the aspect may be made.

What is claimed is:

1. A variable-magnification projection optical system substantially consisting of: a first lens group that has a negative refractive power, is disposed at a most enlargement-side position and is fixed during magnification change; a last lens group that has a positive refractive power, is disposed at a most reduction-side position and is fixed during magnification change; and a plurality of lens groups that are disposed between the first lens group and the last lens group and are moved during magnification change, wherein a most enlargement-side lens group of the lens groups that are moved during magnification change has a negative refractive power, the variable-magnification projection optical system is configured to be telecentric on a reduction side, and conditional expressions (1-1), (2) and (5) below are satisfied:

$$2.0 < Bf/fw \qquad (1\text{-}1),$$

$$-13.0 < f2/fw < -1.5 \qquad (2) \text{ and}$$

$$1.0 < fe/fw < 5.0 \qquad (5),$$

where Bf is a back focus, which is an equivalent air distance, on the reduction side of the entire system at a wide-angle end, fw is a focal length of the entire system at the wide-angle end, f2 is a focal length of the most enlargement-side lens group of the lens groups that are moved during magnification change, and fe is a focal length of the last lens group.

2. The variable-magnification projection optical system as claimed in claim 1, wherein conditional expression (2-1) below is satisfied:

$$-11.5 < f2/fw < -2.0 \qquad (2\text{-}1).$$

3. The variable-magnification projection optical system as claimed in claim 1, wherein conditional expression (3) below is satisfied:

$$1.8 < Bf/Im\phi \qquad (3),$$

where Imϕ is a maximum effective image circle diameter on the reduction side.

4. The variable-magnification projection optical system as claimed in claim 3, wherein conditional expression (3-1) below is satisfied:

$$2.2 < Bf/Im\phi \tag{3-1}$$

5. The variable-magnification projection optical system as claimed in claim 1, wherein the lens groups that are moved during magnification change substantially consist of two lens groups consisting of, in order from an enlargement side, a lens group having a negative refractive power and a lens group having a positive refractive power.

6. The variable-magnification projection optical system as claimed in claim 1, wherein the lens groups that are moved during magnification change substantially consist of three lens groups consisting of, in order from the enlargement side, a lens group having a negative refractive power, a lens group having a positive refractive power and a lens group having a positive refractive power.

7. The variable-magnification projection optical system as claimed in claim 1, wherein conditional expression (4) below is satisfied:

$$\phi 10.0 < f1/fw < -2.0 \tag{4}$$

where f1 is a focal length of the first lens group.

8. The variable-magnification projection optical system as claimed in claim 7, wherein conditional expression (4-1) below is satisfied:

$$-7.0 < f1/fw < -2.3 \tag{4-1}$$

9. The variable-magnification projection optical system as claimed in claim 1, wherein conditional expression (5-1) below is satisfied:

$$2.0 < fe/fw < 4.0 \tag{5-1}$$

10. The variable-magnification projection optical system as claimed in claim 1, wherein a stop is disposed in the last lens group, and a numerical aperture is set to be constant across the entire magnification range.

11. The variable-magnification projection optical system as claimed in claim 1, wherein all lenses on the reduction side of the first lens group are single lenses.

12. The variable-magnification projection optical system as claimed in claim 1, wherein the variable-magnification projection optical system functions as a zoom lens by changing at least one interval between the lens groups.

13. The variable-magnification projection optical system as claimed in claim 1, wherein, when the variable magnification optical system is a zoom lens, only a part of the first lens group including a lens disposed at a most reduction-side position in the first lens group is movable in an optical axis direction during focusing.

14. The variable-magnification projection optical system as claimed in claim 1, wherein conditional expression (6) below is satisfied:

$$1.4 < Zr \tag{6}$$

where Zr is a zoom ratio between a telephoto end and the wide-angle end.

15. The variable-magnification projection optical system as claimed in claim 14, wherein conditional expression (6-1) below is satisfied:

$$1.5 < Zr \tag{6-1}$$

16. A projection display device comprising: a light source; a light valve for receiving incoming light from the light source; and the variable-magnification projection optical system as claimed in claim 1 serving as a variable-magnification projection optical system for projecting an optical image formed by light that have been subjected to optical modulation by the light valve onto a screen.

* * * * *